United States Patent [19]
Bahl et al.

[11] Patent Number: 4,718,094
[45] Date of Patent: Jan. 5, 1988

[54] SPEECH RECOGNITION SYSTEM

[75] Inventors: Lalit R. Bahl, Amawalk; Peter V. deSouza, Yorktown Heights; Steven V. DeGennaro, Pawling; Robert L. Mercer, Yorktown Heights, all of N.Y.

[73] Assignee: International Business Machines Corp., Armonk, N.Y.

[21] Appl. No.: 845,155

[22] Filed: Mar. 27, 1986

Related U.S. Application Data

[63] Continuation-in-part of Ser. No. 672,974, Nov. 19, 1984, abandoned, which is a continuation-in-part of Ser. No. 738,930, May 29, 1985, abandoned.

[51] Int. Cl.$^4$ .............................................. G10L 5/00
[52] U.S. Cl. ................................... 381/43; 364/513.5
[58] Field of Search ................................ 381/41–43; 364/513, 513.5

[56] References Cited

U.S. PATENT DOCUMENTS

| | | | |
|---|---|---|---|
| 3,943,295 | 3/1976 | Martin et al. | 381/43 |
| 4,038,503 | 7/1977 | Moshier | 179/1 SA |
| 4,156,868 | 5/1979 | Levinson | 381/43 |
| 4,158,750 | 6/1979 | Sakoe et al. | 381/43 |
| 4,277,644 | 7/1981 | Levinson | 381/43 |
| 4,319,085 | 3/1982 | Welch et al. | 179/1 SD |
| 4,348,553 | 9/1982 | Baker et al. | 179/1 SB |
| 4,400,788 | 8/1983 | Myers et al. | 381/43 |
| 4,435,617 | 3/1984 | Griggs | 381/43 |
| 4,467,437 | 8/1984 | Tsuruta et al. | 364/513.5 |
| 4,481,593 | 11/1984 | Bahler | 364/513.5 |
| 4,489,434 | 12/1984 | Moshier | 381/43 |
| 4,489,435 | 12/1984 | Moshier | 381/43 |
| 4,513,436 | 4/1985 | Nose et al. | 381/43 |
| 4,516,215 | 5/1985 | Hakaridani et al. | 381/43 |
| 4,559,604 | 12/1985 | Ichikawa et al. | 864/513.5 |
| 4,587,670 | 5/1986 | Levinson et al. | 381/43 |
| 4,593,367 | 1/1986 | Slack et al. | 364/513 |
| 4,618,983 | 10/1986 | Nishioka et al. | 381/43 |

OTHER PUBLICATIONS

M. Cravero et al., "Phonetic Units for Hidden Markov Models", CSELT Technical Reports, vol., XIV, No. 2, Apr. 1986, pp. 121–125.

"Composite Fenemic Phones", Research Disclosure, Emsworth, Hampshire, GB., No. 256, Aug. 1985, pp. 418, Disclosed anonymously.

L. R. Rabiner et al., "Recognition of Isolated Digits using Hidden Markov Models with continuous Mixture Densities", AT&T Technical Journal, vol. 64, No. 6, Jul.–Aug. 1985, printed in U.S.A., pp. 1211–1234.

H. Bourlard et al., "Speaker Dependent Connected Speech Recognition via Phonemic Markov Models", Proceedings of IEEE, 1985, pp. 1213–1216.

D. B. Paul, "Training of HMM Recognizers by Simulated Anealing", Proceedings of IEEE, 1985, pp. 13–16.

B. H. Juang et al., "Recent Developments in the Application of Hidden Markov Models to Speaker-Independent Isolated Word Recognition", Proceedings of IEEE, 1985, pp. 9–12.

(List continued on next page.)

Primary Examiner—E. S. Kemeny
Attorney, Agent, or Firm—Marc A. Block

[57] ABSTRACT

Speech words are recognized by first recognizing each spectral vector identified by a label (feneme), then identifying the word by matching the string of labels against phones using simplified phone machines based on label and transition probabilities and Merkov chains. In one embodiment, a detailed acoustic match word score is combined with an approximate acoustic match word score to provide a total word score for a subject word. In another embodiment, a polling word score is combined with an acoustic match word score to provide a total word score for a subject word. The acoustic models employed in the acoustic matching may correspond, alternatively, to phonetic elements or to fenemes. Fenemes represent labels generated by an acoustic processor in response to a spoken input. Apparatus and method for determining word scores according to approximate acoustic matching and for determining word scores according to a polling methodology are disclosed.

97 Claims, 57 Drawing Figures

OTHER PUBLICATIONS

Y. Kamp, "State Reduction in Hidden Markov Chains Used for Speech Recognition" IEEE Transactions on Acoustics, Speech and Signal Processing, vol. ASSP-33, No. 4, Oct. 1985.

K. Sugawara et al., "Isolated Word Recognition Using Hidden Markov Models", Proceedings of IEEE, 1985, pp. 1-4.

R. Schwartz et al., "Context-Dependent Modeling for Acoustic-Phonetic Recognition of Continuous Speech", Proceedings of IEEE, 1985, pp. 1205-1208.

J. F. Mari et al., "Speaker Independent Connected Digit Recognition using Hidden Markov Models", Speech Tech. 1985, pp. 127-132.

R. Schwartz et al., "Improved Hidden Markov Modeling of Phonemes for Continuous Speech Recognition", Proceedings of IEEE International Conference on Acoustics, Speech, and Signal Processing, vol. 3 of 3, Mar. 19-21, 1984.

L. R. Bahl et al., "A Maximum Likelihood Approach to Continuous Speech Recognition", IEEE Transactions of Pattern Analysis and Machine Intelligence, vol., PAMI-5, No. 2, Mar. 1983.

F. Jelinek et al., "Design of a Linguistic Statistical Decoder for the Recognition of Continuous Speech", IEEE Transactions on Information Theory, vol., IT-21, No. 3, May 1975.

S. E. Levinson et al., "Speaker Independent Isolated Digit Recognition using Hidden Markov Models", Proceedings of IEEE, ICASSP 1983, Boston, pp. 1049-1052.

J. P. Haton, "Problems in the Design and Use of a Connected Speech Understanding System", Proceedings of IEEE International Conference on Acoustics, Speech and Signal Processing, vol. 3 of 3, May 1982.

D. M. Choy et al., "Speech Compression by Phoneme Recognition", IBM Technical Disclosure Bulletin, vol. 25, No. 6, Nov. 1982, pp. 2884-2886.

L. R. Bahl et al., "Interpolation of Estimators Derived from Sparse Data", IBM Technical Disclosure Bulletin, vol. 24, No. 4, Sept. 1981, pp. 2038-2051.

L. R. Bahl et al., "Faster Acoustic Match Computation", IBM Technical Disclosure Bulletin, vol. 23, No. 4, Sept. 1980, pp. 1718-1719.

S. K. Das et al., "System for Temporal Regisration of Quasi-Phonemic Utterance Representations", IBM Technical Disclosure Bulletin, vol. 23, No. 7A, Dec. 1980. pp. 3047-3050.

R. W. A. Scarr, "Word-Recognition Machine", Proceedings of IEE, vol. 117, No. 1, Jan. 1987, pp. 203-212.

DETAILED MATCH LATTICE

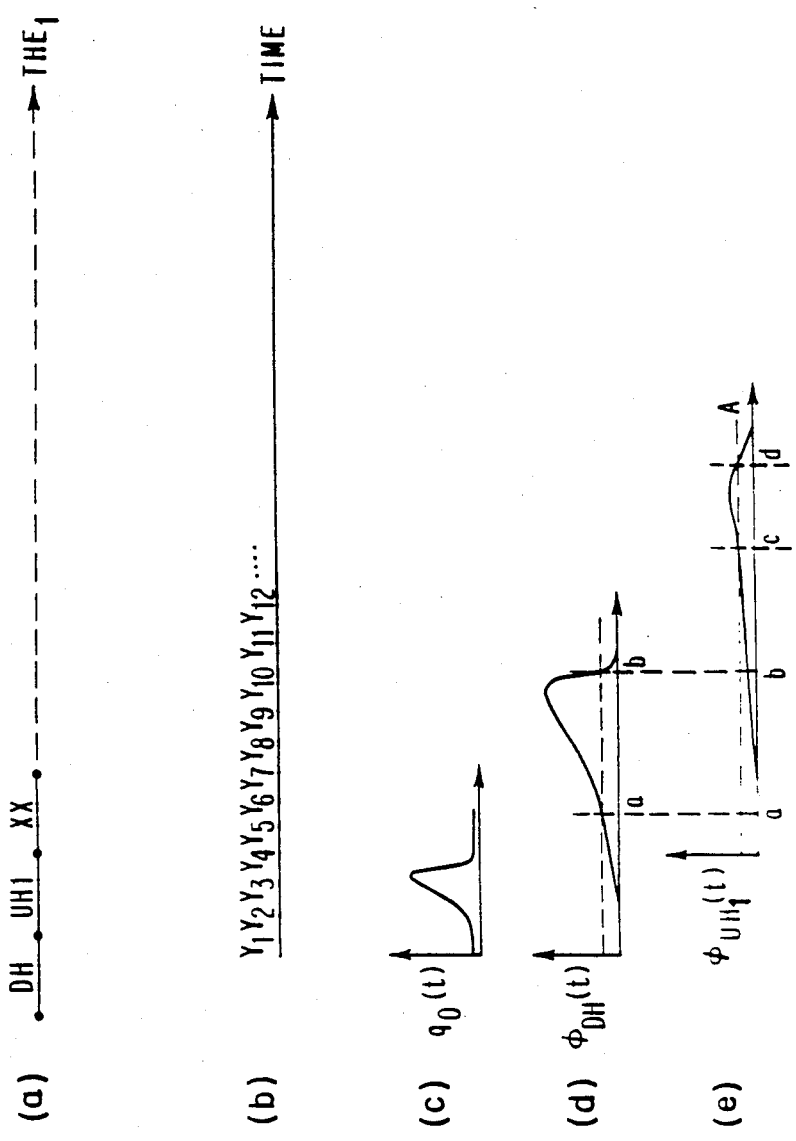

FIG.19

STAGES FOR STACKING "TO BE OR NOT TO BE"

1. y0 y1 y2 — W — X — — — — — — — — — — — — LABEL INTERVALS

| TO |
   | TWO |
   | TOO |

2. y0 y1 y2 — W — X — — — Y — — — — — — — LABEL INTERVALS

| TWO |   | TO BE |
   | TOO |   |       |

3. y0 y1 y2 — W — X — — — Y — — — — — — — LABEL INTERVALS

| TOO |   | TO BE |
   |     |   | TWO B |
   |     |   | TWO D |

4. y0 y1 y2 — W — X — — — Y — — — — — — — LABEL INTERVALS

| TOO |   | TWO B |   | TO BE OR |
   |     |   | TWO D |   |          |

| | PHONE | LEVEL | LEAF | (IF LEAF) WORD |
|---|---|---|---|---|
| 1 | | | | |
| 2 | | | | |
| 3 | | | | |
| ⋮ | | | | ⋮ |
| 10 | | | | |

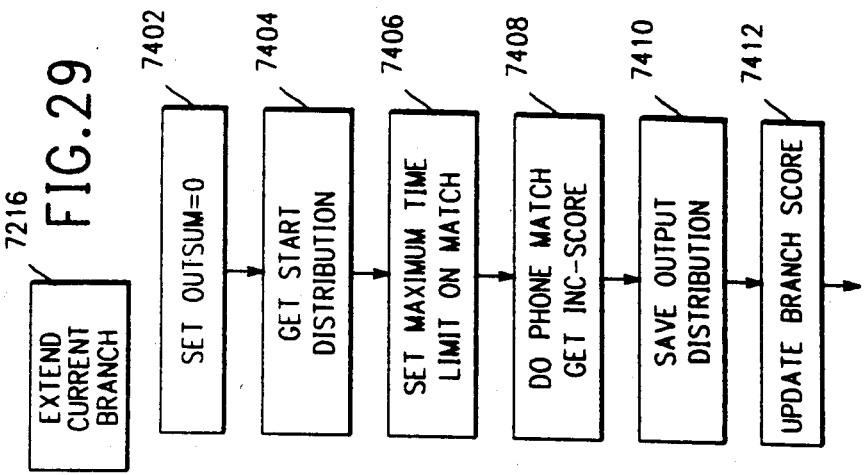
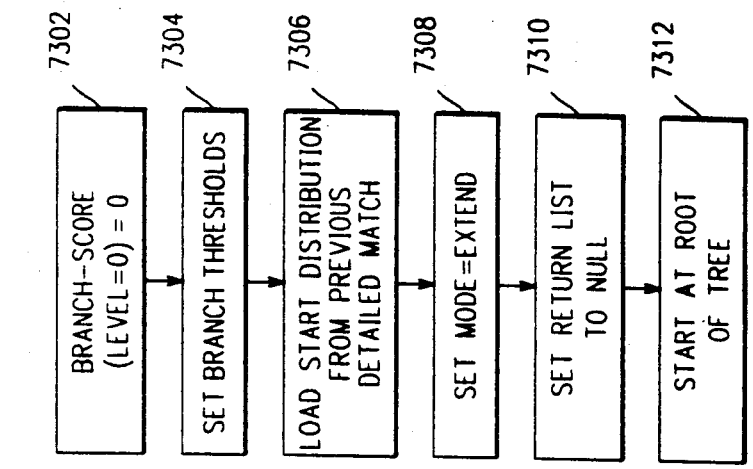

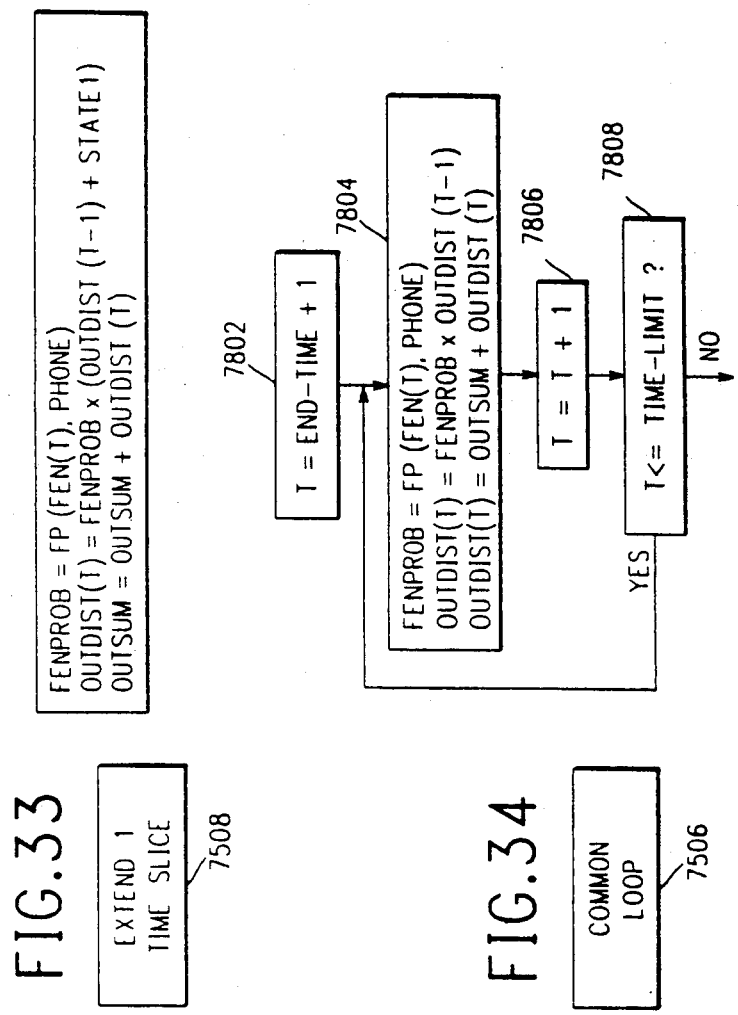

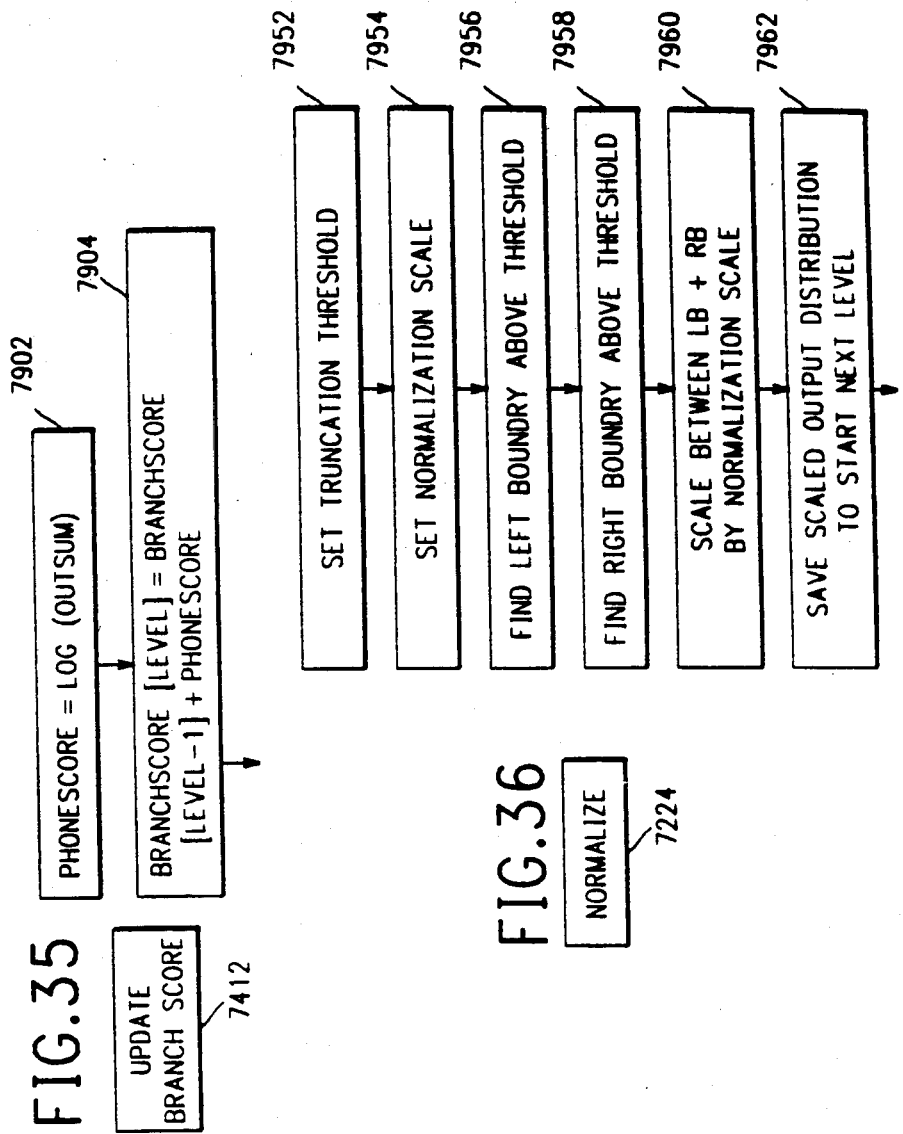

FIG.37.1

| FIG.37.1 | FIG.37.2 |

FIG. 37.2

FIG.39
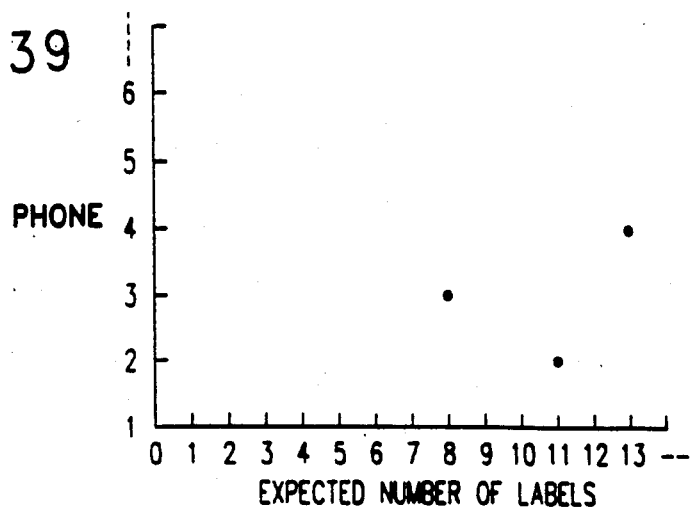
FIG.40 WORD 1 {$P_1$ $P_3$ $P_6$ $P_{10}$ $P_1$ ---->}
WORD 2 {$P_3$ $P_2$ $P_2$ $P_1$ ---->}
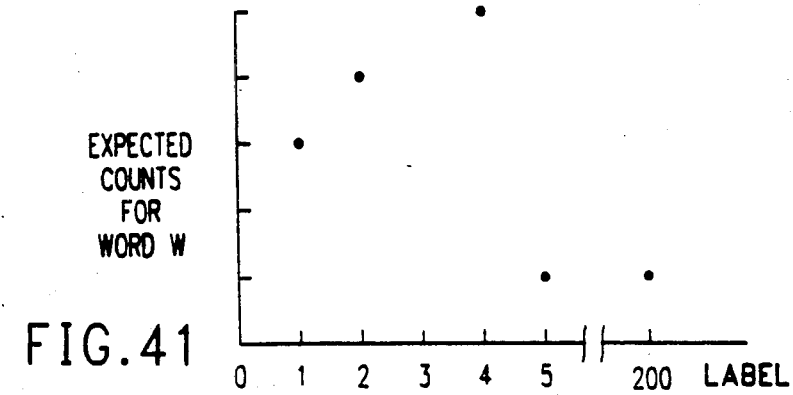
FIG.41

| WORD \ LABEL | 1 | 2 | 3 | ... | (L-1) | L |
|---|---|---|---|---|---|---|
| 1 | $V_{11}$ | $V_{21}$ | $V_{31}$ | | | |
| 2 | $V_{12}$ | $V_{22}$ | | | | |
| 3 | $V_{13}$ | | | | | |
| 4 | | | | | | |
| . | | | | | | |
| . | | | | | | |
| . | | | | | | |
| (W-1) | | | | | | |
| W | | | | | | |

FIG. 42

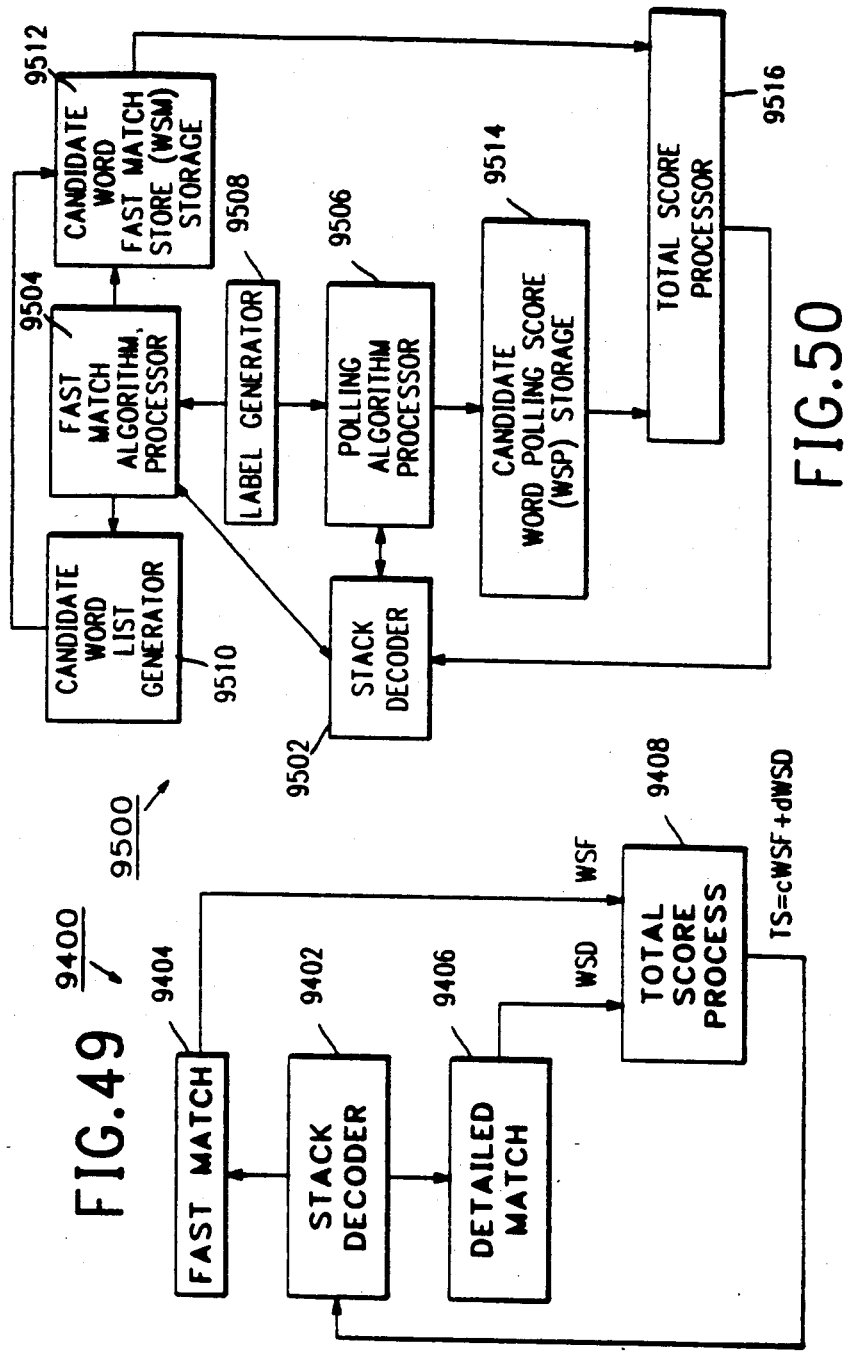

SPEECH RECOGNITION SYSTEM

RELATED APPLICATIONS

This application is a continuation-in-part (CIP) of U.S. Ser. No. 06/672,974 filed Nov. 19, 1984, abandoned, by L. R. Bahl, S. V. DeGennaro, and R. L. Mercer; and U.S. Ser. No. 06/738,930 filed May 29, 1985, abandoned, by L. R. Bahl, P. V. deSouza, and R. L. Mercer.

FIELD OF THE INVENTION

The present invention relates to the art of selecting a word from a vocabulary of words in response to the communicating of some text. In a specific embodiment, the invention pertains to selecting a word in a speech recognition context.

GLOSSARY OF TERMS

Symbol: Characterizing acoustic speech based on n features, acoustic speech is viewed in an n-dimensional acoustic space. The space is partitioned into regions, each of which is identified by an n-dimensional prototype vector. Each prototype vector is represented by a "symbol", such as a number or other identifier. Uttered speech may be viewed as successive "symbols".

Feneme (also Label): A symbol corresponding to a prototype vector, the symbol being defined based on features of sound occurring during a fixed interval of time. Sound may be characterized as having, for example, twenty features—the magnitude of each feature during a centisecond interval corresponding to a prototype vector component. Each prototype vector thus has a corresponding set of feature values for a centisecond interval. Based on the feature values generated during a centisecond interval, one prototype vector from a fixed set of prototype vectors is selected as the closest. With each prototype vector having a corresponding feneme (or label), the set of prototype vectors corresponds to an alphabet of fenemes (or labels). Sample fenemes are listed in Table 1—the first feneme 001 being defined as AA11. An acoustic processor examines uttered speech one interval after another and, based on which prototype vector is closest by some measure to the feature values, the feneme for the closest prototype vector is assigned to the interval. An acoustic processor in which the feature values are based on an auditory model is set forth in Section (I) (B) of the DESCRIPTION OF A PREFERRED EMBODIMENT OF THE INVENTION. The feneme is distinguished from the well-known phoneme in that the former is based on feature values examined over a fixed interval of time (e.g., a centisecond) whereas the latter is based on a predefined set of basic phonetic sound units without regard to time limitations.

Markov Model (also probabilistic finite state machine): A sound event can be represented as a collection of states connected to one another by transitions which produce symbols from a finite alphabet. Each transition from a state to a state has associated with it a probability $prob_s(t)$ which is the probability that a transition t will be chosen next when a state s is reached. Also, for each possible label output at a transition, there is a corresponding probability. The model starts with one or more initial states and ends with one or more final states.

Phone: A unit of sound for which a Markov model is assigned. A first type of phone is phonetically based, each phoneme corresponding to a respective phone. A standard set of phonemes are defined in the International Phonetic Alphabet. A sample Markov model for a phonetic phone is depicted in FIG. 3. A second type of phone is feneme-based, each feneme corresponding to a respective phone. A sample Markov model for a fenemic phone is depicted in FIG. 23.

Phone machine: For each phone, there is a corresponding phone machine. During a training session, the transition probability values and actual label probability values are determined for each phone and are stored for use in match value computations performed later. In section (I) (D), computations performed by a phonetic phone machine (with actual label probabilities having been replaced) are shown. As illustrated in FIG. 12, a phone machine receives as input a string of labels (or fenemes) together with a start-time distribution which indicates times during which the phone (unit of sound) may have started. As output, the phone machine provides an endtime distribution—that serves as the start-time distribution of the next phone—and a match value. The match value indicates the likelihood that the string of labels was produced by the phone corresponding to phone machine being examined. For example, a phone machine for the phonetic phone DH has transition probabilities and label output probabilities assigned thereto as a result of prior training. For a given string of labels (such as DH1-, DH2-, DH1-, DH1- ...), the DH phone machine determines the likelihood that the DH phone generated the label string.

Length of labels: The number of labels in a string may be much greater than the number required by a phone machine to match the phone corresponding thereto and the labels. The phone machine may define a minimum number of labels and a maximum number of labels in series, and examine only lengths of labels between the minimum and maximum lengths in computing a match value. Alternatively, the phone machine may examine only the first J labels in computing a match value.

Phonetic baseform: A sequence of phonetic phones which are combined to form the pronunciation of a vocabulary word. In FIG. 14, one pronunciation of the word "THE" (labelled as $THE_1$) is shown as a baseform comprising the phonetic phones: DH, UH1, XX. It is noted that, for each phonetic phone, there is a corresponding Markov model. By concatenating the Markov models for the three phonetic phones, a Markov model representation of the pronunciation for the word $THE_1$ is provided.

Tree Structure: A plurality of word baseforms are incorporated into a single tree structure in FIG. 17. Starting at a common node, phonetic phones extend as branches to succeeding nodes from which other phonetic phones extend. Words (or distinct pronunciations thereof) are defined when a branch ends with a leaf. Phonetic baseforms for words starting with the phonetic phone DH and starting with the phonetic phone MX are shown in FIG. 17.

Polling: From a training text, it is determined how often each label occurs in each vocabulary word. From such data, tables are generated in which each label has a vote for each vocabulary word and, optionally, each label has a penalty for each word. When an acoustic processor generates a string of labels, the votes (and penalties) for each vocabulary word are computed to provide a match value. The process of tallying the votes is "polling".

DESCRIPTION OF PRIOR AND CONTEMPORANEOUS ART

A first aspect of the present invention involves the use of approximate acoustic matching in generating word scores. A second aspect of the present invention involves the use of polling in determining word scores. A third aspect of the present invention involves the combining of plural word scores derived from independent algorithms to provide an enhanced total word score. This section will address technology relating to each aspect.

The following cases—incorporated herein by reference—relate to inventions which provide background or environment of the present invention: "Nonlinear Signal Processing in a Speech Recognition System", Ser. No. 06/665,401 filed Oct. 26, 1984; and "Feneme-based Markov Models for Words", Ser. No. 06/697,174 filed Feb. 1, 1985.

1. Prior and Contemporaneous Art Pertaining to the Fast Approximate Acoustic Match Typically, the purpose of a speech recognition system or machine is to automatically transform natural speech into some other form, for example written form. In achieving this aim, various general approaches have been considered. One approach is directed to simulating human speech interpretation processes. Another approach is to view speech in a statistical context.

In the statistical approach itself, several techniques have been considered as suggested by the Bahl, Jelinek, and Mercer article, "A Maximum Likelihood Approach to Continuous Speech Recognition," *IEEE Transactions on Pattern Analysis and Machine Intelligence*, Volume PAMI-5, Number 2, pp. 179–190 (1983). In the Bahl et al. article, it is noted that the typical model of a speech recognition system includes a text generator followed by a speaker, or talker. The text generator determines what is to be said and the speaker produces a natural speech waveform. The natural speech waveform enters an acoustic processor the output from which enters a linguistic decoder. Depending on the technique employed, the above-noted elements may be associated in various ways. Bahl et al. combine the speaker and acoustic processor to function as an acoustic channel wherein the speaker provides text as a speech waveform and wherein the acoustic processor acts as a data compressor which provides a string of labels (also referred to as symbols or fenemes) to the linguistic decoder. The labels may be generated in any of a number of ways and are commonly identified collectively as the string Y made up of sequential labels $y_1 y_2 y_3$ - - - . The purpose of the linguistic decoder is to represent the original spoken text, in some prescribed form, based on the incoming string of labels.

In the above-noted article, which is incorporated herein by reference, one acoustic processor—the IBM centisecond acoustic processor (CSAP)—is described as transforming the speech waveform into a string of parameter vectors. Each parameter vector is compared to stored prototypes (or standard vectors)—the distance from the parameter vector and each prototype being determined. The "label" for the prototype which is closest is then assigned to the waveform parameter vector. The label can have any of various forms and may be determined in any of various known manners in accordance with existing techology.

The purpose of the linguistic decoder is to perform a matching process between the incoming labels and words provided in the system vocabulary. In the probabilistic approach set forth in the Bahl et al. article, the linguistic decoder aims at determining a word string W that has the highest probability of having produced the string of labels $y_1 y_2 y_3$ - - - . Mathematically, this is represented by the expression:

$$\text{Max } Pr(W|Y), \tag{1}$$

the maximum probability of W given Y over all word strings W. According to well-known probability theory, this can be written as:

$$Pr(W|Y) = Pr(W) \times Pr(Y|W)/Pr(Y) \tag{2}$$

where Pr(Y) is independent of W and the probability of a given word string W, namely Pr(W), is determined by a language model in the linguistic decoder.

Suppose that at some point in the decoding process some initial substring, for example $y_1 y_2 \ldots y_T$, has been tentatively decoded as the word string $W_1 W_2 \ldots W_n$. The present invention is directed to determining a set of candidate words $W_{(n+1)}$ for which $$Pr(W_{(n+1)}|y_1 \ldots y_T y_{T+1} \ldots y_{T+k}, W_1 \ldots W_n)$$

is relatively large—compared to other words in the vocabulary—for some value of k.

In determining $Pr(Y|W)$, Markov modelling has been considered. The number of computations required by several linguistic decoding techniques is noted in the Bahl et al. article as being fairly high, especially with larger vocabularies on the order of 5000 words and more for example.

A key question in linguistic decoding has therefore been how to determine $Pr(Y|W)$ for word strings from a vocabulary without requiring inordinate computation time and without sacrificing accuracy in decoding.

This object and others are addressed by the present invention.

2. Prior and Contemporaneous Art Pertaining to Polling

In a probabilistic approach to speech recognition, an acoustic waveform is initially transformed into a string of labels, or fenemes, by an acoustic processor. The labels, each of which identifies a sound type, are selected from an alphabet of typically approximately 200 different labels. The generating of such labels has been discussed in various articles such as "Continuous Speech Recognition by Statistical Methods", *Proceedings of the IEEE*, volume 64, pp. 532–556 (1976) and in the copending patent application entitled "Nonlinear Signal Processing in a Speech Recognition System".

In employing the labels to achieve speech recognition, Markov model phone machines (also referred to as a probable finite state machines) have been discussed. A Markov model normally includes a plurality of states and transitions between the states. In addition, the Markov model normally has probabilities assigned thereto relating to (a) the probability of each transition occurring and (b) the respective probability of producing each label at various transitions. The Markov model, or Markov source, has been described in various articles such as "A Maximum Likelihood Approach to Continuous Speech Recognition", *EEE Transactions on Pattern*

*Analysis and Machine Intelligence*, volume PAMI-5, Number 2, March 1983, by L. R. Bahl, F. Jelinek, and R. L. Mercer.

One speech recognition approach which employs the generated labels and Markov model phone machines involves acoustics—as noted above. Acoustic matching is moderately effective. However, acoustic matching normally requires considerable computation.

Hence, a computationally inexpensive methodology which could be used instead of, or in conjunction with, the acoustic matching is a desired end. Polling employs Markov model phone machines and labels generated in response to a given uttered script to achieve this end.

3. Prior and Contemporaneous Art Pertaining to Total Scores

Projections regarding the potential market for effective word (and more particularly, speech) recognition equipment have been reported in various publications. Predictions ranging from tens of millions to billions of dollars per year have been suggested for speech recognition equipment alone. Accordingly, there have been significant efforts directed toward producing an effective speech recognition system which can translate words selected from a large vocabulary, e.g. on the order of 5000 words or more.

One conventional technique involves the forming of templates, one for each word. Uttered speech is then matched against the templates to determine which template best fits the speech. To account for variations in word utterances from one time to the next, such systems have included dynamic time warping or stretching and adjusting to fit patterns to stored templates.

In performing speech recognition based on templates, acoustic matching, or other methodologies—one major goal has been to increase the accuracy of the word selected without requiring excessive computation time. The present invention through this third aspect addresses this goal.

SUMMARY OF THE INVENTION

1. Summary of Approximate Acoustic Matching

In accordance with the present invention, a linguistic decoder is provided which facilitates the determination of which word or words in a vocabulary have the highest probability of producing a particular string of labels. To achieve this object, the present invention features apparatus and method for performing a statistical match of words to labels with a number of approximations that expedite the matching determination without introducing undesired loss in accuracy. In addition, the present invention relates to apparatus and method wherein words having similar phonetic beginnings are matched against the incoming labels simultaneously for so long as the words have similar respective phonetic beginnings.

In noting the approximations embodied in the invention, it should be recognized that the invention models each vocabulary word as a sequence of phones. Each phone is represented by a phone machine. Each phone machine is precisely characterized as having (a) a plurality of states, (b) transitions from state to state and a probability associated with each transition, and (c) an actual output probability that a given label is produced by a given phone machine at a given transition—each phone machine (corresponding to a given phone) defining the probability that a given label is generated at a given transition thereof. It is possible to determine match scores for words based on these characteristics, however the number of computations is high.

In accordance with the present invention, preferably each phone machine is simplified by replacing the actual label probability for each label at all transitions in a given phone machine with a specific replacement value. The specific replacement value is preferably selected so that the match value for a given phone with the replacement value included is an overestimation of the match value achieved by the detailed match where the replacement values do not replace the actual label probabilities. One way of assuring this condition is by selecting each replacement value so that no probability corresponding to a given label in a given phone machine is greater than the replacement value thereof. By substituting the actual label probabilities in a phone machine with corresponding replacement values, the number of required computations in determining a match score for a word is reduced greatly. Moreover, since the replacement value is preferably an overestimation, the resulting match score is not less than would have previously been determined without the replacement. Accordingly, the object of reducing computation without eliminating likely candidate words is achieved.

Another approximation relates to an additional factor that enters into the determination of a match score between a word and a string of labels, namely a label length distribution associated with each particular phone machine. That is, for each phone machine, there is a probability distribution that each number of labels contained between a minimum $L_{min}$ and a maximum number of labels $L_{max}$ is produced by the particular phone machine. To further facilitate and reduce computation in accordance with the invention, the label length probability distribution (between the minimum length and maximum length of labels) is considered uniform so that the probability of each length of labels (between $L_{min}$ and $L_{max}$) is the same.

As an additional refinement, the present invention includes a limitation on the number of labels examined by the phone machines in order to determine a match value between a corresponding word and a string of incoming labels. This added feature achieves the objects of reducing decoding delay and reducing inequalities arising from comparing match scores for words of different lengths.

Furthermore, it is an object of the invention to derive a list of candidate words by means of a basic fast match (which approximates actual label probabilities for each label in a given phone with a respective replacement value) or an alternative fast match (which also approximates label length probabilities with a specified value for a given phone) wherein the candidate words are processed by successive detailed match phone machines and/or a language model in order to arrive at a single word and, as appropriate, some possible alternative words.

In achieving the object of processing the beginnings of words simultaneously, the present invention defines words or portions thereof as phonetic baseforms arranged in a tree structure. Each baseform, it is noted, is represented by a sequence of phones each of which has its own phone machine corresponding thereto. For each baseform, a sequence of phone machines extends from the root of the tree. For so long as two or more baseforms have similar phonetic beginnings starting from the root, a common branch of phone machines is provided therefor. Two or more baseforms can thereby be selected or eliminated as candidate words by simultaneously processing them through the same phone machines at the same time for so long as the baseforms have similar beginnings. The object of reducing computation without loss in accuracy is thereby further achieved.

In a preferred form, the invention relates to performing an acoustic match in a linguistic decoder wherein each phone machine therein is characterized as having (a) a plurality of states and transition paths between states, (b) transitions $tr(S_j/S_i)$ having probabilities $T(i \rightarrow j)$ each of which represents the probability of a transition of a state $S_j$ given a current state $S_i$ where $S_i$ and $S_j$ may be the same state or different states, and (c) actual label probabilities wherein each actual label probability $p(y_k|i \rightarrow j)$ indicates the probability that a label $y_k$ is produced by a given phone machine at a given transition from one state to a subsequent state where k is a label identifying notation; each phone machine including (a) means for assigning to each $y_k$ in said each phone machine a single specific value $p'(y_k)$ and (b) means for replacing each actual output probability $p(y_k|i \rightarrow j)$ at each transition in a given phone machine by the single specific value $p'(y_k)$ assigned to the corresponding $y_k$. Preferably, the replacement value is at least as great as the maximum actual label probability for the corresponding $y_k$ label at any transition in a particular phone machine.

The foregoing and other objects, features and advantages of the invention will be apparent from the more particular description of the preferred embodiments of the invention, as illustrated in the accompanying drawings.

2. Summary of Polling

The present invention also teaches another method of reducing the number of words that may be recognized as the correct next word. That is, the present invention relates to a polling method wherein a table is set up in which each label in the alphabet provides a "vote" for each word in the vocabulary. The vote reflects the likelihood that given word has produced a given label. The votes are computed from the label output probability and transition probability statistics derived during a training session.

In accordance with one embodiment of the invention, when a string of labels is generated by an acoustic processor, a subject word is selected. From the vote table, each label in the string is identified and the vote of each label corresponding to the subject word is determined. All votes of the labels for the subject word are accumulated and combined to provide a likelihood score. Repeating the process for each word in the vocabulary results in likelihood scores for each word. A list of likely candidate words may be derived from the likelihood scores.

In a second embodiment, a second table is also formed which includes a penalty that each label has for each word in the vocabulary. A penalty assigned to a given label indicates the likelihood of a word not producing the given label. In the second embodiment, both label votes and penalties are considered in determining the likelihood score for a given word based on a string of labels.

In order to account for length, the likelihood scores are preferably scaled based on the number of labels considered in evaluating a likelihood score for a word.

Moreover, when the end time for a word is not defined along the string of generated labels, the present invention provides that likelihood scores be computed at successive time intervals so that a subject word may have a plurality of successive likelihood scores associated therewith. The invention further provides that the best likelihood score for the subject word—when compared relative to the likelihood scores of preferably all the other words in the vocabulary—is assigned to the subject word.

In accordance with the invention, a method is taught for selecting likely words from a vocabulary of words wherein each word is represented by a sequence of at least one probabilistic finite state phone machine and wherein an acoustic processor generates acoustic labels in response to a spoken input. The method comprises the step of: (a) forming a first table in which each label in the alphabet provides a vote for each word in the vocabulary, each label vote for a subject word indicating the likelihood of the subject word producing the label providing the vote. Further, the method preferably comprises the steps of: (b) forming a second table in which each label is assigned a penalty for each word in the vocabulary, the penalty assigned to a given label for a given word being indicative of the likelihood of the given label not being produced according to the model for the given word; and (c) for a given string of labels, determining the likelihood of a particular word which includes the step of combining the votes of all labels in the string for the particular word together with the penalties of all labels not in the string for the particular word.

Still further the method preferably comprises the additional step of: (d) repeating steps (a), (b), and (c) for all words as the particular word in order to provide a likelihood score for each word.

If desired, the methodology discussed above is employed in conjunction with the approximate acoustic matching techniques discussed herein.

The present polling technique provides a fast, computationally simple, effective technique for determining which words in a vocabulary have a relatively high likelihood of corresponding to a string of acoustic labels generated by an acoustic processor.

3. Summary Of Generating Total Combined Word Scores

The present invention is also directed to achieving high speed, accurate speech (or word) recognition by providing a plurality of independent algorithms and, for each word in a vocabulary, deriving a distinct word score according to each algorithm. The plural word scores for a given word are combined to yield a total score which is compared to the respective total scores derived for the other words in the vocabulary to determine relative likelihood. The use of the total scores—rather than word scores from a single algorithm—results in enhanced accuracy with no significant increase in computational requirements.

The fast acoustic match algorithm involves making approximations which result in altering the statistics of the Markov models from those generated during a training period. Use of the approximated statistics permits acoustic matching to be performed with a reduced number of computations and with computations which are iterative. according to the fast match algorithm, each word in the vocabulary is assigned a likelihood score that is evaluated based on the approximated statistics.

The words having fast match scores that are relatively high form an ordered list of candidate words. The candidate words are then subjected to a detailed acoustic match in which computations are made based on the statistics generated during training (before any approximations are applied).

A second algorithm, the detailed match algorithm, involves deriving word scores based on the statistics determined during training (with no approximations applied thereto). In one mode of the invention, each word in the vocabulary may be subjected to the detailed match to determine a respective word score. In other modes of the invention, the detailed match may be applied to only certain words in the vocabulary—such as the candidate words selected according to the fast match algorithm.

A third algorithm involves polling. In polling, speech is converted into a string of labels, or symbols. Specifically, an alphabet of labels is defined and, for each interval of speech, a label is selected based on some predefined characteristic or characteristics of speech. Each word in a vocabulary is defined as a sequence of Markov "phone" models. Each Markov "phone" model has a plurality of transitions and label probabilities at some of the transitions. Each label probability represents the probability of a given phone model producing a given label (or label output) at a given transition of the given phone model, the probabilities being determined from data accumulated during a training session. Based on the label probabilities in each phone model included in a subject word, a vote of the corresponding label for the subject word is determined. In addition, a penalty is also assigned to each label for each subject word. Accordingly, each label has a vote and, optionally, a penalty for each word in the vocabulary. When a string of labels is generated in response to the utterance of unknown speech, the votes and penalties of each label for a word are combined to provide a polling score for the word. In accordance with this third algorithm, each word in the vocabulary has a polling word score determined therefor.

In accordance with the present invention, a plurality of word scores derived from at least two independent algorithms are combined to provide an enhanced total word score. In this context, independent algorithms include (a) the polling algorithm and an acoustic matching algorithm (e.g., the fast match algorithm or detailed match algorithm) and (b) the fast match algorithm and the detailed match algorithm wherein, preferably, a different set of Markov models is used in each.

As a further object of the invention, each component of the total word score is preferably weighted relative to other component(s) thereof. In this regard it is noted that the total word score, although described preferably as the combination of two independent word scores, may be a combination of more than two independent word scores.

With regard to those modes of the invention embodying the fast match algorithm, it is noted that the fast match word scores may serve a dual function. First, the fast match word scores may be used in forming a shortened list of candidate words, and second, as a component in determining a total word score. Stated otherwise, the present invention exploits data used in forming a candidate list for the additional purpose of forming a combined total word score.

Based on test data, it has been found that the use of a total word score—generated by combining a fast match word score based on a baseform made of a first type of Markov models with a detailed match word score based on a baseform made of a second type of Markov models—results in a 30% to 50% error rate improvement over a speech recognition system which simply applies a detailed match to candidate words derived by a fast match algorithm.

BRIEF DESCRIPTION OF THE DRAWINGS

FIGS. 14(a) through (e) are diagrams which show the interrelationship between phones, a label string, and start and end times determined in the matching procedure.

FIG. 19 is an illustration showing successive steps of stack decoding.

FIG. 27 through FIG. 31 and FIG. 33 through FIG. 36 are flowcharts showing how acoustic matching is performed.

FIG. 39 is a graph illustrating the number of times each phone produced each label during training.

FIG. 40 is an illustration showing the sequence of phones constituting each of two words.

FIG. 41 is a graph illustrating the expected number of counts for a word for each label.

FIG. 42 is a table showing the vote of each label for each word.

FIG. 49 is a block diagram illustrating one structural embodiment in which a total word score is derived from a detailed match word score and a fast match word score.

FIG. 50 is a structural block diagram in which apparatus for generating fast match word scores and apparatus for generating polling word scores operate together in generating total word scores.

DESCRIPTION OF A PREFERRED EMBODIMENT OF THE INVENTION (I) Speech Recognition System Environment A. General Description In FIG. 1, a general block diagram of a speech recognition system 1000 is illustrated. The system 1000 includes a stack decoder 1002 to which are connected an acoustic processor (AP) 1004, an array processor 1006 used in performing a fast approximate acoustic match, an array processor 1008 used in performing a detailed acoustic match, a language model 1010, and a work station 1012.

The acoustic processor 1004 is designed to transform a speech waveform input into a string of labels, or fenemes, each of which in a general sense identifies a corresponding sound type. In the present system, the acoustic processor 1004 is based on a unique model of the human ear and is described in the above-mentioned application entitled "Nonlinear Signal Processing in a Speech Recognition System".

Figure 2:
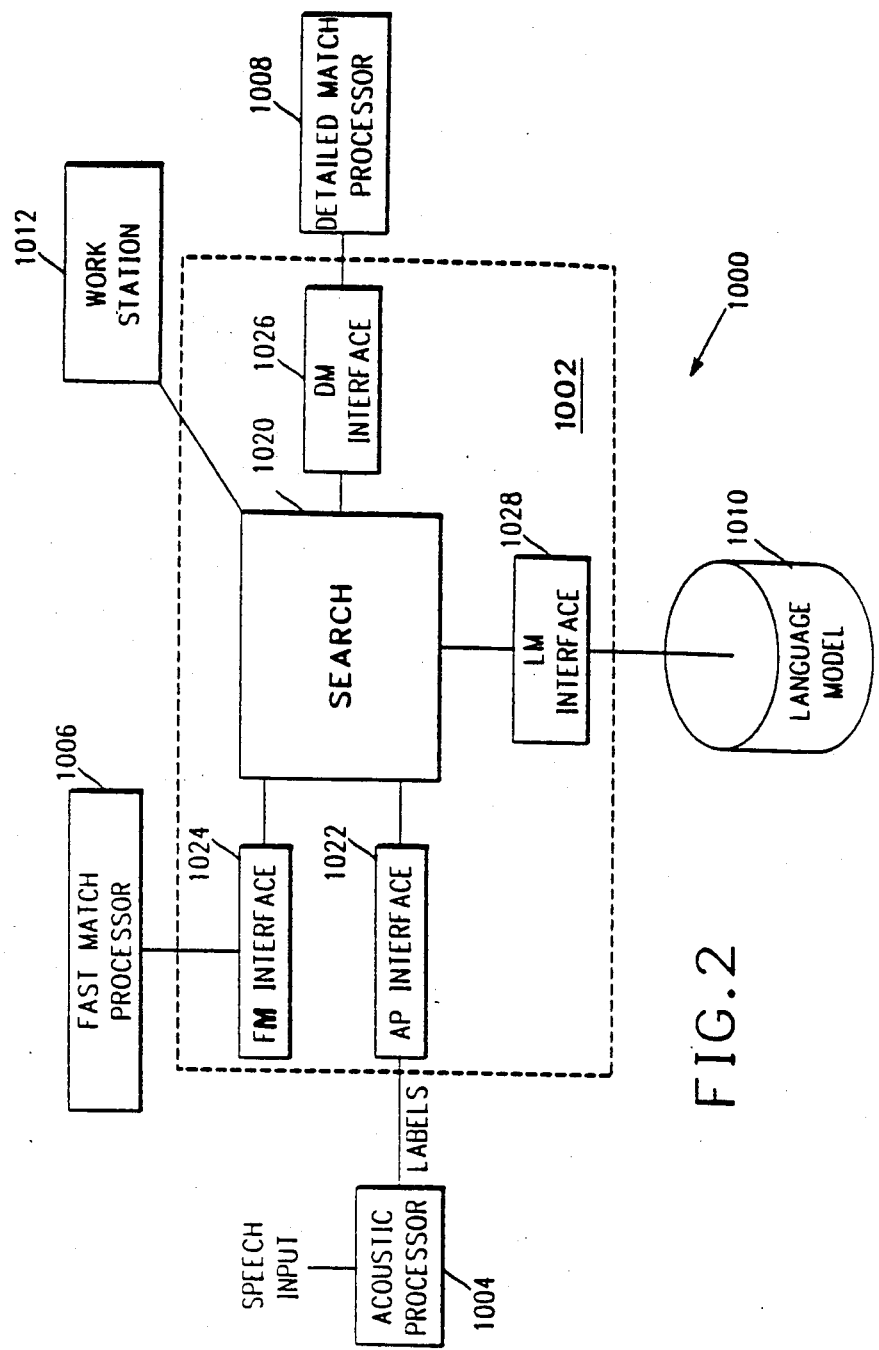
FIG. 2 is a block diagram of the system environment of FIG. 1 wherein the stack decoder is shown in greater detail.

The labels, or fenemes, from the acoustic processor 1004 enter the stack decoder 1002. In a logic sense, the stack decoder 1002 may be represented by the elements shown in FIG. 2. That is, the stack decoder 1002 includes a search element 1020 which communicates with the work station 1012 and which communicates with the acoustic processor process, the fast match processor process, the detailed match process, and the language model process through respective interfaces 1022, 1024, 1026, and 1028.

In operation, fenemes from the acoustic processor 1004 are directed by the search element 1020 to the fast match processor 1006. The fast match procedure is described hereinbelow as well as in the application entitled "Apparatus and Method for Performing Acoustic Matching". Briefly, the object of matching is to determine the most likely word (or words) for a given string of labels.

The fast match is designed to examine words in a vocabulary of words and to reduce the number of candidate words for a given string of incoming labels. The fast match is based on probabilistic finite state machines, also referred to herein as Markov models.

Once the fast match reduces the number of candidate words, the stack decoder 1002 communicates with the language model 1010 which determines the contextual likelihood of each candidate word in the fast match candidate list based preferably on existing tri-grams.

Preferably, the detailed match examines those words from the fast match candidate list which have a reasonable likelihood of being the spoken word based on the language model computations. The detailed match is discussed in the above-mentioned application entitled "Apparatus and Method for Performing Acoustic Matching". The detailed match is performed by means of Markov model phone machines such as the machine illustrated in FIG. 3.

After the detailed match, the language model is, preferably, again invoked to determine word likelihood. A stack decoder 1002—using information derived from the fast matching, detailed matching, and applying the language model—is designed to determine the most likely path, or sequence, of words for a string of generated labels.

Two prior art approaches for finding the most likely word sequence are Viterbi decoding and single stack decoding. Each of these techniques are described in the article entitled "A Maximum Likelihood Approach to Continuous Speech Recognition." Viterbi decoding is described in section V and single stack decoding in section VI of the article.

In the single stack decoding technique, paths of varying length are listed in a single stack according to likelihood and decoding is based on the single stack. Single stack decoding must account for the fact that likelihood is somewhat dependent on path length and, hence, normalization is generally employed.

The Viterbi technique does not require normalization and is generally practical for small tasks.

As another alternative, decoding may be peformed with a small vocabulary system by examining each possible combination of words as a possible word sequence and determining which combination has the highest probability of producing the generated label string. The computational requirements for this technique become impractical for large vocabulary systems.

The stack decoder 1002, in effect, serves to control the other elements but does not perform many computations. Hence, the stack decoder 1002 preferably includes a 4341 running under the IBM VM/370 operating system as described in publications such as *Virtual*

*Machine/System Product Introduction Release* 3 (1983). The array processors which perform considerable computation have been implemented with Floating Point System (FPS) 190L's, which are commercially available.

A novel technique which includes multiple stacking and a unique decision strategy for determining the best word sequence, or path, has been invented by L. R. Bahl, F. Jelinek, and R. L. Mercer and is discussed hereinbelow in section J.

Figure 4:
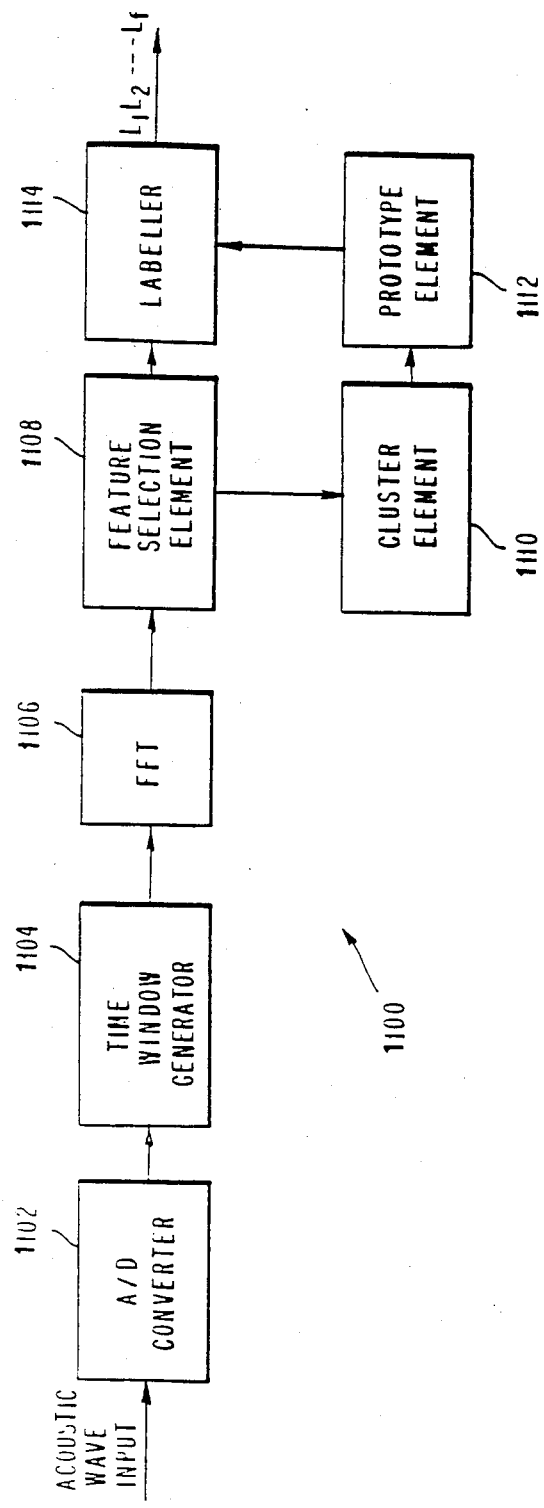
FIG. 4 is an illustration depicting the elements of an acoustic processor.

B. The Auditory Model and Implementation Thereof in an Acoustic Processor of a Speech Recognition System In FIG. 4 a specific embodiment of an acoustic processor 1100, as described above, is illustrated. An acoustic wave input (e.g., natural speech) enters an analog-to-digital converter 1102 which samples at a prescribed rate. A typical sampling rate is one sample every 50 microseconds. To shape the edges of the digital signal, a time window generator 1104 is provided. The output of the window 1104 enters a fast Fourier transform (FFT) element 1106 which provides a frequency spectrum output for each time window.

The output of the FFT element 1106 is then processed to produce labels $y_1 y_2 \cdots y_f$. Four elements—a feature selection element 1108, a cluster element 1110, a prototype element 1112, and a labeller 1114—coact to generate the labels. In generating the labels, prototypes are defined as points (or vectors) in the space based on selected features and acoustic inputs, are then characterized by the same selected features to provide corresponding points (or vectors), in space that can be compared to the prototypes.

Specifically, in defining the prototypes, sets of points are grouped together as respective clusters by cluster element 1110. Methods for defining clusters have been based on probability distributions—such as the Gaussian distribution—applied to speech. The prototype of each cluster—relating to the centroid or other characteristic of the cluster—is generated by the prototype element 1112. The generated prototypes and acoustic input—both characterized by the same selected features—enter the labeller 1114. The labeller 1114 performs a comparing procedure which results in assigning a label to a particular acoustic input.

The selection of appropriate features is a key factor in deriving labels which represent the acoustic (speech) wave input. The presently described acoustic processor includes an improved feature selection element 1108. In accordance with the present acoustic processor, an auditory model is derived and applied in an acoustic processor of a speech recognition system. In explaining the auditory model, reference is made to FIG. 5.

Figure 5:
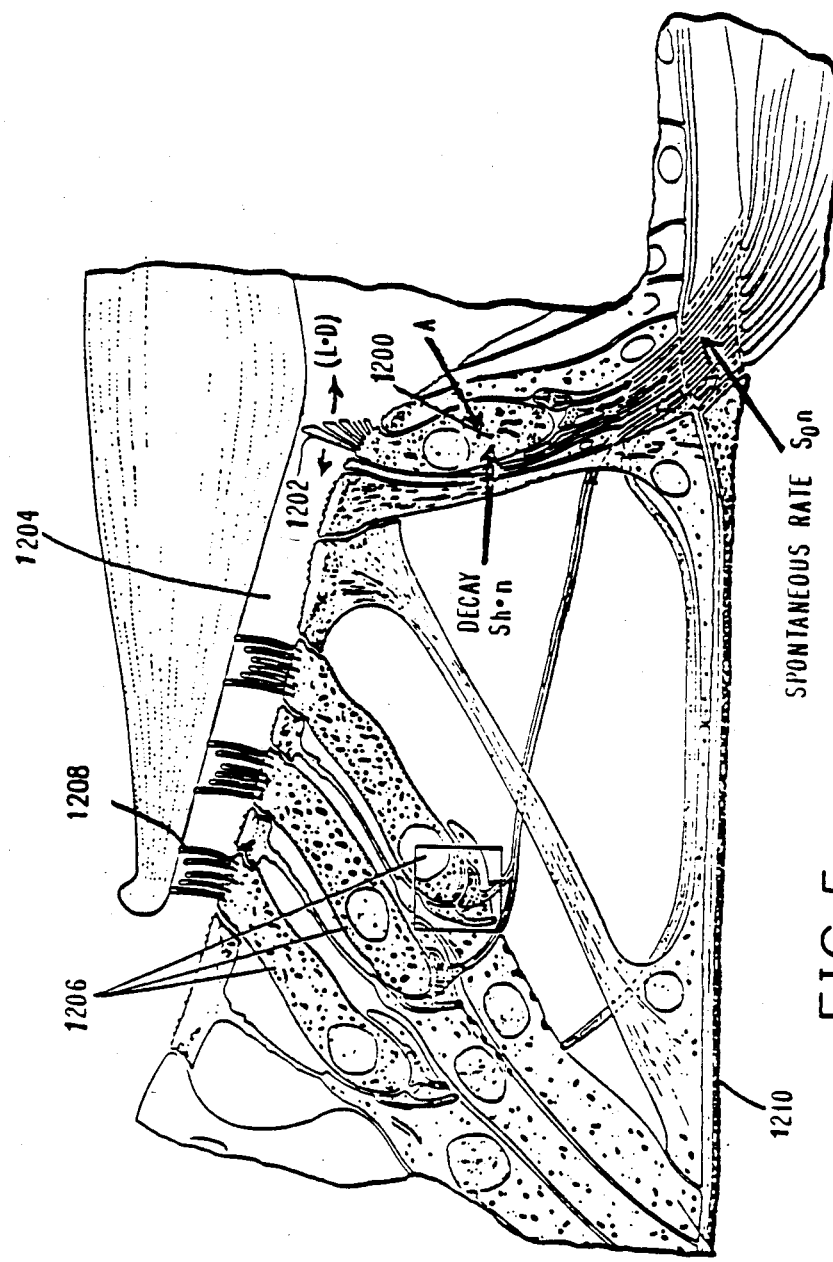
FIG. 5 is an illustration of a typical human ear indicating where components of an acoustic model are defined.

FIG. 5 shows part of the inner human ear. Specifically, an inner hair cell 1200 is shown with end portions 1202 extending therefrom into a fluid-containing channel 1204. Upstream from inner hair cells are outer hair cells 1206 also shown with end portions 1208 extending into the channel 1204. Associated with the inner hair cell 1200 and outer hair cells 1206 are nerves which convey information to the brain. Specifically, neurons undergo electrochemical changes which result in electrical impulses being conveyed along a nerve to the brain for processing. Effectuation of the electrochemical changes, is stimulated by the mechanical motion of the basilar membrane 1210.

It has been recognized, in prior teachings, that the basilar membrane 1210 serves as a frequency analyzer for acoustic waveform inputs and that portions along the basilar membrane 1210 respond to respective critical frequency bands. That different portions of the basilar membrane 1210 respond to corresponding frequency bands has an impact on the loudness perceived for an acoustic waveform input. That is, the loudness of tones is perceived to be greater when two tones are in different critical frequency bands than when two tones of similar power intensity occupy the same frequency band. It has been found that there are on the order of twenty-two critical frequency bands defined by the basilar membrane 1210.

Conforming to the frequency-response of the basilar membrane 1210, the present acoustic processor 1100 in its preferred form physically defines the acoustic waveform input into some or all of the critical frequency bands and then examines the signal component for each defined critical frequency band separately. This function is achieved by appropriately filtering the signal from the FFT element 1106 (see FIG. 5) to provide a separate signal in the feature selection element 1108 for each examined critical frequency band.

The separate inputs, it is noted, have also been blocked into time frames (of preferably 25.6 msec) by the time window generator 1104. Hence, the feature selection element 1108 preferably includes twenty-two signals—each of which represents sound intensity in a given frequency band for one frame in time after another.

Figure 6:
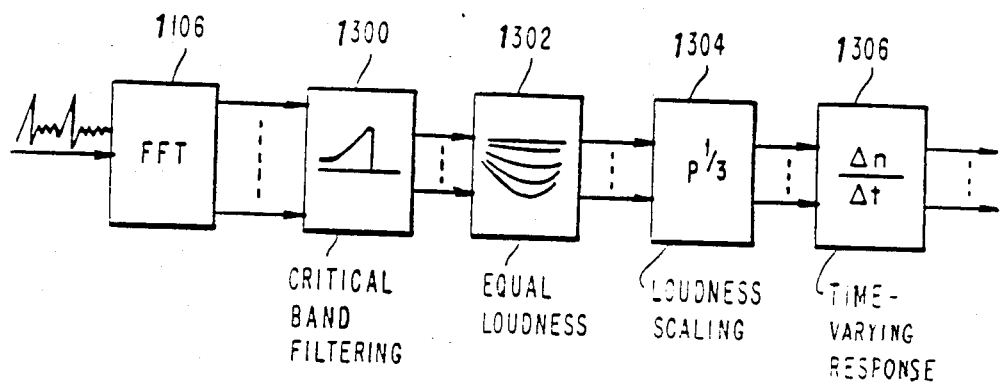
FIG. 6 is a block diagram showing portions of the acoustic processor.

The filtering is preferably performed by a conventional critical band filter 1300 of FIG. 6. The separate signals are then processed by an equal loudness converter 1302 which accounts for perceived loudness variations as a function of frequency. In this regard, it is noted that a first tone at a given dB level at one frequency may differ in perceived loudness from a second tone at the same given dB level at a second frequency. The converter 1302 can be based on empirical data, converting the signals in the various frequency bands so that each is measured by a similar loudness scale. For example, the converter 1302 preferably map from acoustic power to equal loudness based on studies of Fletcher and Munson in 1933, subject to certain modifications. The modified results of these studies are depicted in FIG. 5. In accordance with FIG. 5, a 1 KHz tone at 40 dB is comparable in loudness level to a 100 Hz tone at 60 dB as shown by the X in the figure.

The converter 1302 adjusts loudness preferably in accordance with the contours of FIG. 5 to effect equal loudness regardless of frequency.

In addition to dependence on frequency, power changes and loudness changes do not correspond as one looks at a single frequency in FIG. 5. That is, variations in the sound intensity, or amplitude, are not at all points reflected by similar changes in perceived loudness. For example, at 100 Hz, the perceived change in loudness of a 10 dB change at about 110 dB is much larger than the perceived change in loudness of a 10 dB change at 20 dB. This difference is addressed by a loudness scaling element 1304 which compresses loudness in a predefined fashion. Preferably, the loudness scaling element compresses power P by a cube-root factor to $P^{\frac{1}{3}}$ by replacing loudness amplitude measure in phons by sones.

Figure 7:
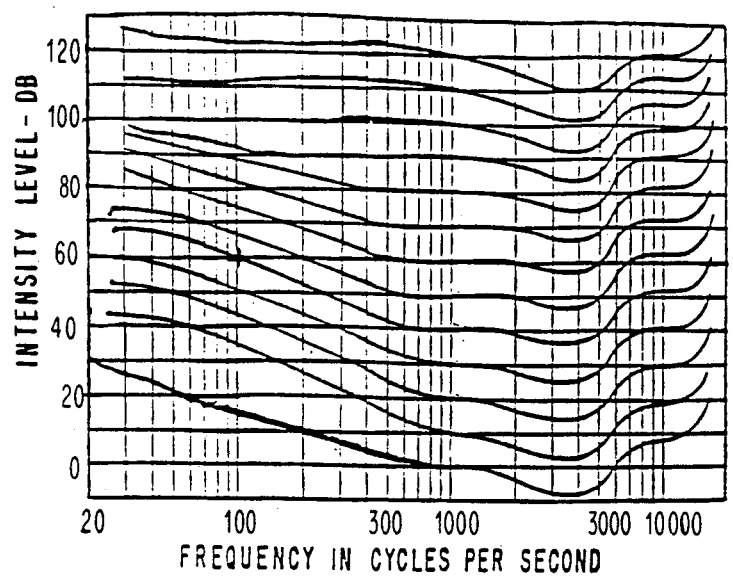
FIG. 7 is a graph showing sound intensity versus frequency, the graph being used in the design of the acoustic processor.
Figure 8:
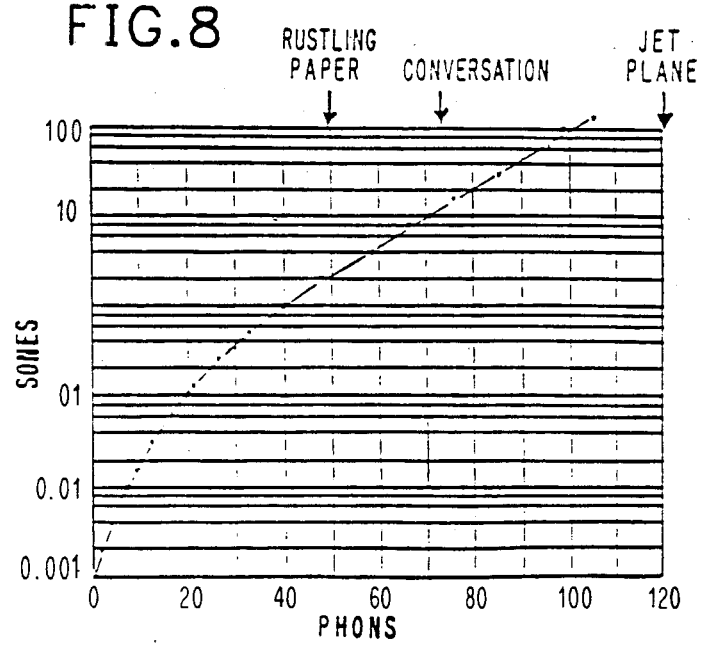
FIG. 8 is a graph showing the relationship between sones and phons.

FIG. 7 illustrates a known representation of phons versus sones determined empirically. By employing sones, the present model remains substantially accurate at large speech signal amplitudes. One sone, it should be recognized, has been defined as the loudness of a 1 KHz tone at 40 dB.

Referring again to FIG. 6, a novel time varying response element 1306 is shown which acts on the equal loudness, loudness scaled signals associated with each critical frequency band. Specifically, for each frequency band examined, a neural firing rate f is determined at each time frame. The firing rate f is defined in accordance with the present processor as:

$$f = (So + DL)n \qquad (1)$$

where n is an amount of neurotransmitter; So is a spontaneous firing constant which relates to neural firings independent of acoustic waveform input; L is a measurement of loudness; and D is a displacement constant. (So)n corresponds to the spontaneous neural firing rate which occurs whether or not there is an acoustic wave input and DLn corresponds to the firing rate due to the acoustic wave input.

Significantly, the value of n is characterized by the present acoustic processor as changing over time according to the relationship:

$$dn/dt = Ao - (So + Sh + DL)n \qquad (2)$$

where Ao is a replenishment constant and Sh is a spontaneous neurotransmitter decay constant. The novel relationship set forth in equation (2) takes into account that neurotransmitter is being produced at a certain rate (Ao) and is lost (a) through decay (Sh×n), (b) through spontaneous firing (So×n), and (c) through neural firing due to acoustic wave input (DL×n) The presumed locations of these modelled phenomena are illustrated in FIG. 5.

Equation (2) also reflects the fact that the present acoustic processor is non-linear in that the next amount of neurotransmitter and the next firing rate are dependent multiplicatively on the current conditions of at least the neurotransmitter amount. That is, the amount of neurotransmitter at time (t+Δt) is equal to the amount of neurotransmitter at time t plus dn/dtΔt, or:

$$n(t+\Delta t) = n(t) + dn/dt \Delta t \qquad (3)$$

Equations (1), (2), and (3) describe a time varying signal analyzer which, it is suggested, addresses the fact that the auditory system appears to be adaptive over time, causing signals on the auditory nerve to be non-linearly related to acoustic wave input. In this regard, the present acoustic processor provides the first model which embodies non-linear signal processing in a speech recognition system, so as to better conform to apparent time variations in the nervous system.

In order to reduce the number of unknowns in equations (1) and (2), the present acoustic processor uses the following equation (4) which applies to fixed loudness L:

$$So + Sh + DL = 1/T \qquad (4)$$

T is a measure of the time it takes for an auditory response to drop to 37% of its maximum after an audio wave input is generated. T, it is noted, is a function of loudness and is, according to the present acoustic processor, derived from existing graphs which display the decay of the response for various loudness levels. That is, when a tone of fixed loudness is generated, it generates a response at a first high level after which the response decays toward a steady condition level with a time constant T. With no acoustic wave input, $T=T_0$ which is on the order of 50 msec. For a loudness of $L_{max}$, $T=T_{max}$ which is on the order of 30 msec. By setting Ao=1, 1/(So+Sh) is determined to be 5 csec, when L=0. When L is $L_{max}$ and $L_{max}=20$ sones, equation (5) results:

$$So + Sn + D(20) = 1/30 \qquad (5)$$

With the above data and equations, So and Sh are defined by equations (6) and (7) as:

$$So = DL_{max}/(R + (DL_{max}T_oR) - 1) \qquad (6)$$

$$Sh = 1/T_o - So \qquad (7)$$

where $$R = \frac{f_{steady\ state}|\ L = L_{max}}{f_{steady\ state}|\ L = 0} \qquad (8)$$

$f_{steady\ state}|$ represents the firing rate at a given loudness when dn/dt is zero.

R, it is noted, is the only variable left in the acoustic processor. Hence, to alter the performance of the processor, only R is changed. R, that is, is a single parameter which may be adjusted to alter performance which, normally, means minimizing steady state effects relative to transient effects. It is desired to minimize steady state effects because inconsistent output patterns for similar speech inputs generally result from differences in frequency response, speaker differences, background noise, and distortion which affect the steady state portions of the speech signal but not the transient portions. The value of R is preferably set by optimizing the error rate of the complete speech recognition system. A suitable value found in this way is R=1.5. Values of So and Sh are then 0.0888 and 0.11111 respectively, with D being derived as 0.00666.

Figure 9:
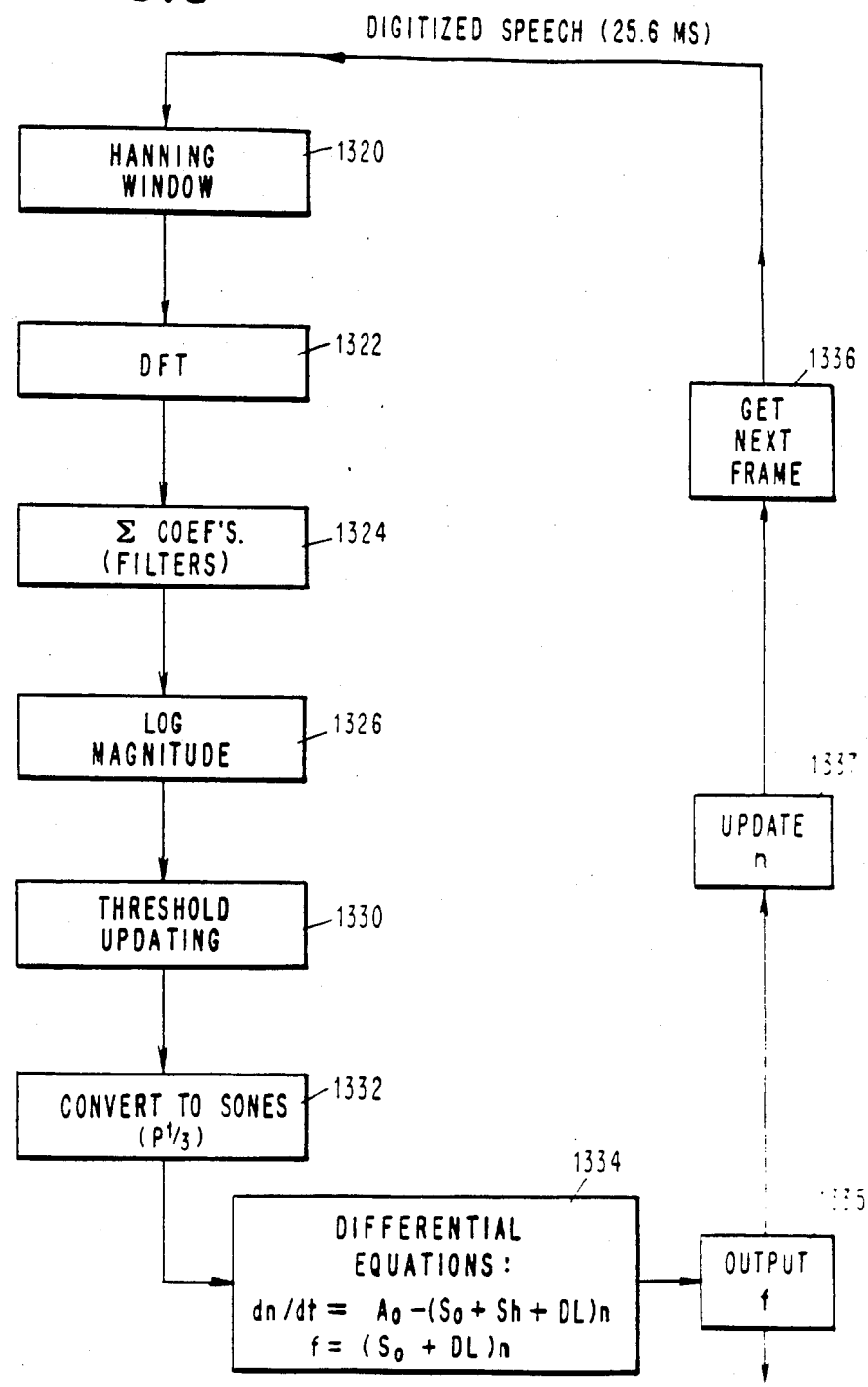
FIG. 9 is a flowchart representation showing how sound is characterized according to the acoustic processor of FIG. 4.

Referring to FIG. 9, a flowchart of the present acoustic processor is depicted. Digitized speech in a 25.6 msec time frame, sampled at preferably 20 KHz passes through a Hanning Window 1320 the output from which is subject to a Fourier Transform 1322, taken at preferably 10 msec intervals. The transform output is filtered by element 1324 to provide a power density output for each of at least one frequency band—preferably all the critical frequency bands or at least twenty thereof. The power density is then transformed from log magnitude 1326 to loudness level. This is readily performed according to the modified graph of FIG. 7. The process outlined hereafter which includes threshold up-dating of step 1330 is depicted in FIG. 10.

Figure 10:
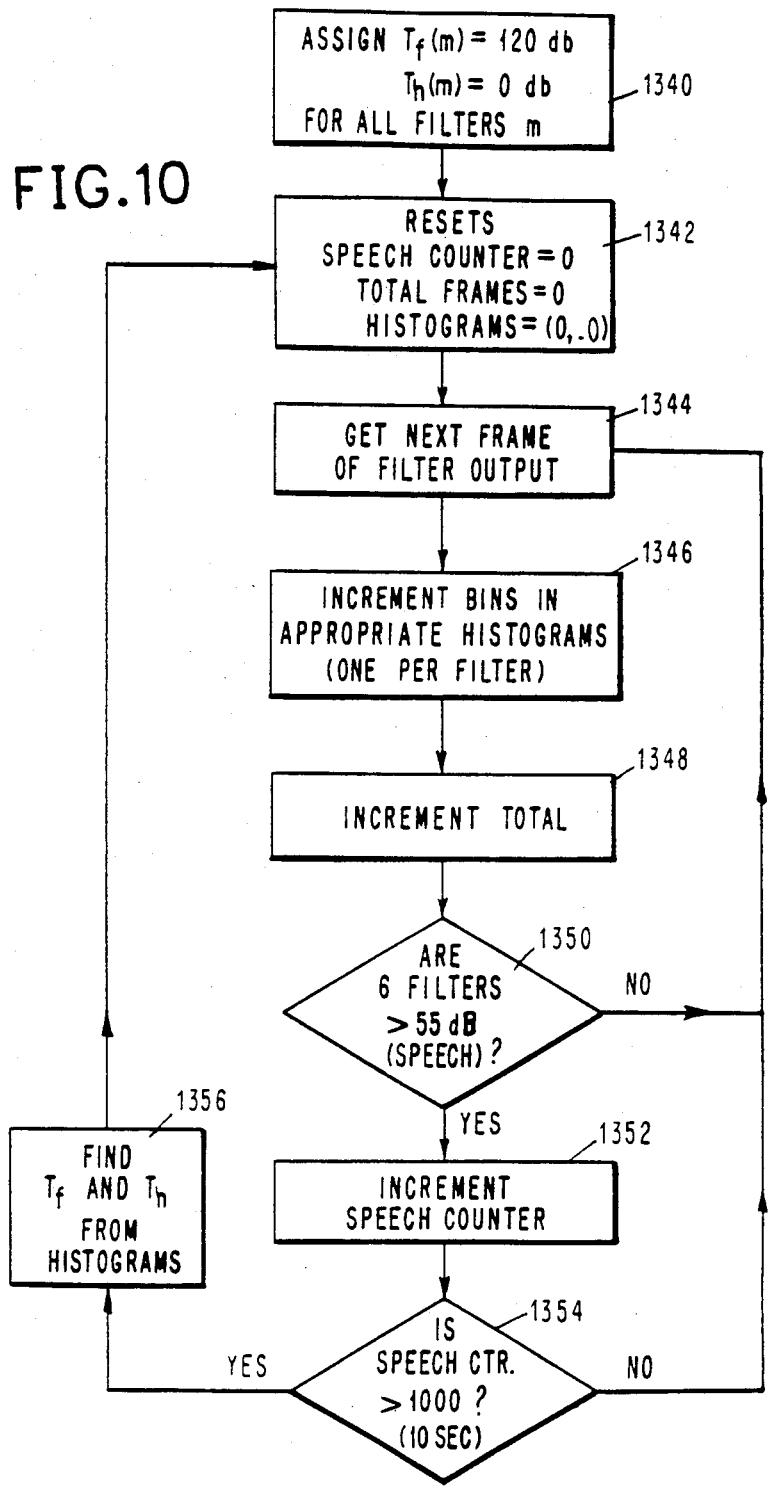
FIG. 10 is a flowchart representation showing how thresholds are up-dated in FIG. 9.

In FIG. 10, a threshold-of-feeling $T_f$ and a threshold-of-hearing $T_h$ are initially defined (at step 1340) for each filtered frequency band m to be 120 dB and 0 dB respectively. Thereafter, a speech counter, total frames register, and a histogram register are reset at step 1342.

Each histogram includes bins, each of which indicates the number of samples or counts during which power or some similar measure—in a given frequency band—is in a respective range. A histogram in the present instance preferably represents—for each given frequency band—the number of centiseconds during which loudness is in each of a plurality of loudness ranges. For example, in the third frequency band, there may be twenty centiseconds between 10 dB and 20 dB in power. Similarly, in the twentieth frequency band, there may be one hundred fifty out of a total of one thousand centiseconds between 50 dB and 60 dB. From the total number of samples (or centiseconds) and the counts contained in the bins, percentiles are derived.

A frame from the filter output of a respective frequency band is examined at step 1344 and bins in the appropriate histograms—one per filter—are incremented at step 1346. The total number of bins in which the amplitude exceeds 55 dB are summed for each filter (i.e. frequency band) at step 1348 and the number of filters indicating the presence of speech is determined. If there is not a minimum of filters (e.g. six of twenty) to suggest speech, the next frame is examined at step 1344. If there are enough filters to indicate speech at step 1350, a speech counter is incremented at step 1352. The speech counter is incremented at step 1352 until 10 seconds of speech have occurred at step 1354 whereupon new values for $T_f$ and $T_h$ are defined for each filter at step 1356.

The new $T_f$ and $T_h$ values are determined for a given filter as follows. For $T_f$, the dB value of the bin holding the 35th sample from the top of 1000 bins (i.e. the 96.5th percentile of speech) is defined as $BIN_H$. $T_f$ is then set as:

$$T_f = BIN_H + 40 \text{ dB}.$$

For $T_h$, the dB value of the bin holding the (0.01)(TOTAL BINS-SPEECH COUNT)th value from the lowest bin is defined as $BIN_L$. That is, $BIN_L$ is the bin in the histogram which is 1% of the number of samples in the histogram excluding the number of samples classified as speech. $T_h$ is then defined as: $T_h = BIN_L - 30 \text{ dB}$.

Returning to FIG. 9, the sound amplitudes are converted to sones and scaled based on the updated thresholds (steps 1330 and 1332) as described hereinbefore. An alternative method of deriving sones and scaling is by taking the filter amplitudes "a" (after the bins have been incremented) and converting to dB according to the expression:

$$a^{dB} = 20 \log_{10}(a) - 10 \qquad (9)$$

Each filter amplitude is then scaled to a range between 0 and 120 to provide equal loudness according to the expression:

$$a^{eq1} = 120(a^{dB} - T_h)/(T_f - T_h) \qquad (10)$$

$a^{eq1}$ is then preferably converted from a loudness level (phons) to an approximation of loudness in sones (with a 1 KHz signal at 40 dB mapping to 1) by the expression:

$$L^{dB} = (a^{eq1} - 30)/4 \qquad (11)$$

Loudness in sones is then approximated as:

$$L_s(\text{appr}) = 10(L^{dB})/20 \qquad (12)$$

The loudness in sones $L_s$ is then provided as input to the equations (1) and (2) at step 1334 to determine the output firing rate f for each frequency band (step 1335). With twenty-two frequency bands, a twenty-two dimension vector characterizes the acoustic wave inputs over successive time frames. Generally, however, twenty frequency bands are examined by employing a conventional mel-scaled filter bank.

Prior to processing the next time frame (step 1336), the next state of n is determined in accordance with equation (3) in step 1337.

The acoustic processor hereinbefore described is subject to improvement in applications where the firing rate f and neurotransmitter amount n have large DC pedestals. That is, where the dynamic range of the terms of the f and n equations is important, the following equations are derived to reduce the pedestal height.

In the steady state, and in the absence of an acoustic wave input signal (L=0), equation (2) can be solved for a steady-state internal state n':

$$n' = A/(So + Sh) \qquad (13)$$

The internal state of the neurotransmitter amount n(t) can be represented as a steady state portion and a varying portion:

$$n(t) = n' + n''(t) \qquad (14)$$

Combining equations (1) and (14), the following expression for the firing rate results:

$$f(t) = (So + D \times L)(n' + n''(t)) \qquad (15)$$

The term $So \times n'$ is a constant, while all other terms include either the varying part of n or the input signal represented by $(D \times L)$. Future processing will involve only the squared differences between output vectors, so that processing will involve only the squared differences between output vectors, so that constant terms may be disregarded. Including equation (13) for n', we get $$f'(t) = (So + D \times L) \times ((n''(t) + D \times L \times A)/(So + Sh)) \qquad (16)$$

Considering equation (3), the next state becomes:

$$n(t + \Delta t) = n'(t + \Delta t) + n''(t + \Delta t) \qquad (17)$$

$$= n''(t) + A - (So + Sh + D \times L) \times (n' + n''(t)) \qquad (18)$$

$$= n''(t) - (Sh \times n''(t) - (So + Ao \times L^A)n''(t) - \qquad (19)$$

$$(Ao \times L^A \times D)/(So + Sh) + Ao - ((So \times Ao) + (Sh \times Ao))/(So + Sh)$$

This equation (19) may be rewritten, ignoring all constant terms, as:

$$n''(t + \Delta t) = n''(t)(1 - So\Delta t) - f'(t) \qquad (20)$$

Equations (15) and (20) now constitute the output equations and state-update equations applied to each filter during each 10 millisecond time frame. The result of applying these equations is a 20 element vector each 10 milliseconds, each element of the vector corresponding to a firing rate for a respective frequency band in the mel-scaled filter bank.

Approximately 200 prototype vectors are previously defined, each prototype vector having a predefined value for each vector element. In addition, each prototype vector is identified by a respective label.

When a 10 millisecond internal is examined and the 20 firing rates therefor are formed into an output vector, the output vector is compared against each prototype vector. The label for the "closest" prototype vector is then assigned to the time interval. Various known techniques may be employed in measuring the vector distances.

With respect to the embodiment set forth immediately hereinabove, the flowchart of FIG. 9 applies except that the equations for f, dn/dt, and n(t+1) are replaced by equations (11) and (16) which define special case expressions for firing rate f and next state n (t+Δt) respectively.

It is to be noted that the values attributed to the terms in the various equations (namely $t_o=5$ csec, $t_{Lmax}=3$ csec, $A_o=1$, $R=1.5$, and $L_{max}=20$) may be set otherwise and the terms So, Sh, and D may differ from the preferable derived values of 0.0888, 0.11111, and 0.00666, respectively, as other terms are set differently.

The present acoustic model has been practiced using the PL/I programming language with Floating Point Systems FPS 190L hardware, however may be practiced by various other software or hardware approaches.

C. Detailed Match

Figure 3:
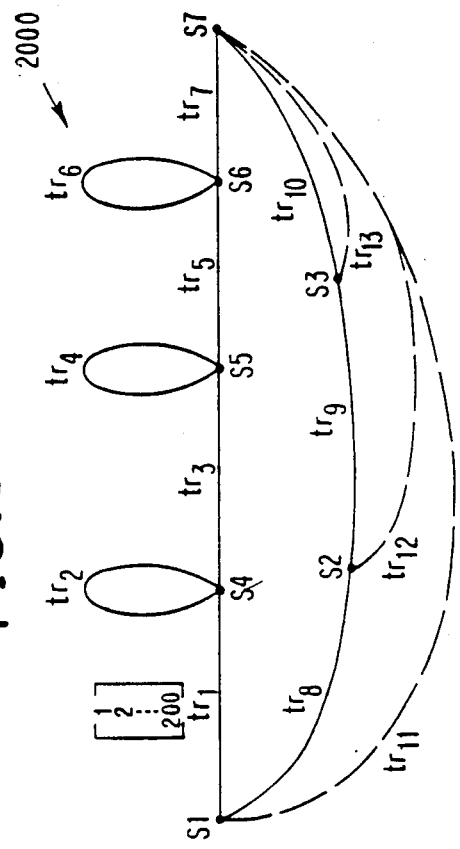
FIG. 3 is an illustration of a detailed match phone machine which is identified in storage and represented therein by statistics obtained during a training session.

In FIG. 3, a sample detailed match phone machine 2000 is depicted. Each detailed match phone machine is a probabilistic finite-state machine characterized by (a) a plurality of states $S_i$, (b) a plurality of transitions $tr(S_j|S_i)$, some of the transitions extending between different states and some extending from a state back to itself, each transition having associated therewith a corresponding probability, and (c) for each label that can be generated at a particular transition, a corresponding actual label probability.

In FIG. 3, seven states $S_1$ through $S_7$ are provided and thirteen transitions tr1 through tr13 are provided in the detailed match phone machine 2000. A review of FIG. 3 shows that phone machine 2000 has three transitions with dashed line paths, namely transitions tr11, tr12, and tr13. At each of these three transitions, the phone can change from one state to another without producing a label and such a transition is, accordingly, referred to as a null transition. Along transitions tr1 through tr10 labels can be produced. Specifically, along each transition tr1 through tr10, one or more labels may have a distinct probability of being generated thereat. Preferably, for each transition there is a probability associated with each label that can be generated in the system. That is, if there are two hundred labels that can be selectively generated by the acoustic channel, each transition (that is not a null) has two hundred "actual label probabilities" associated therewith—each of which corresponds to the probability that a corresponding label is generated by the phone at the particular transition. The actual label probabilities for transition tr1 are represented by the symbol p followed by the bracketed column of numerals 1 through 200, each numeral representing a given label. For label 1, there is a probability p[1] t the detailed phone machine 2000 generates the label 1 at transition tr1. The various actual label probabilities are stored with relation to the label and a corresponding transition.

When a string of labels $y_1y_2y_3$ - - - is presented to a detailed match phone machine 2000 corresponding to a given phone, a match procedure is performed. The procedure associated with the detailed match phone machine is explained with reference to FIG. 11.

Figure 11:
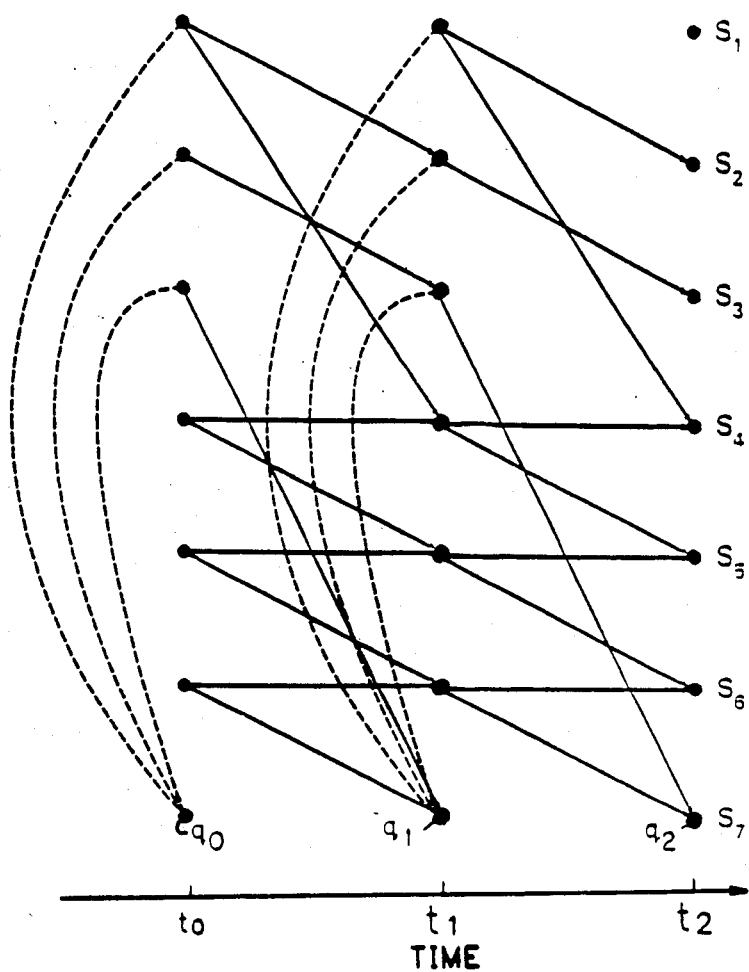
FIG. 11 is a trellis diagram, or lattice, of a detailed match procedure.

FIG. 11 is trellis diagram of the phone machine of FIG. 3. As in the phone machine, the trellis diagram shows a null transition from state $S_1$ to state $S_7$ and transitions from state $S_1$ to state $S_2$ and from state $S_1$ to state $S_4$. The transitions between other states are also illustrated. The trellis diagram also shows time measured in the horizontal direction. Start-time probabilities $q_0$ and $q_1$ represent the probabilities that a phone has a start time at time $t=t_0$ or $t=t_1$, respectively, for the phone. At each start time $t_0$ and $t_1$, the various transitions are shown. It should be noted, in this regard, that the interval between successive start (and end) times is preferably equal in length to the time interval of a label.

In employing the detailed match phone machine 2000 to determine how closely a given phone matches the labels of an incoming string, an end-time distribution for the phone is sought and used in determining a match value for the phone. The notion of relying on the end-time distribution is common to all embodiments of phone machines discussed herein relative to a matching procedure. In generating the end-time distribution to perform a detailed match, the detailed match phone machine 2000 involves computations which are exact and complicated.

Looking at the trellis diagram of FIG. 11, we first consider the computations required to have both a start time and end time at time $t=t_0$. For this to be the case according to the example phone machine structure set forth in FIG. 3, the following probability applies:

$$Pr(S_7, t=t_0) = q_0 \times T(1 \rightarrow 7) + Pr(S_2, t=t_0) \times T(2 \rightarrow 7) + Pr(S_3, t=t_0) \times T(3 \rightarrow 7) \quad (21)$$

where Pr represents "probability of" and T represents the transition probability between the two parenthetically identified states. The above equation indicates the respective probabilities for the three conditions under which the end time can occur at time $t=t_0$. Moreover, it is observed that the end time at $t=t_0$ is limited in the current example to occurrence at state $S_7$.

Looking next at the end time $t=t_1$, it is noted that a calculation relating to every state other than state $S_1$ must be made. The state $S_1$ starts at the end time of the previous phone. For purposes of explanation, only the calculations pertaining to state $S_4$ are set forth.

For state $S_4$, the calculation is:

$$Pr(S_4, t=t_1) = Pr(S_1, t=t_0) \times T(1 \rightarrow 4) \times Pr(y_1|1 \rightarrow 4) + Pr(S_4, t=t_0) \times T(4 \rightarrow 4) \times Pr(y_1|4 \rightarrow 4) \quad (22)$$

In words, the equation (22) set forth immediately above indicates that the probability of the phone machine being in state $S_4$ at time $t=t_1$ is dependent on the sum of the following two terms (a) the probability of being at states $S_1$ at time $t=t_0$ multiplied by the probability (T) of the transition from state $S_1$ to state $S_4$ multiplied further by the probability (Pr) of a given label $y_1$ being generated given a transition from state $S_1$ to state $S_4$ and (b) the probability of being at state $S_4$ at time $t=t_0$ multiplied by the probability of the transition from state $S_4$ to itself and further multiplied by the probability of generating the given label $y_1$ during and given the transition from state $S_4$ to itself.

Similarly, calculations pertaining to the other states (excluding state $S_1$) are also performed to generate corresponding probabilities that the phone is at a particular state at time $t=t_1$. Generally, in determining the probability of being at a subject state at a given time, the detailed match (a) recognizes each previous state that has a transition which leads to the subject state and the respective probability of each such previous state; (b) recognizes, for each such previous state, a value representing the probability of the label that must be generated at the transition between each such previous state and the current state in order to confirm to the label string; and (c) combines the probability of each previous state and the respective value representing the label probability to provide a subject state probability over a corresponding transition. The overall probability of being at the subject state is determined from the subject state probabilities over all transitions leading thereto. The calculation for state $S_7$, it is noted, includes terms relating to the three null transitions which permit the phone to start and end at time $t=t_1$ with the phone ending in state $S_7$.

As with the probability determinations relative to times $t=t_0$ and $t=t_1$, probability determinations for a series of other end times are preferably generated to form an end-time distribution. The value of the end-time distribution for a given phone provides an indication of how well the given phone matches the incoming labels.

In determining how well a word matches a string of incoming labels, the phones which represent the word are processed in sequence. Each phone machine generates an end-time distribution of probability values. A match value for the phone machine is obtained by summing up the end-time probabilities and then taking the logarithm of that sum. A start-time distribution for the next phone machine is derived by normalizing the end-time distribution by, for example, scaling each value thereof by dividing each value by the sum so that the sum of scaled values totals one.

It should be realized that there are at least two methods of determining h, the number of phones to be examined for a given word or word string. In a depth first method, computation is made along a baseform—computing a running subtotal with each successive phone. When the subtotal is found to be below a predefined threshold for a given phone position therealong, the computation terminates. Alternatively, in a breadth first method, a computation for similar phone positions in each word is made. The computations following the first phone in each word, the second phone in each word, and so on are made. In the breadth first method, the computations along the same number of phones for the various words are compared at the same relative phone positions therealong. In either method, the word(s) having the largest sum of match values is the sought object.

The detailed match has been implemented in APAL (Array Processor Assembly Language) which is the native assembler for the Floating Point Systems, Inc. 190L.

It should be recognized that the detailed match requires considerable memory for storing each of the actual label probabilities (i.e., the probability that a given phone generates a given label y at a given transition); the transition probabilities for each phone machine; and the probabilities of a given phone being at a given state at a given time after a defined start time. The abovenoted FPS 190L is set up to make the various computations of end times, match values based on, for example, a sum—preferably the logarithmic sum of end time probabilities; start times based on the previously generated end time probabilities; and word match scores based on the match values for sequential phones in a words. In addition, the detailed match preferably accounts for "tail probabilities" in the matching procedure. A tail probability measures the likelihood of successive labels without regard to words. In a simple embodiment, a given tail probability corresponds to the likelihood of a label following another label. This likelihood is readily determined from strings of labels generated by, for example, some sample speech.

Hence, the detailed match provides sufficient storage to contain baseforms, statistics for the Markov models, and tail probabilities. For a 5000 word vocabulary where each word comprises approximately ten phones, the baseforms have a memory requirement of $5000 \times 10$. Where there are 70 distinct phones (with a Markov model for each phone) and 200 distinct labels and ten transitions at which any label has a probability of being produced, the statistics would require $70 \times 10 \times 200$ locations. However, it is preferred that the phone machines are divided into three portions—a start portion, a middle portion, and a end portion—with statistics corresponding thereto. (The three self-loops are preferably included in successive portions.) Accordingly, the storage requirements are reduced to $70 \times 3 \times 200$. With regard to the tail probabilities, $200 \times 200$ storage locations are needed. In this arrangement, 50K integer and 82K floating point storage performs satisfactorily.

It should be noted that the detailed match may be implemented by using fenemic, rather than phonetic, phones. Appendix 1 provides a program listing that corresponds to the main computational kernel of a fenemic detailed match. The routine in Appendix 1 extends a lattice—which corresponds to a fenemic baseform of a current word—forward in time by a single time step. The subroutine EXTLOOP is the main loop. Therefore, the pipeline is started up and partial computations needed for the main loop are performed. After the main loop, partial computations remaining in the computational pipeline are emptied.

D. Basic Fast Match

Because the detailed match is computationally expensive, a basic fast match and an alternative fast match which reduces the computation requirements with some moderate sacrifice in accuracy is provided. The fast match is preferably used in conjunction with the the detailed match, the fast match listing likely candidate words from the vocabulary, and the detailed match being performed on, at most, the candidate words on the list.

A fast approximate acoustic matching technique is the subject of the co-pending patent application entitled "Apparatus and Method of Performing Acoustic Matching". In the fast approximate acoustic match, preferably each phone machine is simplified by replacing the actual label probability for each label at all transitions in a given phone machine with a specific replacement value. The specific replacement value is preferably selected so that the match value for a given phone when the replacement values are used is an overestimation of the match value achieved by the detailed match when the replacement values do not replace the actual label probabilities. One way of assuring this condition is by selecting each replacement value so that no probability corresponding to a given label in a given phone machine is greater than the replacement value thereof. By substituting the actual label probabilities in a phone machine with corresponding replacement values, the number of required computations in determining a match score for a word is reduced greatly. Moreover, since the replacement value is preferably an overestimation, the resulting match score is not less than would have previously been determined without the replacement.

In a specific embodiment of performing an acoustic match in a linguistic decoder with Markov models, each phone machine therein is characterized—by training—to have (a) a plurality of states and transition paths between states, (b) transitions $tr(S_j|S_i)$ having probabilities $T(i{\rightarrow}j)$ each of which represents the probability of a transition to a state $S_j$ given a current state $S_i$ where $S_i$ and $S_j$ may be the same state or different states, and (c) actual label probabilities wherein each actual label probability $p(y_k|i{\rightarrow}j)$ indicates the probability that a label $y_k$ is produced by a given phone machine at a given transition from one state to a subsequent state where k is a label identifying notation; each phone machine including (a) means for assigning to each $y_k$ in said each phone machine a single specific value $p'(y_k)$ and (b) means for replacing each actual output probability $p(y_k|i{\rightarrow}j)$ at each transition in a given phone machine by the single specific value $p'(y_k)$ assigned to the corresponding $y_k$. Preferably, the replacement value is at least as great as the maximum actual label probability for the corresponding $y_k$ label at any transition in a particular phone machine. The fast match embodiments are employed to define a list of on the order of ten to one hundred candidate words selected as the most likely words in the vocabulary to correspond to the incoming labels. The candidate words are preferably subjected to the language model and to the detailed match. By paring the number of words considered by the detailed match to on the order of 1% of the words in the vocabulary, the computational cost is greatly reduced while accuracy is maintained.

The basic fast match simplifies the detailed match by replacing with a single value the actual label probabilities for a given label at all transitions at which the given label may be generated in a given phone machine. That is, regardless of the transition in a given phone machine whereat a label has a probability of occurring, the probability is replaced by a single specific value. The value is preferably an overestimate, being at least as great as the largest probability of the label occurring at any transition in the given phone machine.

By setting the label probability replacement value as the maximum of the actual label probabilities for the given label in the given phone machine, it is assured that the match value generated with the basic fast match is at least as high as the match value that would result from employing the detailed match. In this way, the basic fast match typically overestimates the match value of each phone so that more words are generally selected as candidate words. Words considered candidates according to the detailed match also pass muster in accordance with the basic fast match.

Figure 12:
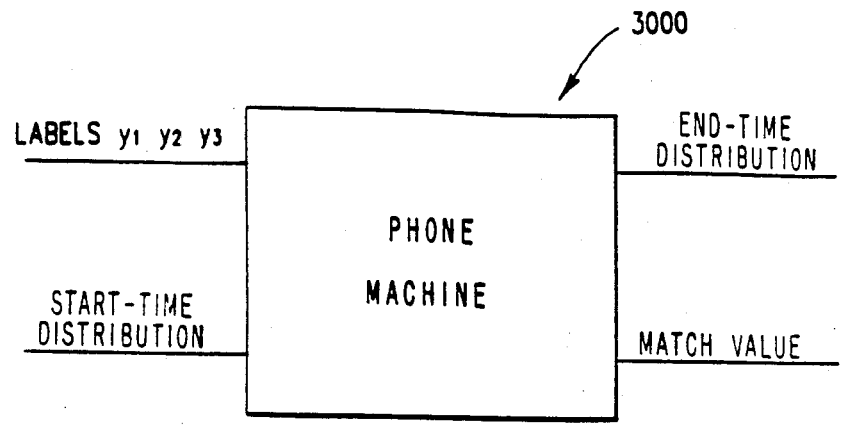
FIG. 12 is a diagram depicting a phone machine used in performing matching.

Referring to FIG. 12, a phone machine 3000 for the basic fast match is illustrated. Labels (also referred to as symbols and fenemes) enter the basic fast match phone machine 3000 together with a start-time distribution. The start-time distribution and the label string input is like that entering the detailed match phone machine described hereinabove. It should be realized that the start time may, on occasion, not be a distribution over a plurality of times but may, instead, represent a precise time—for example following an interval of silence—at which the phone begins. When speech is continuous, however, the end-time distribution is used to define the start-time distribution (as is discussed in greater detail hereinbelow). The phone machine 300 generates an end-time distribution and a match value for the particular phone from the generated end-time distribution. The match score for a word is defined as the sum of match values for component phones—at least the first h phones in the word.

Figure 13:
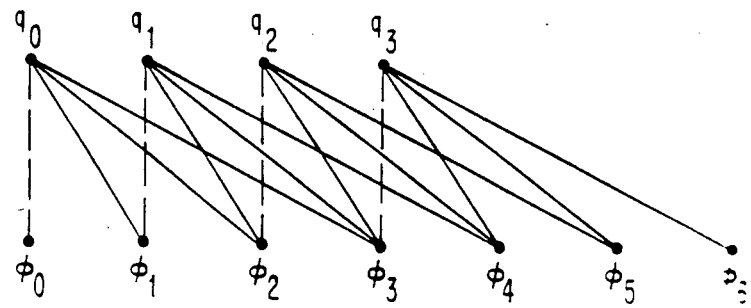
FIG. 13 is a time distribution diagram used in a matching procedure having certain imposed conditions.

Referring now to FIG. 13, a diagram of a basic fast match computation is illustrated. The basic fast match computation is only concerned with the start-time distribution, the number—or length of labels—produced by the phone, and the replacement values $p'_{y_k}$ associated with each label $y_k$. By substituting all actual label probabilities for a given label in a given phone machine by a corresponding replacement value, the basic fast match replaces transition probabilities with length distribution probabilities and obviates the need for including actual label probabilities (which can differ for each transition in a given phone machine) and probabilities of being at a given state at a given time.

In this regard, the length distributions are determined from the detailed match model. Specifically, for each length in the length distribution, the procedure preferably examines each state individually and determines for each state the various transition paths by which the currently examined state can occur (a) given a particular label length and (b) regardless of the outputs along the transitions. The probabilities for all transition paths of the particular length to each subject state are summed and the sums for all the subject states are then added to indicate the probability of a given length in the distribution. The above procedure is repeated for each length. In accordance with the preferred form of the matching procedure, these computations are made with reference to a trellis diagram as is known in the art of Markov modelling. For transition paths which share branches along the trellis structure, the computation for each common branch need be made only once and is applied to each path that includes the common branch.

In the diagram of FIG. 13, two limitations are included by way of example. First, it is assumed that the length of labels produced by the phone can be zero, one, two, or three having respective probabilities of $l_0$, $l_1$, $l_2$, and $l_3$. The start time is also limited, permitting only four start times having respective probabilities of $q_0$, $q_1$, $q_2$, and $q_3$. With these limitations, the following equations define the end-time distribution of a subject phone as:

$\Phi_0 = q_0 l_0$
$\Phi_1 = q_1 l_0 + q_0 l_1 p_1$
$\Phi_2 = q_2 l_0 + q_1 l_1 p_2 + q_0 l_2 p_1 p_2$
$\Phi_3 = q_3 l_0 + q_2 l_1 p_3 + q_1 l_2 p_2 p_3 + q_0 l_3 p_1 p_2 p_3$
$\Phi_4 = q_3 l_1 p_4 + q_2 l_2 p_3 p_4 + q_1 l_3 p_2 p_3 p_4$
$\Phi_5 = q_3 l_2 p_4 p_5 + q_2 l_3 p_3 p_4 p_5$
$\Phi_6 = q_3 l_3 p_4 p_5 p_6$

In examining the equations, it is observed that $\Phi_3$ includes a term corresponding to each of four start times. The first term represents the probability that the phone starts at time $t=t_3$ and produces a length of zero labels—the phone starting and ending at the same time. The second term represents the probability that the phone starts at time $t=t_2$, that the length of labels is one, and that a label 3 is produced by the phone. The third term represents the probability that the phone starts at time $t=t_1$, that the length of labels is two (namely labels 2 and 3), and that labels 2 and 3 are produced by the phone. Similarly, the fourth term represents the probability that the phone starts at time $t=t_0$; that the length of labels is three; and that the three labels 1, 2, and 3 are produced by the phone.

Comparing the computations required in the basic fast match with those required by the detailed match suggest the relative simplicity of the former relative to the latter. In this regard, it is noted that the $p'_{yk}$ value remains the same for each appearance in all the equations as do the label length probabilities. Moreover, with the length and start time limitations, the computations for the later end times become simpler. For example, at $\Phi_6$, the phone must start at time $t=t_3$ and all three labels 4, 5, and 6 must be produced by the phone for that end time to apply.

In generating a match value for a subject phone, the end time probabilities along the defined end-time distribution are summed. If desired, the log of the sum is taken to provide the expression:

$$\text{match value} = \log_{10}(\Phi_0 + - + \Phi_6)$$

As noted previously, a match score for a word is readily determined by summing the match values for successive phones in a particular word.

In describing the generating of the start time distribution, reference is made to FIG. 14. In FIG. 14(a), the word $THE_1$ is repeated, broken down into its component phones. In FIG. 14(b), the string of labels is depicted over time. In FIG. 14(c), a first start-time distribution is shown. The first start-time distribution has been derived from the end-time distribution of the most recent previous phone (in the previous word which may include a "word" of silence). Based on the label inputs and the start-time distribution of FIG. 14(c), the end-time distribution for the phone DH, $\Phi_{DH}$, is generated. The start-time distribution for the next phone, UH, is determined by recognizing the time during which the previous phone end-time distribution exceeded a threshold (A) in FIG. 14(d). (A) is determined individually for each end-time distribution. Preferably, (A) is a function of the sum of the end-time distribution values for a subject phone. The interval between times a and b thus represents the time during which the start-time distribution for the phone UH is set. (See FIG. 14(e).) The interval between times c and d in FIG. 14(e) corresponds to the times between which the end-time distribution for the phone DH exceeds the threshold (A) and between which the start-time distribution of the next phone is set. The values of the start-time distribution are obtained by normalizing the end-time distribution by, for example, dividing each end-time value by the sum of the end-time values which exceed the threshold (A).

The basic fast match phone machine 3000 has been implemented in a Floating Point Systems Inc. 190L with an APAL program. Other hardware and software may also be used to develop a specific form of the matching procedure by following the teachings set forth herein.

E. Alternative Fast Match

The basic fast match employed alone or, preferably, in conjunction with the detailed match and/or a language model greatly reduces computation requirements. To further reduce computational requirements, the present teachings further simplifies the detailed match by defining a uniform label length distribution between two lengths—a minimum length $L_{min}$ and a maximum length $L_{max}$. In the basic fast match, the probabilities of a phone generating labels of a given length—namely $l_0, l_1, l_2$, etc.—typically have differing values. According to the alternative fast match, the probability for each length of labels is replaced by a single uniform value.

Preferably, the minimum length is equal to the smallest length having a nonzero probability in the original length distribution, although other lengths may be selected if desired. The selection of the maximum length is more arbitrary than the selection of the minimum length, but is significant in that the probability of lengths less than the minimum and greater than the maximum are set as zero. By defining the length probability to exist between only the minimum length and the maximum length, a uniform pseudo-distribution can be set forth. In one approach, the uniform probability can be set as the average probability over the pseudo-distribution. Alternatively, the uniform probability can be set as the maximum of the length probabilities that are replaced by the uniform value.

The effect of characterizing all the label length probabilities as equal is readily observed with reference to the equations set forth above for the end-time distribution in the basic fast match. Specifically, the length probabilities can be factored out as a constant.

With $L_{min}$ being set at zero and all length probabilities being replaced by a single constant value, the end-time distribution can be characterized as:

$$\theta_m = \Phi_m/1 = q_m + \theta_{m-1} p_m$$

where "1" is the single uniform replacement value and where the value for $p_m$ corresponds preferably to the replacement value for a given label being generated in the given phone at time m.

For the above equation for $\theta_m$, the match value is defined as:

$$\text{match value} = \log_{10}(\theta_0 + \theta_1 + - + \theta_m) + \log_{10}(1)$$

In comparing the basic fast match and the alternative fast match, it has been found that the number of required additions and multiplications are greatly reduced by employing the alternative fast match phone machines. With $L_{min}=0$, it has been found that the basic fast match requires forty multiplications and twenty additions in that the length probabilities must be considered. With the alternative fast match, $\theta_m$ is determined recursively and requires one multiplication and one addition for each successive $\theta_m$.

Figure 15A:
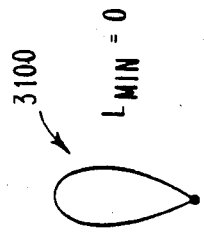
FIG. 15(a) is a diagram showing a particular phone machine of minimum length zero and FIG. 15(b) is a time diagram corresponding thereto.
Figure 15B:
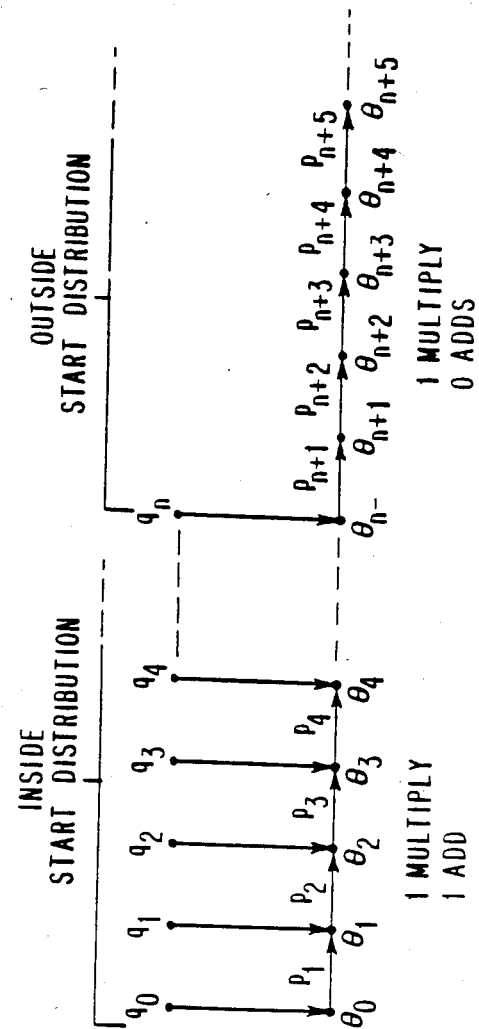

To further illustrate how the alternative fast match simplifies computations, FIG. 15 and FIG. 16 are provided. In FIG. 15(a), a phone machine embodiment 3100 corresponding to a minimum length $L_{min}=0$ is depicted. The maximum length is assumed to the infinite so that the length distribution may be characterized as uniform. In FIG. 15(b), the trellis diagram resulting from the phone machine 3100 is shown. Assuming that start times after $q_n$ are outside the start-time distribution, all determinations of each successive $\theta_m$ with $m<n$ require one addition and one multiplication. For determinations of end times thereafter, there is only one required multiplication and no additions.

Figure 16A:
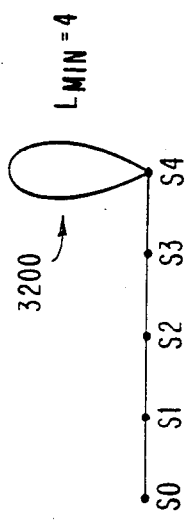
FIG. 16(a) is a phone machine corresponding to a minimum length four and FIG. 16(b) is a time diagram corresponding thereto.
Figure 16B:
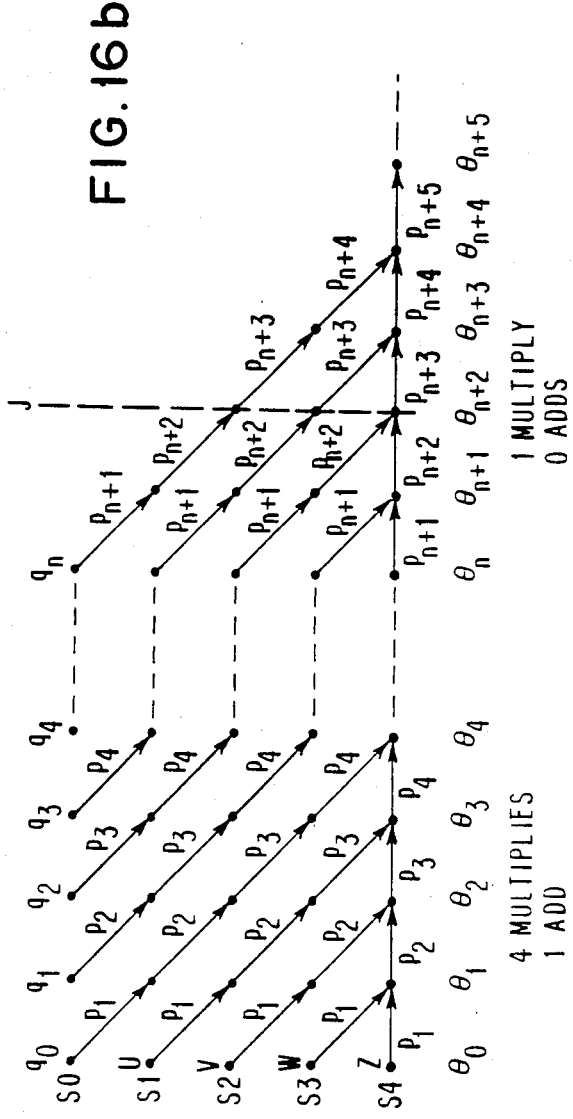

In FIG. 16, $L_{min}=4$. FIG. 16(a) illustrates a specific embodiment of a phone machine 3200 therefor and FIG. 16(b) shows a corresponding trellis diagram. Because $L_{min}=4$, the trellis diagram of FIG. 16(b) has a zero probability along the paths marked u, v, w, and z. For those end times which extend between $\theta_4$ and $\theta_n$, it is noted that four multiplications and one addition is required. For end times greater than n+4, one multiplication and no additions are required. This embodiment has been implemented in APAL code on a FPS 190L.

In Appendix 2, a program listing corresponding to the main computational kernel of the fast (approximate) match is provided. The code corresponds to the case where $L_{min}=4$.

It should be noted that additional states may be added to the FIG. 15 or FIG. 16 embodiments as desired.

F. Matching Based On First J Labels

As a further refinement to the basic fast match and alternative fast match, it is contemplated that only the first J labels of a string which enters a phone machine be considered in the match. Assuming that labels are produced by the acoustic processor of an acoustic channel at the rate of one per centisecond, a reasonable value for J is one hundred. In other words, labels corresponding to on the order of one second of speech will be provided to determine a match between a phone and the labels entering the phone machine. By limiting the number of labels examined, two advantages are realized. First, decoding delay is reduced and, second, problems in comparing the scores of short words with long words are substantially avoided. The length of J can, of course, be varied as desired.

The effect of limiting the number of labels examined can be noted with reference to the trellis diagram of FIG. 16(b). Without the present refinement, the fast match score is the sum of the probabilities of $\theta_m$'s along the bottom row of the diagram. That is, the probability of being at state $S_4$ at each time starting at $t=t_0$ (for $L_{min}=0$) or $t=t_4$ (for $L_{min}=4$) is determined as a $\theta_m$ and all $\theta_m$'s are then totalled. For $L_{min}=4$, there is no probability of being in state $S_4$ at any time before $t_4$. With the refinement, the summing of $\theta_m$'s terminates at time J. In FIG. 16(b), time J corresponds to time $t_{n+2}$.

Terminating the examination of J labels over J time intervals can result in the following two probability summations in determining a match score. First, as described hereinbefore, there is a row calculation along the bottom row of the trellis diagram but only up to the time $J-1$. The probabilities of being in state $S_4$ at each time up to time $J-1$ are summed to form a row score. Second, there is a column score which corresponds to the sum of probabilities that the phone is at each respective state $S_0$ through $S_4$ at time J. That is, the column score is:

$$\text{column score}=\Sigma_{f=0}^{4} Pr(S_f, J)$$

The match score for a phone is obtained by summing the row score and column score and then taking the logarithm of that sum. To continue the fast match for the next phone, the values along the bottom row—preferably including time J—are used to derive the next phone start-time distribution.

After determining a match score for each of b consecutive phones, the total for all phones is, as before noted, the sum of the match scores for all the phones.

In examining the manner in which the end-time probabilities are generated in the basic fast match and alternative fast match embodiments set forth above, it is noted that the determination of column scores does not conform readily to the fast match computations. To better adapt the refinement of limiting the number of labels examined to the fast match and alternative match, the present matching technique provides that the column score be replaced by an additional row score. That is, an additional row score is determined for the phone being at state $S_4$ (in FIG. 16(b)) between times J and $J+K$ where K is the maximum number of states in any phone machine. Hence, if any phone machine has ten states, the present refinement adds ten end times along the bottom row of the trellis for each of which a probability is determined. All the probabilities along the bottom row up to and including the probability at time $J+K$ are added to produce a match score for the given phone. As before, consecutive phone match values are summed to provide a word match score.

This embodiment has been implemented in APAL code on a FPS 190L; however as with other portions of the system may be implemented with other codes on other hardware.

G. Phone Tree Structure and Fast Match Embodiments

By employing the basic fast match or alternative fast match—with or without the maximum label limitation—the computational time required in determining phone match values is tremendously reduced. In addition, the computational savings remain high even when the detailed match is performed on the words in the fast match derived list.

Figure 17:
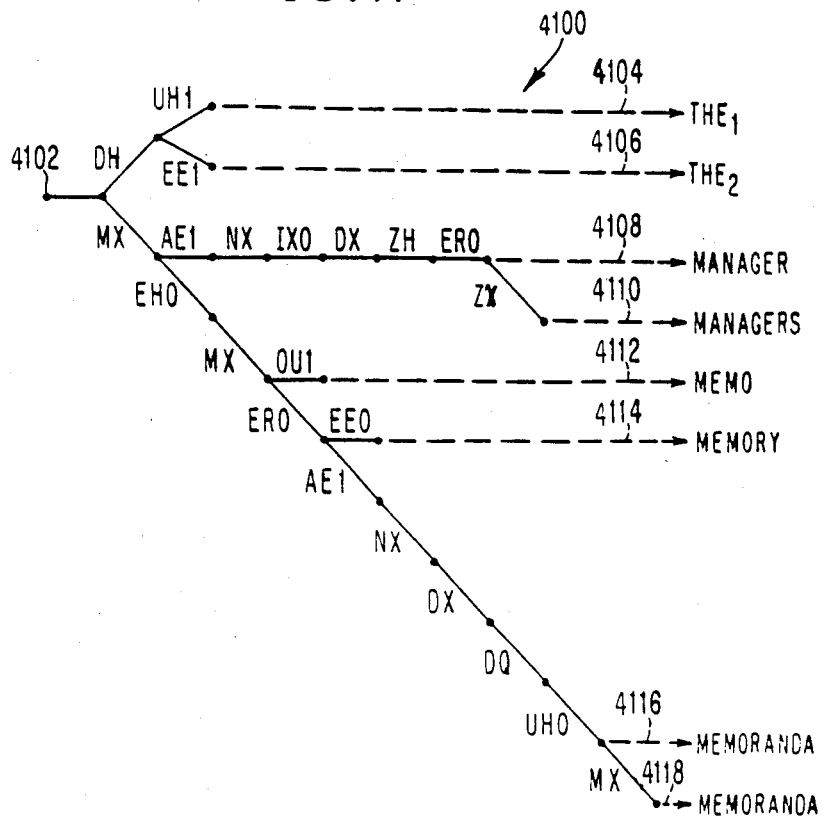
FIG. 17 is a diagram illustrating a tree structure of phones which permit processing of multiple words simultaneously.

The phone match values, once determined, are compared along the branches of a tree structure 4100 as shown in FIG. 17 to determine which paths of phones are most probable. In FIG. 17, the phone match values for DH and UH1 (emanating from point 4102 to branch 4104) should sum to a much higher value for the spoken word "the" than the various sequences of phones branching from the phone MX. In this regard, it should be observed that the phone match value of the first MX phone is computed only once and is then used for each baseform extending therefrom. (See branches 4104 and 4106.) In addition, when the total score calculated along a first sequence of branches is found to be much lower than a threshold value or much lower than the total score for other sequences of branches, all baseforms extending from the first sequence may be simultaneously eliminated as candidate words. For example, baseforms associated with branches 4108 through 4118 are simultaneously discarded when it is determined that MX is not a likely path.

With the fast match embodiments and the tree structure, an ordered list of candidate words is generated with great computational savings.

With regard to storage requirements, it is noted that the tree structure of phones, the statistics for the phones, and tail probabilities are to be stored. With regard to the tree structure, there are 25000 arcs and four datawords characterizing each arc. The first dataword represents an index to successor arcs or phones. The second dataword indicates the number of successor phones along the branch. The third dataword indicates at which node in the tree the arc is located. And the fourth dataword indicates the current phone. Hence, for the tree structure, $25000\times4$ storage spaces are required. In the fast match, there are 100 distinct phones and 200 distinct fenemes. In that a feneme has a single probability of being produced anywhere in a phone, storage for $100\times200$ statistical probabilities is required. Finally, for the tail probabilities, $200\times200$ storage spaces are required. 100K integer and 60K floating point storage is sufficient for the fast match.

H. Language Model

As noted previously, a language model which stores information—such as tri-grams—relating to words in context may be included to enhance the probability of a correct word selection. Language models have been reported in the literature.

The language model 1010, preferably, has a unique character. Specifically, a modified tri-gram method is used. In accordance with this method, a sample text is examined to determine the likelihood of each ordered triplet of words, ordered pair of words, or single words in the vocabulary. A list of the most likely triplets of words and a list of the most likely pairs of words are formed. Moreover, the likelihood of a triplet not being in the triplet list and the likelihood of a pair not being in the pair list are respectively.

In accordance with the language model, when a subject word follows two words, a determination is made as to whether the subject word and the two preceding words are on the triplet list. If so, the stored probability assigned to the triplet is indicated. If the subject word and its two predecessors are not on the triple list, a determination is made as to whether the subject word and its adjacent predecessor are on the pair list. If so, the probability of the pair is multiplied by the probability of a triplet not being on the triplet list, the product then being assigned to the subject word. If the subject word and its predecessor(s) are not on the triplet list or pair list, the probability of the subject word alone is multiplied by the likelihood of a triplet not being on the triplet list and by the probability of a pair not being on the pair list. The product is then assigned to the subject word.

Figure 18:
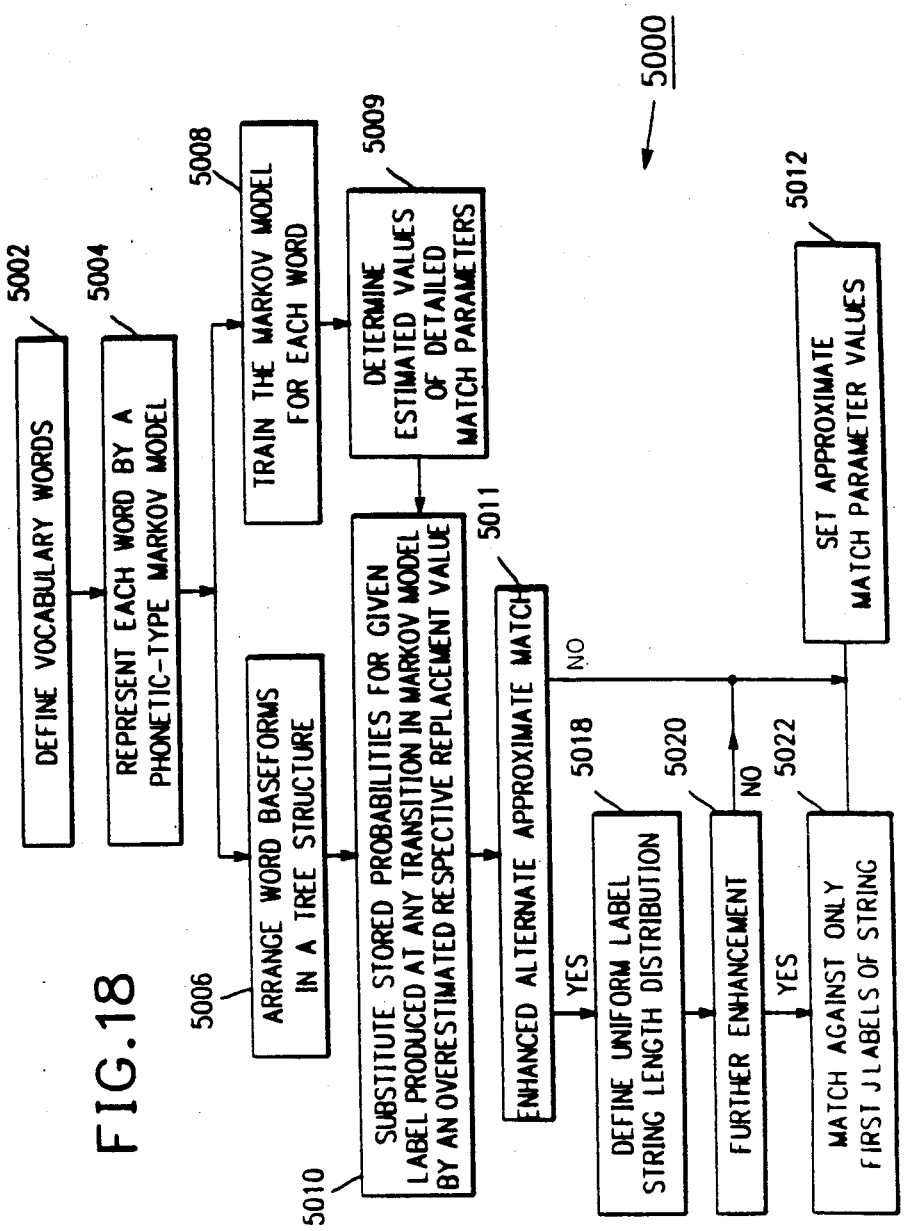
FIG. 18 is a flowchart outlining the steps performed in training phone machines for performing acoustic matching.

Referring to FIG. 18, a flowchart 5000 illustrating the training of phone machines employed in acoustic matching is shown. At step 5002, a vocabulary of words—typically on the order of 5000 words—is defined. Each word is then represented by a sequence of phone machines. The phone machines have, by way of example, been shown as phonetic-type phone machines but may, alternatively, comprise a sequence of fenemic phones. Representing words by a sequence of phonetic-type phone machines or by a sequence of fenemic phone machines is discussed hereinbelow. A phone machine sequence for a word is referred to as a word baseform.

In step 5006, the word baseforms are arranged in the tree structure described hereinabove. The statistics for each phone machine in each word baseform are determined by training according to the well-known forward-backward algorithm set forth in the article "Continuous Speech Recognition by Statistical Methods" by F. Jelinek. An improved training procedure is outlined in Section M.

At step 5009, values to be substituted for actual parameter values or statistics used in the detailed match are determined. For example, the values to be substituted for the actual label output probabilities are determined. In step 5010, the determined values replace the stored actual probabilities so that the phones in each word baseform include the approximate substitute values. All approximations relating to the basic fast match are performed in step 5010.

A decision is then made as to whether the acoustic matching is to be enhanced (step 5011). If not, the values determined for the basic approximate match are set for use and other estimations relating to other approximations are not set (step 5012). If enhancement is desired, step 5018 is followed. A uniform string length distribution is defined (step 5018) and a decision is made as to whether further enhancement is desired (step 5020). If not, label output probability values and string length probability values are approximated and set for use in the acoustic matching. If further enhancement is desired, acoustic matching is limited to the first J labels in the generated string (step 5022). Whether or not one of the enhanced embodiments is selected, the parameter values determined are set in step 5012, whereupon each phone machine in each word baseform has been trained with the desired approximations that enable the fast approximate matching.

J. Stack Decoder

Figure 1:
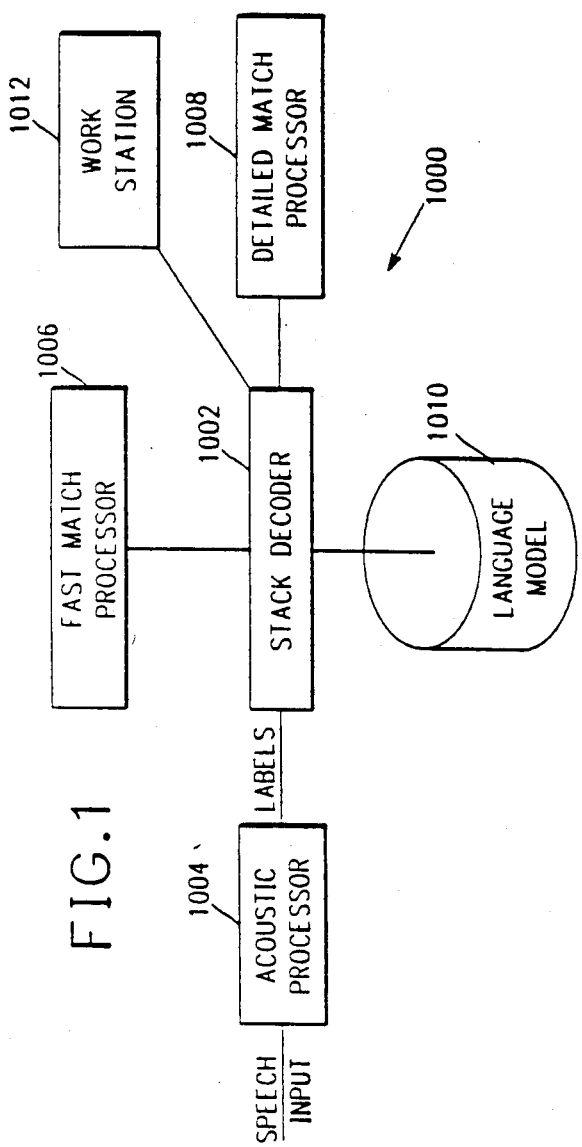
FIG. 1 is a general block diagram of a system environment in which the present invention may be practiced.

A preferred stack decoder used in the speech recognition system of FIG. 1 has been invented by L. Bahl, F. Jelinek, and R. L. Mercer of the IBM Speech Recognition Group and is discussed in a co-pending patent application, Ser. No. 06/738,911 filed on May 29, 1985. The preferred stack decoder is now described.

Figure 20:
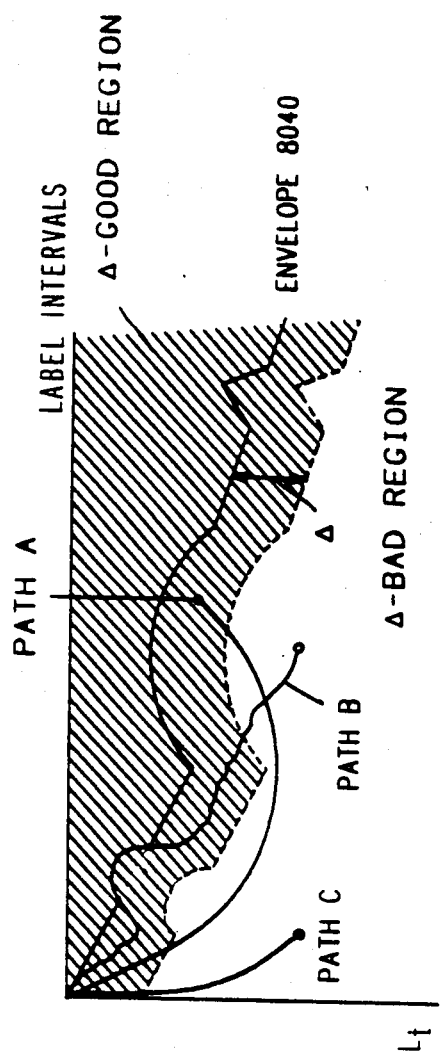
FIG. 20 is a graph depicting likelihood vectors for respective word paths and a likelihood envelope.

In FIG. 19 and FIG. 20, a plurality of successive labels $y_1 y_2$—are shown generated at successive "label intervals", or "label positions".

Also shown in FIG. 20 are a plurality of some generated word paths, namely path A, path B, and path C. In the context of FIG. 19, path A could correspond to the entry "to be or", path B to the entry "two b", and path C to the entry "too".

For a word path W representing a sequence of words, a most likely end time—represented in the label string as a "boundary label" between two words—can be found by known methods such as that described in an article entitled "Faster Acoustic Match Computation" (by L. R. Bahl, F. Jelinek, and R. L. Mercer) in the *IBM Technical Disclosure Bulletin* volume 23, number 4, September 1980. Briefly, the article discusses methodology for addressing two similar concerns: (a) how much of a label string Y is accounted for by a word (or word sequence) and (b) at which label interval does a partial sentence—corresponding to a part of the label string—end.

For any given word path, there is a "likelihood value" associated with each label or label interval, including the first label of the label string through to the boundary label. Taken together, all of the likelihood values for a given word path represent a "likelihood vector" for the given word path. Accordingly, for each word path there is a corresponding likelihood vector. Likelihood values $L_t$ are illustrated in FIG. 20.

A "likelihood envelope" $\Lambda_t$ at a label interval t for a collection of word paths $W^1, W^2, \ldots, W^s$ is defined mathematically as:

$$\Lambda_t = \max(L_t(W^1), \ldots, L_t(W^s))$$

That is, for each label interval, the likelihood envelope includes the highest likelihood value associated with any word path in the collection. A likelihood envelope 1040 is illustrated in FIG. 20.

A word path is considered "complete" if it corresponds to a complete sentence. A complete path is preferably identified by a speaker entering an input, e.g. pressing a button, when he reaches the end of a sentence. The entered input is synchronized with a label interval to mark a sentence end. A complete word path cannot be extended by appending any words thereto. A "partial" word path corresponds to an incomplete sentence and can be extended.

Partial paths are classified as "live" or "dead". A word path is "dead" if it has already been extended and "live" if it has not. With this classification, a path which has already been extended to form one or more longer extended word paths is not reconsidered for extension at a subsequent time.

Each word path is also characterizable as "good" or "bad" relative to the likelihood envelope. The word path is good if, at the label corresponding to the boundary label thereof, the word path has a likelihood value which is within Δ of the maximum likelihood envelope. Otherwise the word path is marked as "bad". Preferably, but not necessarily, Δ is a fixed value by which each value of the maximum likelihood envelope is reduced to serve as a good/bad threshold level.

For each label interval there is a stack element. Each live word path is assigned to the stack element corresponding to the label interval that corresponds to the boundary label of such a live path. A stack element may have zero, one, or more word path entries—the entries being listed in order of likelihood value.

The steps performed by the stack decoder 1002 of FIG. 1 are now discussed.

Figure 21:
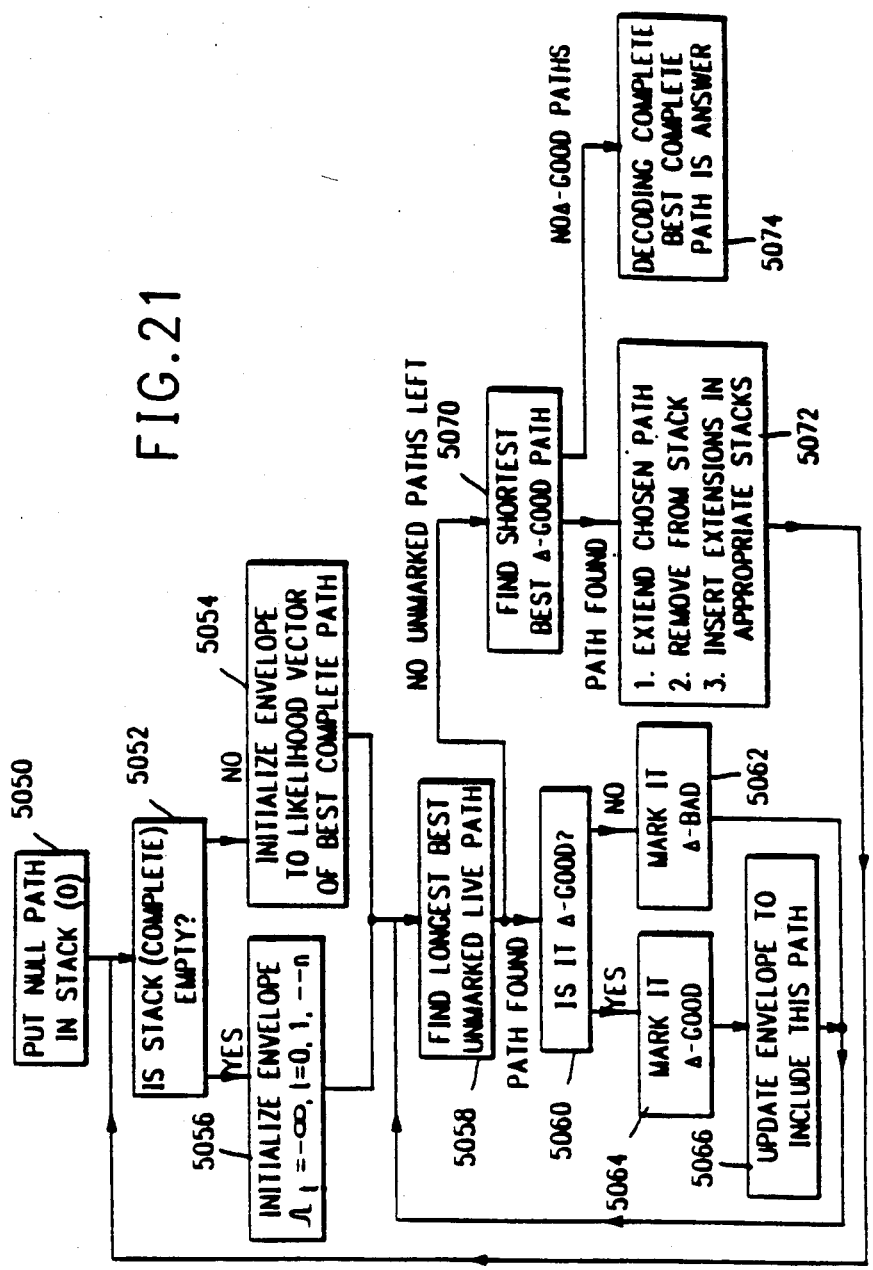
FIG. 21 is a flowchart representing steps in a stack decoding procedure.

Forming the likelihood envelope and determining which word paths are "good" are interrelated as suggested by the sample flowchart of FIG. 21.

In the flowchart of FIG. 21, a null path is first entered into the first stack(0) in step 5050. A stack(complete) element is provided which contains complete paths, if any, which have been previously determined (step 5052). Each complete path in the stack(complete) element has a likelihood vector associated therewith. The likelihood vector of the complete path having the highest likelihood at the boundary label thereof initially defines the maximum likelihood envelope. If there is no complete path in the stack(complete) element, the maximum likelihood envelope is initialized as $-\infty$ at each label interval. Moreover, if complete paths are not specified, the maximum likelihood envelope may be initialized at $-\infty$. Initializing the envelope is depicted by steps 5054 and 5056.

After the maximum likelihood envelope is initialized, it is reduced by a predefined amount Δ to form a Δ-good region above the reduced likelihoods and a Δ-bad region below the reduced likelihoods. The value of Δ controls the breadth of the search. The larger Δ is, the larger the number of word paths that are considered for possible extension. When $\log_{10}$ is used for determining $L_t$, a value of 2.0 for Δ provides satisfactory results. The value of Δ is preferably, but not necessarily, uniform along the length of label intervals.

If a word path has a likelihood at the boundary label thereof which is in the Δ-good region, the word path is marked "good". Otherwise, the word path is marked "bad".

As shown in FIG. 21, a loop for up-dating the likelihood envelope and for marking word paths as "good" (for possible extension) or "bad" starts with the finding of the longest unmarked word path (step 5058). If more than one unmarked word path is in the stack corresponding to the longest word path length, the word path having the highest likelihood at the boundary label thereof is selected. If a word path is found, it is marked as "good" if the likelihood at the boundary label thereof lies within the Δ-good region or "bad" otherwise (step 5060). If the word path is marked "bad", another unmarked live path is found and marked (step 5062). If the word path is marked "good", the likelihood envelope is up-dated to include the likelihood values of the path marked "good". That is, for each label interval, an up-dated likelihood value is determined as the greater likelihood value between (a) the present likelihood value in the likelihood envelope and (b) the likelihood value associated with word path marked "good". This is illustrated by steps 5064 and 5066. After the envelope is up-dated, a longest best unmarked live word path is again found (step 5058).

The loop is then repeated until no unmarked word paths remain. At that time, the shortest word path marked "good" is selected. If there is more than one word "good" path having a shortest length, the one having the highest likelihood at the boundary level thereof is selected (step 5070). The selected shortest path is then subjected to extension. That is, at least one likely follower word is determined as indicated above by preferably performing the fast match, language model, detailed match, and language model procedure. For each likely follower word, an extended word path is formed. Specifically, an extended word path is formed by appending a likely follower word on the end of the selected shortest word path.

After the selected shortest word path is formed into extended word paths, the selected word path is removed from the stack in which it was an entry and each extended word path is entered into the appropriate stack therefor. In particular, an extended word path becomes an entry into the stack corresponding to the boundary label of the extended word path step 5072.

Figure 22:
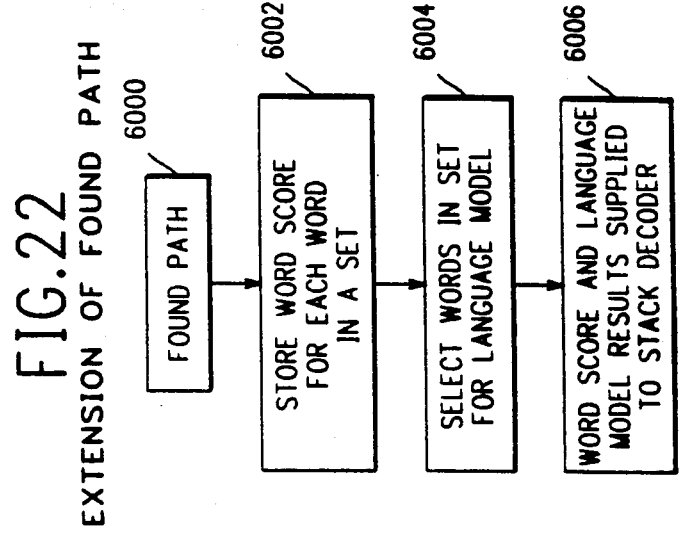
FIG. 22 is a flowchart showing how a word path is extended with words obtained from acoustic matching.

With regard to step 5072, the action of extending the chosen path is discussed with reference to the flowchart of FIG. 22. After the path is found in step 5070, the following procedure is performed whereby a word path or paths are extended based on an appropriate approximate match.

At step 6000, a path which is found is to be extended. By applying acoustic matching (or some other technique), a word score is derived and stored for each word in a set—where the set may be the vocabulary or a list of relatively likely words selected from the vocabulary. The word score for each word in the set is stored (step 6002). The word scores indicate relative likelihood and may be listed according to score. Thereafter, a language model (as described hereinabove) is applied in step 6004. The word score information and language model information are then supplied to the stack decoder which determines which word(s) form the best path(s). The likely words—as may be determined by the approximate match, detailed match, and language model—are used for extension of the path found in step 5070 of FIG. 21. Each of the likely words determined in FIG. 22 are separately appended to the found word path so that a plurality of extended word paths may be formed.

Referring again to FIG. 21, after the extended paths are formed and the stacks are re-formed, the process repeats by returning to step 5052.

Each iteration thus consists of selecting the shortest best "good" word path and extending it. A word path marked "bad" on one iteration may become "good" on a later iteration. The characterization of a live word path as "good" or "bad" is thus made independently on each iteration. In practice, the likelihood envelope does not change greatly from one iteration to the next and the computation to decide whether a word path is "good" or "bad" is done efficiently. Moreover, normalization is not required.

When complete sentences are identified, step 5074 is preferably included. That is, when no live word paths remain unmarked and there are no "good" word paths to be extended, decoding is finished. The complete word path having the highest likelihood at the respective boundary label thereof is identified as the most likely word sequence for the input label string.

In the case of continuous speech where sentence endings are not identified, path extension proceeds continually or for a predefined number of words as preferred by the system user.

K. Constructing Phonetic Baseforms

One type of Markov model phone machine which can be used in forming baseforms is based on phonetics. That is, each phone machine corresponds to a given phonetic sound, such as those included in the International Phonetic Alphabet.

For a given word, there is a sequence of phonetic sounds each having a respective phone machine corresponding thereto. Each phone machine includes a number of states and a number of transitions between states, some of which can produce a feneme output and some (referred to as null transitions) which cannot. Statistics relating to each phone machine—as noted hereinabove—include (a) the probability of a given transition occurring and (b) the likelihood of a particular feneme being produced at a given transition. Preferably, at each non-null transition there is some probability associated with each feneme. In a feneme alphabet shown in Table 1, there are preferably 200 fenemes. A phone machine used in forming phonetic baseforms is illustrated in FIG. 3. A sequence of such phone machines is provided for each word. The statistics, or probabilities, are entered into the phone machines during a training phase in which known words are uttered. Transition probabilities and feneme probabilities in the various phonetic phone machines are determined during training by noting the feneme string(s) generated when a known phonetic sound is uttered at least once and by applying the well-known forward-backward algorithm.

A sample of statistics for one phone identified as phone DH are set forth in Table 2. As an approximation, the label output probability distribution for transitions tr1, tr2, and tr8 of the phone machine of FIG. 3 are represented by a single distribution; transitions tr3, tr4, tr5, and tr9 are represented by a single distribution; and transitions tr6, tr7, and tr10 are represented by a single distribution. This is shown in Table 2 by the assignment of arcs (i.e. transitions) to the respective columns 4, 5, or 6. Table 2 shows the probability of each transition and the probability of a label (i.e. feneme) being generated in the beginning, middle, or end, respectively, of the phone DH. For the DH phone, for example, the probability of the transition from state $S_1$ to state $S_2$ is counted as 0.07243. The probability of transition from state $S_1$ to state $S_4$ is 0.92757. (In that these are the only two possible transitions from the initial state, their sum equals unity.) As to label output probabilities, the DH phone has a 0.091 probability of producing the feneme AE13 (see Table 1) at the end portion of the phone, i.e. column 6 of Table 2. Also in Table 2 there is a count associated with each node (or state). The node count is indicative of the number of times during the training that the phone was in the corresponding state. Statistics as in Table 2 are found for each phoneme machine.

The arranging of phonetic phone machines into a word baseform sequence is typically performed by a phonetician and is normally not done automatically.

L. Constructing fenemic Baseforms

Figure 23:
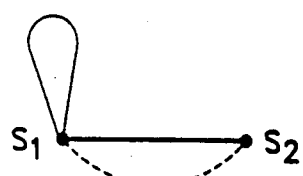
FIG. 23 is an illustration showing a fenemic phone machine.

FIG. 23 shows an embodiment of a fenemic phone. The fenemic phone has two states and three transitions. A non-null transition is indicated with dashed lines and represents a path from state 1 to state 2 in which no label can be produced. A self-loop transition at state 1 permits any number of labels to be produced thereat. A non-null transition between state 1 and state 2 is permitted to have a label produced thereat. The probabilities associated with each transition and with each label at a transition are determined during a training session in a manner similar to that previously described with reference to phonetic-type baseforms.

Fenemic word baseforms are constructed by concatenating fenemic phones. One approach is described in the copending application entitled "Feneme-based Markov Models for Words". Preferably, the fenemic word baseforms are grown from multiple utterances of the corresponding word. This is described in a co-pending and commonly assigned application entitled "Constructing Markov Models of Words from Multiple Utterances", (Ser. No. 06/738,933 filed May 29, 1985), which is incorporated herein by reference to the extent required for adequate disclosure of the present invention. Briefly, one method of growing baseforms from multiple utterances includes the steps of:

(a) transforming multiple utterances of the word segment into respective strings of fenemes;

(b) defining a set of fenemic Markov model phone machines;

(c) determining the best single phone machine $P_1$ for producing the multiple feneme strings;

(d) determining the best two phone baseform of the form $P_1P_2$ or $P_2P_1$ for producing the multiple feneme strings;

(e) align the best two phone baseform against each feneme string;

(f) splitting each feneme string into a left portion and a right portion with the left portion corresponding to the first phone machine of the two phone baseform and the right portion corresponding to the second phone machine of the two phone baseform;

(g) identifying each left portion as a left substring and each right portion as a right substring;

(h) processing the set of left substrings in the same manner as the set of feneme strings corresponding to the multiple utterances including the further step of inhibiting further splitting of a substring when the single phone baseform thereof has a higher probability of producing the substring than does the best two phone baseform;

(j) processing the set of right substrings in the same manner as the set of feneme strings corresponding to the multiple utterances, including the further step of inhibiting further splitting of a substring when the single phone baseform thereof has a higher probability of producing the substring than does the best two phone baseform; and (k) concatenating the unsplit single phones in an order corresponding the order of the feneme substrings to which they correspond.

The number of model elements is typically approximately the number of fenemes obtained for an utterance of the word. The baseform models are then trained (or filled with statistics) by speaking known utterances which into an acoustic processor that generates a string of label in response thereto. Based on the known utterances and the generated labels, the statistics for the word models are derived according to the well-known forward-backward algorithm discussed in articles referred to hereinabove.

Figure 24:
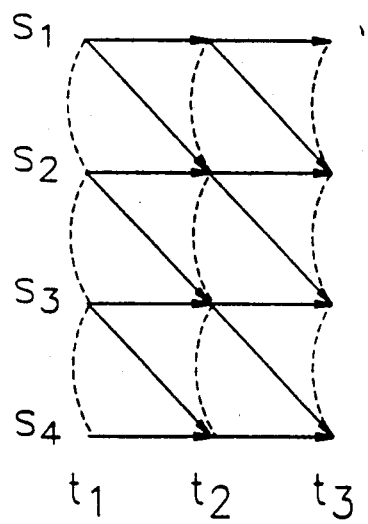
FIG. 24 is a trellis diagram for a sequential plurality of fenemic phone machines.

In FIG. 24 a lattice corresponding to fenemic phones is illustrated. The lattice is significantly simpler than the lattice of FIG. 11 relating to a phonetic detailed match. As noted hereinabove, a fenemic detailed match proceeding one time interval at a time through the lattice of FIG. 24 is set forth in Appendix 1.

M. Training Word Models

A preferred method of training is taught in the copending application—incorporated herein by reference—filed on even date herewith entitled "Improving the Training of Markov Models Used in a Speech Recognition System," invented by L. R. Bahl, P. F. Brown, P. V. DeSouza, and R. L. Mercer and assigned to the IBM Corporation. Therein training entails determining statistics for each word model in a manner which enhances the probability of the correct word relative to the probabilities associated with other words. The philosophy is to maximize the difference between the probability of the correct script of uttered words given the label outputs and the probability of any other (incorrect) script, rather than maximizing the probability of the labels given the script as in other approaches.

Such methodology provides—in a system for decoding a vocabulary word from outputs selected from an alphabet of outputs in response to a communicated word input wherein each word in the vocabulary is represented by a baseform of at least one probabilistic finite state model and wherein each probabilistic model has transition probability items and output probability items and wherein a value is stored for each of at least some probability items—a method of determining probability item values comprising the step of biassing at least some of the stored values to enhance the likelihood that outputs generated in response to communication of a known word input are produced by the baseform for the known word relative to the respective likelihood of the generated outputs being produced by the baseform for at least one other word.

Each word (or distinct pronunciation of a word which is referred to as a "lexeme") is preferably represented by one or more probabilistic finite state machines in sequence. Each machine corresponds to a "phone" from a set of phones. Each phone correlates to a phonetic element, a label (or feneme), or some other predefined characterization of speech for which a Markov model or the like can be specified.

The training script is typically composed of a series of known words.

In accordance with the presently described training methodology, probability values associated with the probability items are evaluated as follows.

For each probability item, there is a set estimate value $\theta'$. Given the estimated values $\theta'$ and the labels generated during training, values referred to as "single counts" are determined. A "single count" in general relates to the (expected) number of times an event occurs based on training data. One specific definition of a "single count" is the probability of a particular transition $\tau_i$ and state $S_j$ given (a) a certain string Y of labels, (b) defined estimated values $\theta'$, and (c) a particular time, t.

The above-described single counts are determined by applying the well-known forward-backward algorithm, or Baum-Welch algorithm.

According to the above definition, the single count may be represented by the expression:

$$Pr(S_j,\tau_i|Y,\theta,t)$$

By summing the single counts for a specific $S_j,\tau_i$, Y, $\theta'$ for each time t, a "transition cumulative count" is determined for a corresponding transition probability item. Because the transition cumulative count is a sum of probabilities, its value may exceed unity. For each transition probability item, a respective transition probability item is preferably stored. By dividing this cumulative count from a given transition by the sum of cumulative counts for all transitions which can be taken from state $S_j$, a current probability value for the respective transition probability item is determined. The current probability value is preferably stored and associated with its respective transition probability item.

With regard to label output probability items, single counts are again summed. For each of these probability items, a sum is made of the single counts for a specific $S_j$, $\tau_i$, Y, and $\theta'$, for all label times at which the corresponding generated label in the string is the label corresponding to the label output probability item. The sum in this case is a "label output cumulative count" and is preferably stored associated with the label output probability item corresponding therewith. By dividing this cumulative count by the sum of single counts over all label times for the specific $S_j$, f, $\tau_i$, Y, and $\theta'$, a current probability value is determined for the respective label output probability item.

In accordance with the methodology of the above-cited patent application, a training script of uttered known words, an initial probability value for each probability item, and a list of candidate words for each word uttered during training are prescribed. The list of candidate words is defined by a procedure such as the fast approximate acoustic match. For any known uttered word there is the "correct" known word and an "incorrect" word (preferably the incorrect word having the highest likelihood of being wrongly decoded as the known word).

Current probability values of the probability items are determined by first computing a "plus count value" and a "minus count value" for each probability item in the correct word baseform or incorrect word baseform. The plus count value is added to, and then the minus count value is subtracted from, the cumulative count for the corresponding probability item (for each probability item).

A plus count value is computed for each probability item in the word baseform of the correct (i.e. known) word by applying the well-known forward-backward algorithm and preferably scaling the statistics resulting therefrom. The adding of the plus count value biasses the count values (and probability items derived therefrom) in favor of the string Y, making Y appear to be a relatively more likely output of the correct word model.

The minus count value for a given probability item is computed by applying the forward-backward algorithm as if the incorrect word was spoken to produce the string of labels . The minus count value derived from the single utterance of the known word is subtracted from the most recent value of the corresponding cumulative count (before or after summation with the plus count value). This subtraction biasses a cumulative count used in computing a probability item in the incorrect word baseform away from the string Y.

Based on these adjusted cumulative counts, the probability values for the probability items are re-computed and stored.

By following the above steps for each word in the vocabulary, the stored values for counts and probability values are adjusted to enhance decoding accuracy.

The above-discussed methodology serves to improve count values which are determined by other techniques in order to improve the decoding of speech into recognized words in a vocabulary.

N. Sample Fast Match Flowchart

Figures 25, 26:
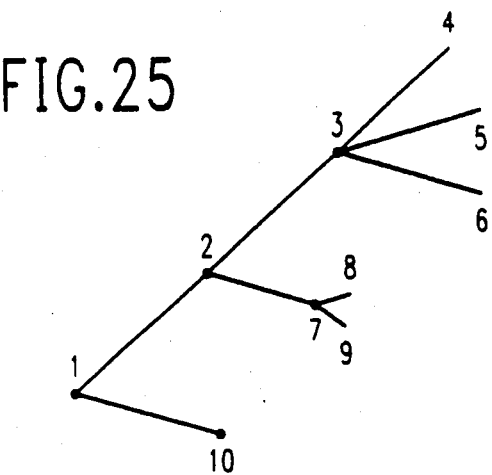
FIG. 25 is an illustration of a portion of a phone tree structure used in preordering.
FIG. 26 is a table representing stored information which relates to the tree structure of FIG. 25.

A replica of the tree set forth in FIG. 17 is shown in FIG. 25 with numerals identifying points in the tree. One known technique for storing the tree is referred to as "preordering" in the prior technology. According to preordering, the leftmost node is identified—see node 1—and an upper branch is followed with successive nodes being identified with successively greater numerals. Node numbering proceeds along the upper branch as shown by nodes 1-2-3-4. Assuming that node 4 represents a node at which a "lexeme"—a word as pronounced in a specific manner—ends, node 4 is identified as a "leaf". When a leaf is reached, the tree is traced leftwardly until a node is reached which has one or more branches which have unnumbered nodes. In this case, the tree is traced back to node 3 and then follows a next branch therefrom. When a plurality of branches extend from a common node, such branches are followed one after another preferably highest branch first. Node 5 is labelled as another leaf after node 4. Returning again to node 3, a further leaf node 6 is labelled. All branches from node 3 being traced and having numbered nodes, the tree is traced back to node 2. From node 2, nodes 7, 8, and 9 are labelled in the preordering process. The tree is then traced back to node 1 from which node 10 is identified and labelled as such.

Pursuant to preordering, the tree is stored as shown in FIG. 26. In the left column, the nodes are listed 1 through 10. In the next column, the phone corresponding to the node is stored. The third column indicates the level at which the node is located referenced from the main node of the tree—i.e., node 1 in this case. Node 1 is at level 1; node 2 is at level 2; and node 7 is at level 3, for example. In column four, a bit indicates whether the node represents a leaf and, if so, the last column stores the word (or lexeme) corresponding to the leaf. The stored information identifies a precise branch and location therealong. According to this preordering, sequences of phones (corresponding to lexemes) are compactly stored and readily identifiable.

Figure 27:
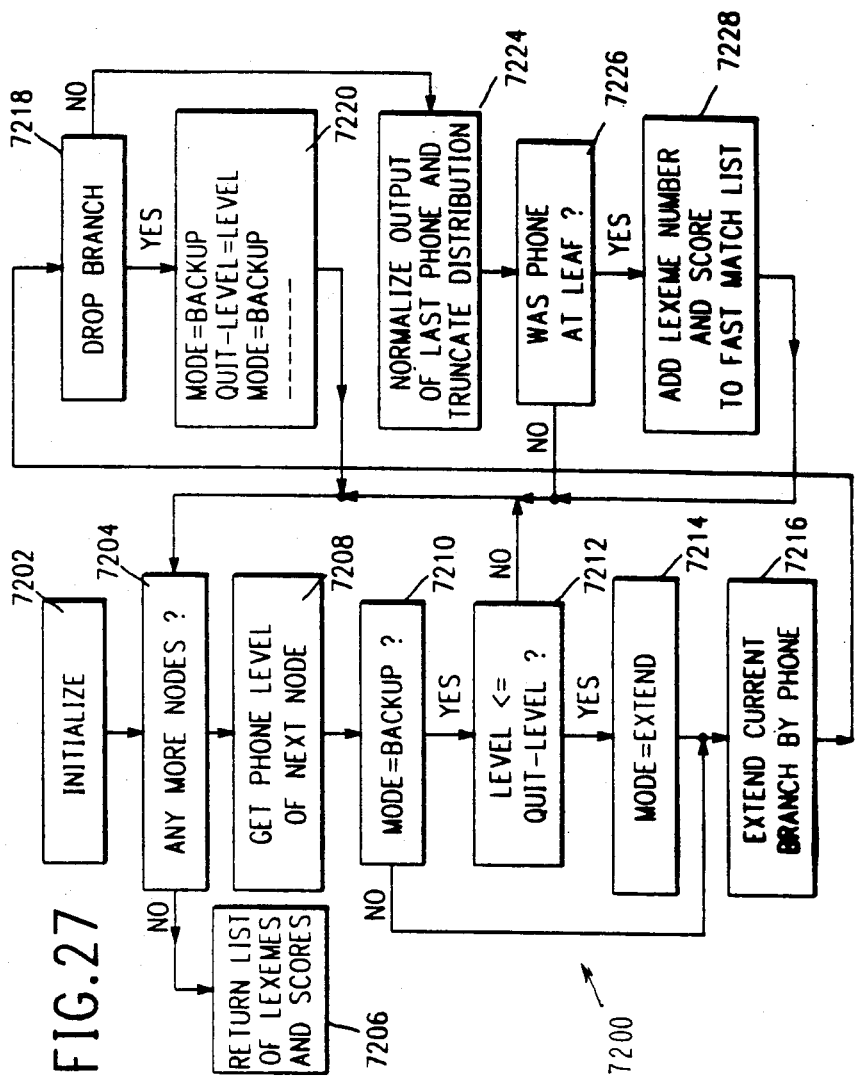

The significance of the tree structure is noted with reference to the flowchart set forth in FIG. 27. FIG. 27 sets forth one embodiment 7200 of the fast match process described hereinabove utilizing the tree structure of section (I)(G).

In the flowchart, an INITIALIZE routine 7202 is first invoked. The INITIALIZE routine is discussed in detail with regard to FIG. 28. Basically, the INITIALIZE step 7202 empties the list of candidate words and returns the process to the base of the tree.

After the INITIALIZE step 7202, a decision 7204 is made as to whether any subsequent nodes in the tree are to be examined. If not, no further branches need be tracked and a list of candidate lexemes and their respective scores may be provided in step 7206. If further nodes remain at step 7204, the phone level of the next node is noted in step 7208. The phone level, based on preordering, indicates how far from the base of the tree the "next" node is. A decision is then made at step 7210 as to whether the process should proceed in a "back-up" mode or an "extend" mode. The "back-up" mode is invoked when a branch along the tree becomes unlikely, based on the score at a phone therealong. In this event, the process traces back one node at a time without any match computations being performed. The back-up proceeds to a level, if any, at which nodes were not eliminated. This is reflected in step 7212 at which the level is compared with a quit-level. If the level is not less than or equal to the quit-level, the process returns to step 7204. Otherwise, the process enters the "extend" mode at step 7214. When not in the "back-up" mode, the process is in the "extend" mode at which the current branch is extended by adding the next phone at step 7216.

If the branch score is less than some threshold, the branch is eliminated as a candidate (step 7218) and the mode is set to "back-up"; the quit-level is set to the current level; the mode is again set to back-up; and so on in step 7220 until a node level is reached such as that set forth in step 7212. The phone and level are set and the process returns to step 7204.

If the branch remains a candidate branch in step 7218, the output of the last phone is normalized as described hereinabove and the distribution is truncated to a predefined length (as described hereinabove) at step 7224. A decision is then made in step 7226 as to whether the phone is at a leaf of the tree (thereby representing a lexeme). If not a leaf, the phone and level are set and the process returns to step 7204. If a leaf, the lexeme and score therefor are stored in a lexeme (or word) candidate list in step 7228 and the process returns to step 7204 after getting the phone and level.

Referring to FIG. 28, the INITIALIZE routine 7202 starts with step 7302 at which the branch score (at the zero level) is zero. In step 7304, thresholds are set for the branches through the tree. That is, for each node along a sequence of phones (which corresponds to a branch along the tree), a threshold score is set. The threshold score can be a function of level or may be a fixed value applied at all levels. As noted hereinabove, a start-time distribution and an end-time distribution is determined for one phone after another along a (lexeme-representing) branch of the tree. In step 7306, the distribution from a previous detailed match is loaded and, in step 7308, the process is set to the "extend" mode. In step 7310, the list of candidate lexemes (or words) is nulled and the process is returned to the root of the tree at step 7312 to commence processing.

FIG. 29 details the steps in extending the current branch as noted in step 7216 of FIG. 27. Specifically, in step 7402, the output sum in the match computation discussed hereinabove is set at zero. In step 7404, a start distribution is obtained (typically from the most recent end-time distribution). As noted hereinabove, a maximum time limit is set by defining the maximum number of labels to be examined (step 7406). A phone match is then performed and an INC score derived therefrom in step 7408. The INC score represents an incremental score resulting from extending the branch. The output distribution obtained during the matching (the equations for $\Phi$ set forth hereinabove) is saved in step 7410 and the branch score is updated in step 7412. According to the updating, the branch score $B_i = B(i-1) + INC$ where "i" is the level.

Figures 30, 31:
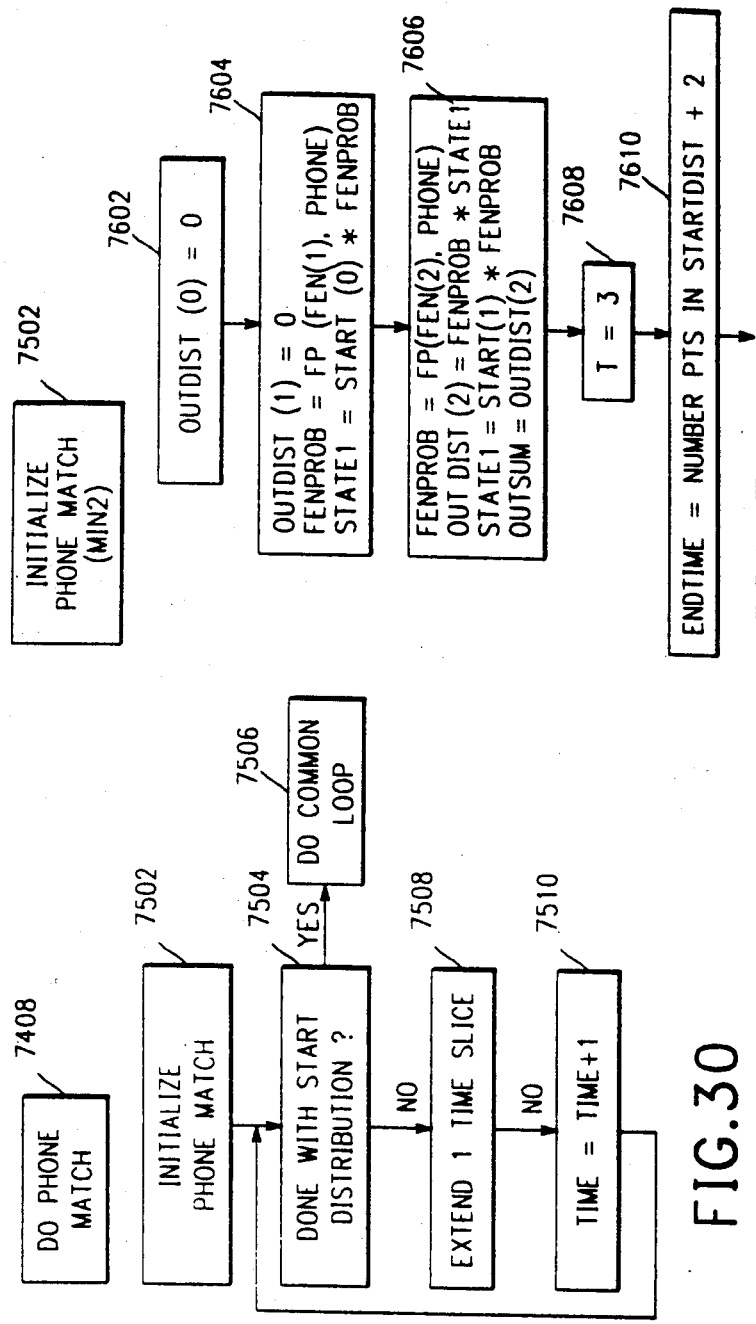

In FIG. 30, step 7408 is explained in greater detail. In step 7502, the phone match is initialized. Thereafter, a decision is made as to whether the start time distribution computation has been completed (step 7504). The decision indicates whether the start time distribution has reached a zero value. If yes, a common loop is performed at step 7506. If not, another label of the string of labels is included in the matching process—this step 7508 being referred to as extending by a time slice. A parameter "TIME" is then incremented to TIME=-TIME+1 and the process returns to step 7504.

Reference is made to FIG. 31 which illustrates the phone match initialization step of 7502 in greater detail for the first two time slices. In step 7602, the output distribution at label time zero is set to zero. In step 7604, the output distribution at the first label time is set to zero; the feneme probability (FENPROB) is set to the probability of the phone (PHONE) producing a label FEN(1); a value STATE1 is set equal to the start time distribution at label time zero multiplied by the feneme probability (FENPROB); and OUTSUM is set equal to OUTDIST(2).

In the approximate fast match, the feneme probability is a value that is approximated as described in Section (I)(D) hereinabove. By way of summary, it is recalled that each phone has a plurality of states and transitions (or arcs) which extend from a state to a state. At each transition whereat a given label may be generated, a respective probability is determined based on data derived during a training phase. At each of some transitions there is a respective label probability for each label in the alphabet. If in a phone there are ten transitions at which a label can be generated and if there are 200 labels in the alphabet, there are 2000 actual label probabilities associated with the phone. The basic approximate fast match determines, preferably, the highest probability of a subject label at any transition in the phone; the actual probabilities determined for the subject label being replaced by this highest probability.

Figure 32:
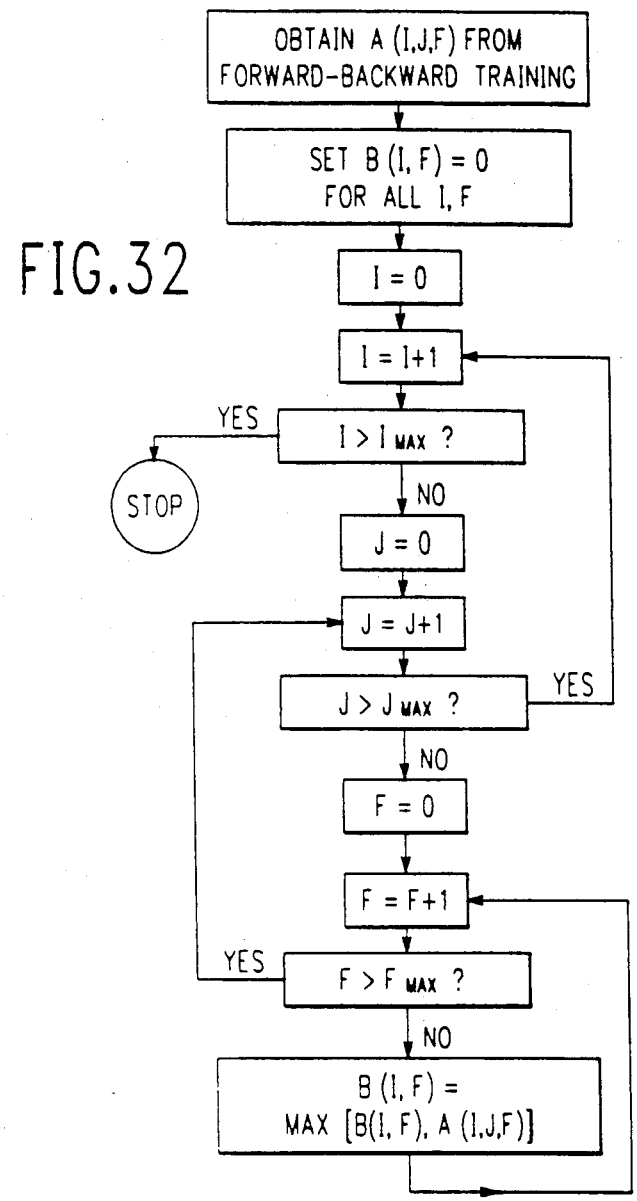
FIG. 32 is a flowchart showing the steps involved in replacing actual label probabilities used in a detailed acoustic match with approximate label probabilities used in an approximate fast acoustic match.

An algorithm for performing this substitution of actual label probability values by approximate values is set forth in FIG. 32. In FIG. 32, "I" represents an index value for phones; "J" represents an index value for transitions (or arcs); "F" represents an index value for fenemes (or labels); "A(I,J,F)" represents the actual label (detailed match) label probability for feneme "F" on transition "J" of phone "I". "B(I,F)" represents the approximate (fast match) label probability for feneme "F" for phone "I". It is noted that the flowchart of FIG. 32 assumes that all phones have the same number of transitions ($J_{max}$). Optionally, however, $J_{max}$ may vary from one phone to another if desired.

Comparing the flowchart of FIG. 31 with the output distribution equations for $\Phi_0$ through $\Phi_6$, it is observed that OUTDIST(T) corresponds to $\Phi_T$; FENPROB corresponds to a probability—such as $p_1$ or $p_2 \ldots$—; and START(T) corresponds to the start-time distribution $q_T$. It is noted that the label length variable $1_i$ is not specifically included in FIG. 31. However, because the minimum label length is selected as two (by way of example), $1_0$ and $1_1$ are zero so that OUTDIST(0) and OUTDIST(1) are also zero. Step 7604 sets the variables at the first label time "slice" and step 7606 sets the variables relating to the second label time slice. Accordingly, the EXTEND 1 TIME SLICE step 7508 commences at label time T=3 (step 7608) and the END TIME value is set equal to the number of start distribution points plus two (step 7610).

In FIG. 33, step 7508 is shown in greater detail. For each time T, the output distribution is shown to be a function of the probability of the label generated at the Tth time, the output distribution at time (T−1), and the value of STATE1. OUTSUM is the previous OUTSUM value incremented by OUTDIST(T).

FIG. 31 and FIG. 33 illustrate the recursive nature of the calculations performed in determining successive OUTDIST and OUTSUM values.

In FIG. 34, the common loop step 7506 is depicted in greater detail. In step 7802 the value of T is set equal to ENDTIME+1. Step 7804 is comparable to the EXTEND 1 TIME SLICE except that the STATE1 factor is not included. After step 7804, T is incremented (step 7806) and T is checked against a limit value. Step 7804 is repeated until the time limit is reached as a result fo the decision step 7808.

Referring to FIG. 35, a detailed flowchart for step 7412 is shown. At step 7902 the PHONESCORE is set equal to the logarithm of OUTSUM. Thereafter, in step 7904, BRANCHSCORE is set equal to the BRANCHSCORE at the previous level plus the PHONE SCORE of step 7902.

The NORMALIZE step 7224 is set forth in FIG. 36. Steps 7952 through 7962 function to normalize the output distribution values to a constant value, e.g. one, after insignificant portions of the distribution are discarded. Specifically, output distribution values $\Phi_i$ are retained or discarded depending on whether they are above or below the threshold set in step 7952. A normalization scale, which is typically represented by the sum of output distribution values, is determined in step 7954. The earliest (in time) output distribution value and the latest output distribution value that satisfy the threshold requirement are specified as a left boundary and right boundary respectively in steps 7956 and 7958. The output distribution values between the left boundary (LB) and the right boundary (RB) are scaled (e.g. divided) by the normalization scale in step 7960. In step 7962, the scaled output distribution is saved for future use.

P. Selecting Likely Words From a Vocabulary By Means of Polling

Figure 37:
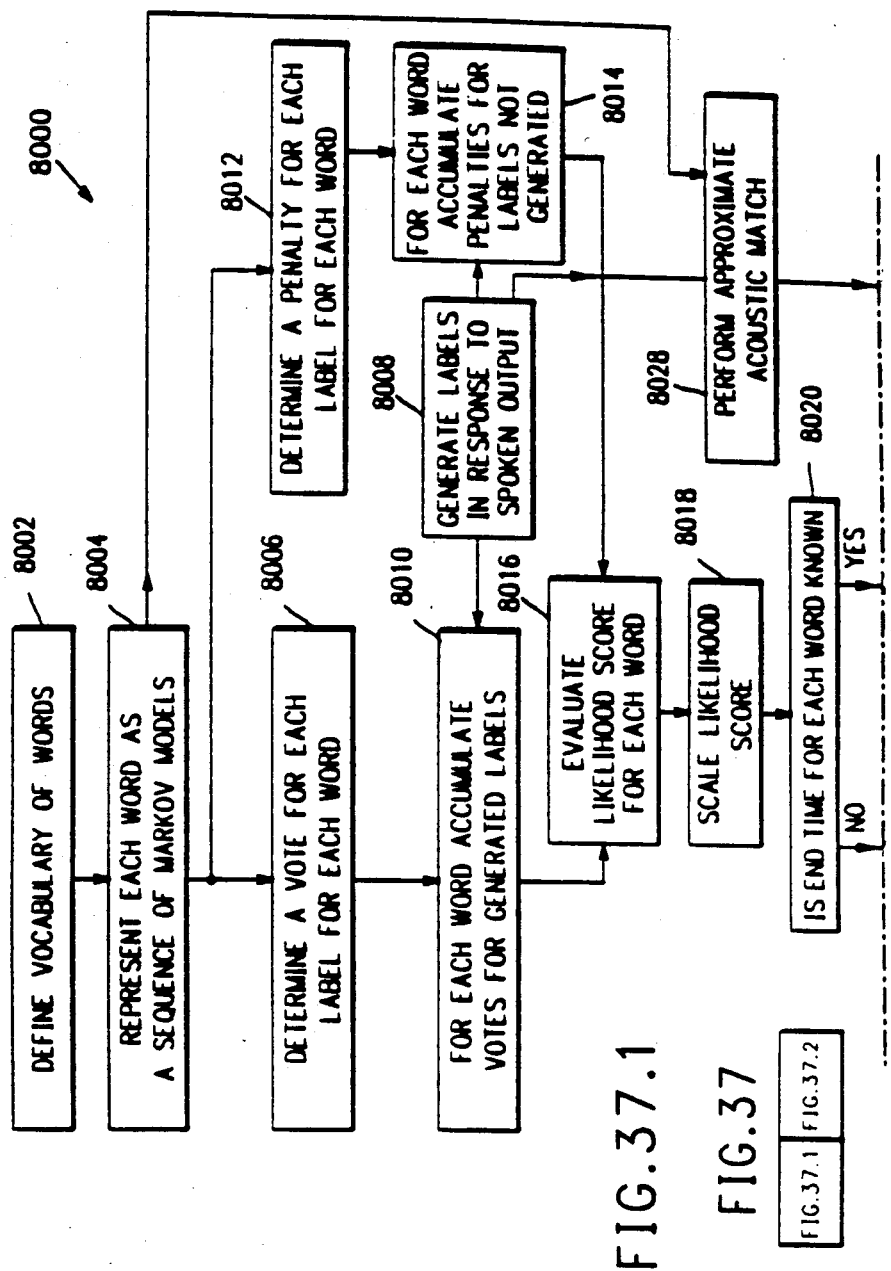
FIGS. 37, 37.1 and 37.2 form a flowchart illustrating for the polling methodology of the present invention.

Referring to FIG. 37, a flowchart 8000 is illustrated. As depicted in FIG. 37, a vocabulary of words is initially prescribed in step 8002. The words may relate to standard office correspondence words or technical words, depending on the user. There have been on the order of 5000 words or more in the vocabulary, although the number of words may vary.

Each word is represented by a sequence of Markov model phone machines in accordance with the teachings of Section (I)(K) or (I)(L). That is, each word may be represented as a constructed baseform of sequential phonetic phone machines or a constructed baseform of sequential fenemic phone machines.

A "vote" is then determined for each label for each word in step 8006. The vote determining step 8006 is described with reference to FIG. 38, FIG. 39, FIG. 40, and FIG. 41.

Figure 38:
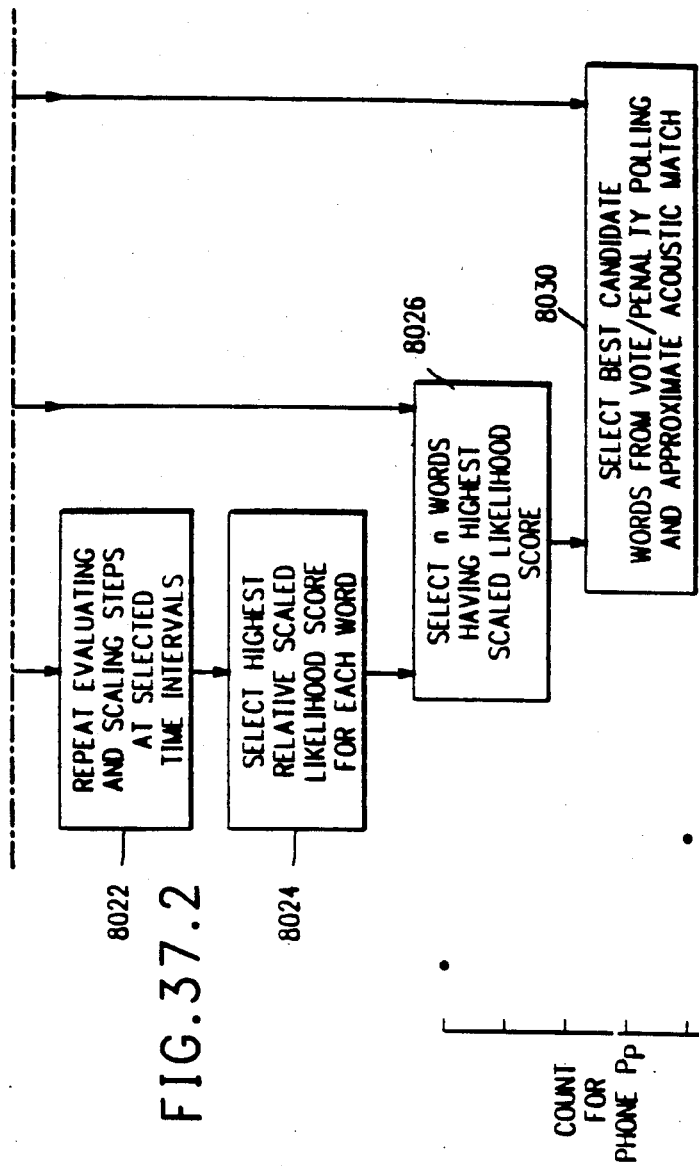
FIG. 38 is a graph illustrating the count distribution for labels.

FIG. 38 shows a graph of the distribution of acoustic labels for a given phone machine $P_p$. The counts indicated are extracted from the statistics generated during training. During training, it is recalled, known utterances corresponding to known phone sequences are spoken and a string of labels generated in response thereto. The number of times each label is produced when a known phone is uttered is thus provided during the session. For each phone, a distribution as in FIG. 38 is generated.

In addition to extracting the information included in FIG. 38 from the training data, the expected number of labels for a given phone is also derived from the training data. That is, when a known utterance corresponding to a given phone is spoken, the number of labels generated is noted. Each time the known utterance is spoken, a number of labels for the given phone is noted. From this information, the most likely or expected number of labels for the given phone is defined. FIG. 39 is a graph showing the expected number of labels for each phone. If the phones correspond to fenemic phones, the expected number of labels for each phone should typically average about one. For phonetic phones, the number of labels may vary greatly.

The extraction of information in the graphs from training data is achieved by using information from the forward-backward algorithm described in detail in Appendix II of the article "Continuous Speech Recognition by Statistical Methods". Briefly, the forward backward algorithm includes determining the probability of each transition between a state i and a state (i+1) in a phone by (a) looking forward from the initial state of a Markov model to the state i and determining the statistics of getting to the state i in a "forward pass" and (b) looking backward from the final state of a Markov model to the state (i+1) and determining the statistics of getting to the final state from state (i+1) in a "backward pass". The probability of the transition from state i to state (i+1)—given state i—and the label outputs thereat are combined with other statistics in determining the probability of a subject transition occurring given a certain string of labels. In that Appendix II of the above-noted article sets forth in detail the mathematics and application of the algorithm, further description is not provided.

Each word is known to be a predefined sequence of phones as illustrated in FIG. 40 with reference to a WORD 1 and a WORD 2. Given the phone sequence for each word and the information discussed relative to FIG. 38 and FIG. 39, a determination can be made as to how many times a given label is expected to occur for a particular subject word W. For a word such as WORD 1, the number of times label 1 is expected may be computed as the number of counts of label 1 for phone $P_1$ plus the number of counts of label 1 for phone $P_3$ plus the number of counts of label 1 for phone $P_6$ and so on. Similarly, for the word WORD 1, the number of times label 2 is expected may be computed as the number of counts of label 2 for phone $P_1$ plus the number of counts of label 2 for phone $P_3$ and so on. The expected count of each label for WORD 1 is evaluated by performing the above steps for each of the two hundred labels.

In FIG. 41 the expected count for each label in a particular word (e.g. WORD 1) is set forth.

From the expected label counts shown in FIG. 41 for a given word, a "vote" of each label for the given word is evaluated. The vote of a label L' for a given word W' represents the likelihood of the word W' producing the label L'. The vote preferably corresponds to the logarithmic probability of word W' producing L'. Preferably, the vote is determined by $$\text{vote} = \log_{10}\{Pr(L'|W')\}$$

The votes are stored in a table as shown in FIG. 42. For each word 1 through W, each label has an associated vote identified as V with a double subscript. The first element in the subscript corresponds to the label and the second to the word. $V_{12}$ is therefore the vote of label 1 for word 2.

Referring again to FIG. 37, the process of selecting likely candidate words from a vocabulary through polling is shown to include a step 8008 of generating labels in response to an unknown spoken input. This is performed by the acoustic processor 1004 (of FIG. 1).

The generated labels are looked up in the table of FIG. 42 for a subject word. The vote of each generated label for the subject word is retrieved. The votes are then accumulated to give a total vote for the subject word (step 8010). By way of example, if labels 1, 3, and 5 are generated, votes $V_{11}$, $V_{31}$ and $V_{51}$ would be evaluated and combined. If the votes are logarithmic probabilities, they are summed to provide the total vote for word 1. A similar procedure is followed for each word of the words in the vocabulary, so that labels 1, 3, and 5 vote for each word.

In accordance with one embodiment of the invention, the accumulated vote for each word serves as the likelihood score for the word. The n words (where n is a predefined integer) having the highest accumulated vote are defined as candidate words that are to be later processed in a detailed match and language model as outlined above.

In another embodiment, word "penalties" are evaluated as well as votes. That is, for each word, a penalty is determined and assigned (step 8012). The penalty represents the likelihood that a subject label is not produced by a given word. There are various methods for determining the penalty. One approach for determining the penalty for a word represented by a fenemic baseform involves assuming that each fenemic phone produces only one label. For a given label and a subject fenemic phone, the penalty for the given label corresponds to the log probability of any other label being produced by the subject fenemic phone. The penalty of label 1 for phone $P_2$ then corresponds to the log probability of any label 2 through 200 being the one produced label. The assumption of one label output per fenemic phone, although not a correct one, has proved satisfactory in evaluating penalties. Once a penalty of a label for each phone is determined, the penalty for a word constituting a sequence of known phones is readily determined.

Figures 43, 44:
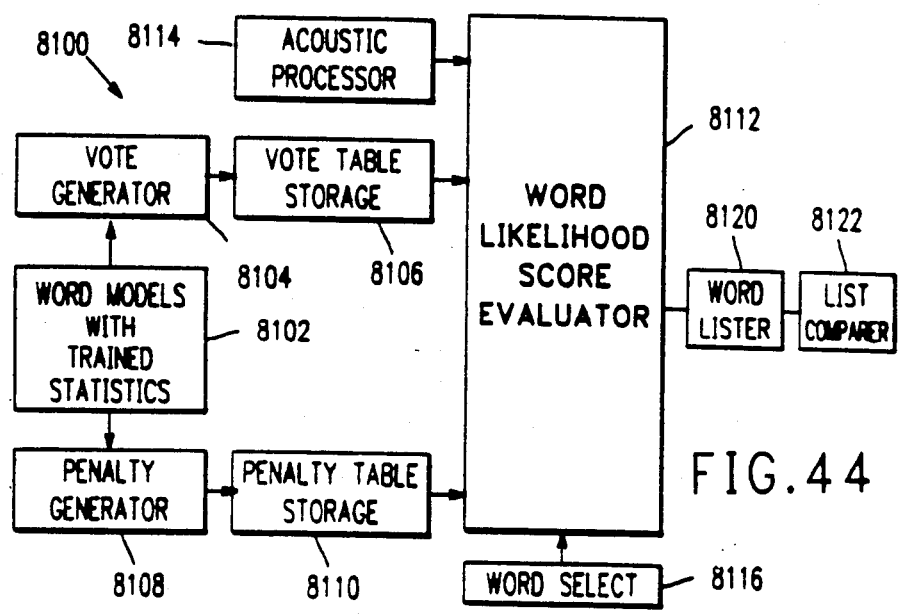
FIG. 43 is a table showing the penalty of each label for each word.
FIG. 44 is a block diagram illustrating apparatus of the invention.

The penalty of each label for each word is shown in FIG. 43. Each penalty is identified as PEN followed by two subscripts, the first representing the label and the second representing the word.

Referring again to FIG. 37, the labels generated in step 8008 are examined to see which labels of the label alphabet have not been generated. The penalty for each label not generated is evaluated for each word. To obtain the total penalty for a given word, the penalty of each ungenerated label for the given word is retrieved and all such penalties are accumulated (step 8014). If each penalty corresponds to a logarithmic "null" probability, the penalties for the given word are summed over all labels, as were the votes. The above procedure is repeated for each word in the vocabulary so that each word has a total vote and a total penalty given the string of generated labels.

When a total vote and a total penalty is derived for each vocabulary word, a likelihood score is defined by combining the two values (step 8016). If desired the total vote may be weighted to be greater than the total penalty, or vice versa.

Moreover, the likelihood score for each word is preferably scaled based on the length of the number of labels that are voting (step 8018). Specifically, after the total vote and the total penalty—both of which which represent sums of logarithmic probabilities—are added together, the final sum is divided by the number of speech labels generated and considered in computing the votes and penalties. The result is a scaled likelihood score.

A further aspect of the invention relates to determining which labels in a string to consider in the voting and penalty (i.e. polling) computations. Where the end of a word is identified and the labels corresponding thereto are known, preferably all labels generated between a known start time and the known end time are considered. However, when the end time is found to be not known (in step 8020), the present invention provides the following methodology. A reference end time is defined and a likelihood score is evaluated repeatedly after the reference end time at successive time intervals (step 8022). For example, after 500 ms the (scaled) likelihood score for each word is evaluated at 50 ms intervals thereafter up to 1000 ms from the start time of the word utterance. In the example, each word will have ten (scaled) likelihood scores.

A conservative approach is adopted in selecting which of the ten likelihood scores should be assigned to a given word. Specifically, for the series of likelihood scores obtained for a given word, the likelihood score that is highest relative to the likelihood scores of other words obtained at the same time interval is selected (step 8024). This highest likelihood score is then subtracted from all likelihood scores at that time interval. In this regard, the word having the highest likelihood score at a given interval is set at zero with the likelihood scores of the other less likely words having negative values. The least negative likelihood score for a given word is assigned thereto as the highest relative likelihood score for the word.

When likelihood scores are assigned to each word, the n words having the highest assigned likelihood scores are selected as candidate words resulting from polling (step 8026).

In one embodiment of the invention, the n words resulting from the polling are provided as a reduced list of words that are then subjected to processing according to the detailed match and language model described above. The reduced list obtained by polling, in this embodiment, acts in place of the acoustic fast match outlined above. In this regard, it is observed that the acoustic fast match provides a tree-like lattive structure in which word baseforms are entered as sequential phones, wherein words having the same initial phones follow a common branch along the tree structure. For a 2000 word vocabulary, the polling method has been found to be two to three times faster than the fast acoustic match which includes the tree-like lattice structure.

Alternatively, however, the acoustic fast match and the polling may be used in conjunction. That is, from the trained Markov models and the generated string of labels, the approximate fast acoustic match is performed in step 8028 in parallel with the polling. One list is provided by the acoustic match and one list is provided by the polling. In a conservative approach, the entries on one list are used in augmenting the other list. In an approach which seeks to further reduce the number of best candidate words, only words appearing in both lists are retained for further processing. The interaction of the two techniques in step 8030 depends on the accuracy and computational goals of the system. As yet another alternative, the lattice-style acoustic fast match may be applied to the polling list sequentially.

Apparatus 8100 for performing the polling is set forth in FIG. 44. Element 8102 stores word models that have been trained as discussed hereinabove. From the statistics applied to the word models, a vote generator 8104 evaluates the vote of each label for each word and stores the votes in vote table storage 8106.

Similarly, a penalty generator 8108 evaluates penalties of each label for each word in the vocabulary and enters the valves into penalty table storage 8110.

A word likelihood score evaluator 8112 receives labels generated by an acoustic processor 8114 in response to an unknown spoken input. For a given word selected by a word select element 8116, the word likelihood score evaluator 8112 combines the votes of each generated label for the selected word together with the penalties of each label not generated. The likelihood score evaluator 8112 includes means for scaling the likelihood score as discussed hereinabove. The likelihood score evaluator may also, but need not, include means for repeating the score evaluation at successive time intervals following a reference time.

The likelihood score evaluator 8112 provides word scores to a word lister 8120 which orders the words according to assigned likelihood score.

In an embodiment which combines the word list derived by polling with the list derived by approximate acoustic matching, the list comparer 8122 is provided. The list comparer receives as input the polling list from the word lister 8120 and from the acoustic fast match (which is described in several embodiments hereinabove).

To reduce storage and computational requirements, several features may be included. First, the votes and penalties can be formatted as integers ranging between 0 and 255. Second, the actual penalties can be replaced by approximate penalties computed from the corresponding vote as PEN=a.vote+b where a,b are constants and can be determined by least squares regression. Third, labels can be grouped together into speech classes where each class includes at least one label. The allocation of labels to classes can be determined by hierarchically clustering the labels so as to maximize the resulting mutual information between speech classes and words.

It should be further noted that, in accordance with the invention, periods of silence are detected (by known methods) and are ignored.

The present invention has been implemented in PL/I on an IBM MVS System, but may be implemented in other programming languages and on other systems given the teachings set forth herein.

(II) Determining Each Total Word Score From Plural Independent Word Scores

Figure 45:
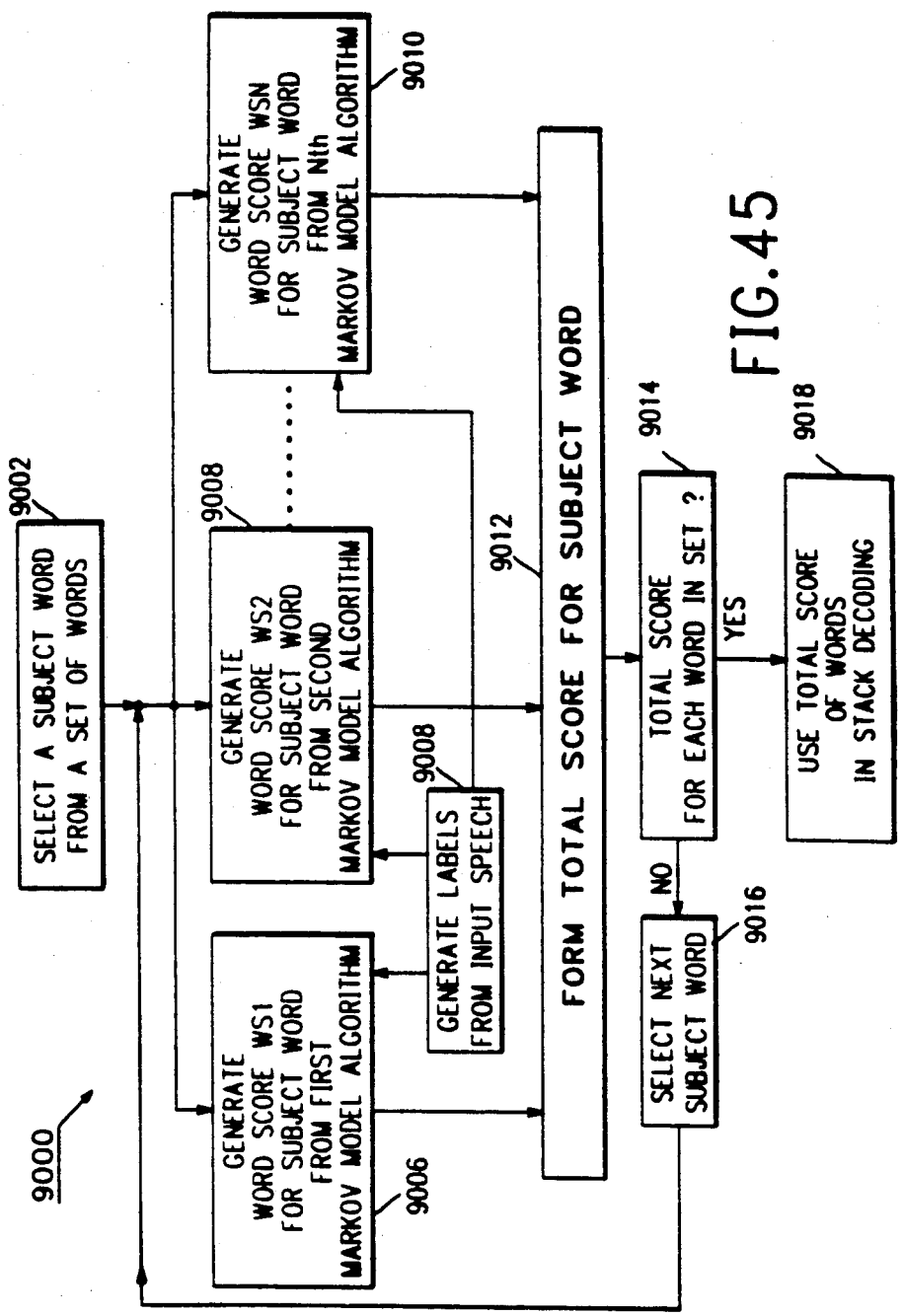
FIG. 45 is a flow of information diagram showing how a total word score is generated from a plurality independent word scores.

Referring to FIG. 45, a chart 9000 depicting the flow of information according to a general embodiment of the invention is illustrated. (A flowchart depicting the flow of control according to the present methodology may be readily derived from FIG. 45. In this regard, it is noted that FIG. 45 may apply to a single processor system or a multiple processor system in which a plurality of word scores are generated in parallel.) At step 9002 a word is selected from a set of words. The set includes those words which are to be processed in order to evaluate which word (or words) most closely conforms to a string of labels generated by an acoustic processor—such as acoustic processor 1004 of FIG. 1. It should be noted that the term "word score" is defined to represent the likelihood of a word or, alternatively, the likelihood of a "lexeme". A "lexeme" corresponds to one pronunciation of a word for words that are recognized as having plural pronunciations. (For example, THE1 and THE2 mentioned hereinabove are two lexemes of the word "THE".)

For a selected subject word, the generated labels are applied according to each of N independent Markov model algorithms (steps 9006 through 9010). "Independent" Markov models are generally characterized as those algorithms founded on baseforms of different sets of Markov models or in which different Markov model data is used in generating respective word scores or both. Accordingly, as discussed below, algorithms are "independent" if the algorithms are founded on baseforms based on differing Markov models; or if one algorithm employs polling data derived from Markov models and another algorithm employs acoustic matching data; or a combination of these distinctions.

For each independent Markov model algorithm, a respective word score (WS1 through WSN) is generated. These various word scores are combined—e.g. summed—in step 9012 to form a total word score TS for the selected subject word. If a total score has not been assigned to each word in the set (as determined at step 9014), another word from the set is selected (at step 9016) and a total score therefore is determined. After each word has an assigned total score (TS), the total scores are used in the stack decoder (see stack decoder description in section (I)(J)) in conjunction with results from a language model. The use of the total scores (TS) is reflected by step 9018. In particular, words having the higher total scores and having sufficient likelihood based on the language model are used in extending the chosen path found in accordance with the steps 5070 and 5072 of the process outlined in FIG. 22.

Figure 46:
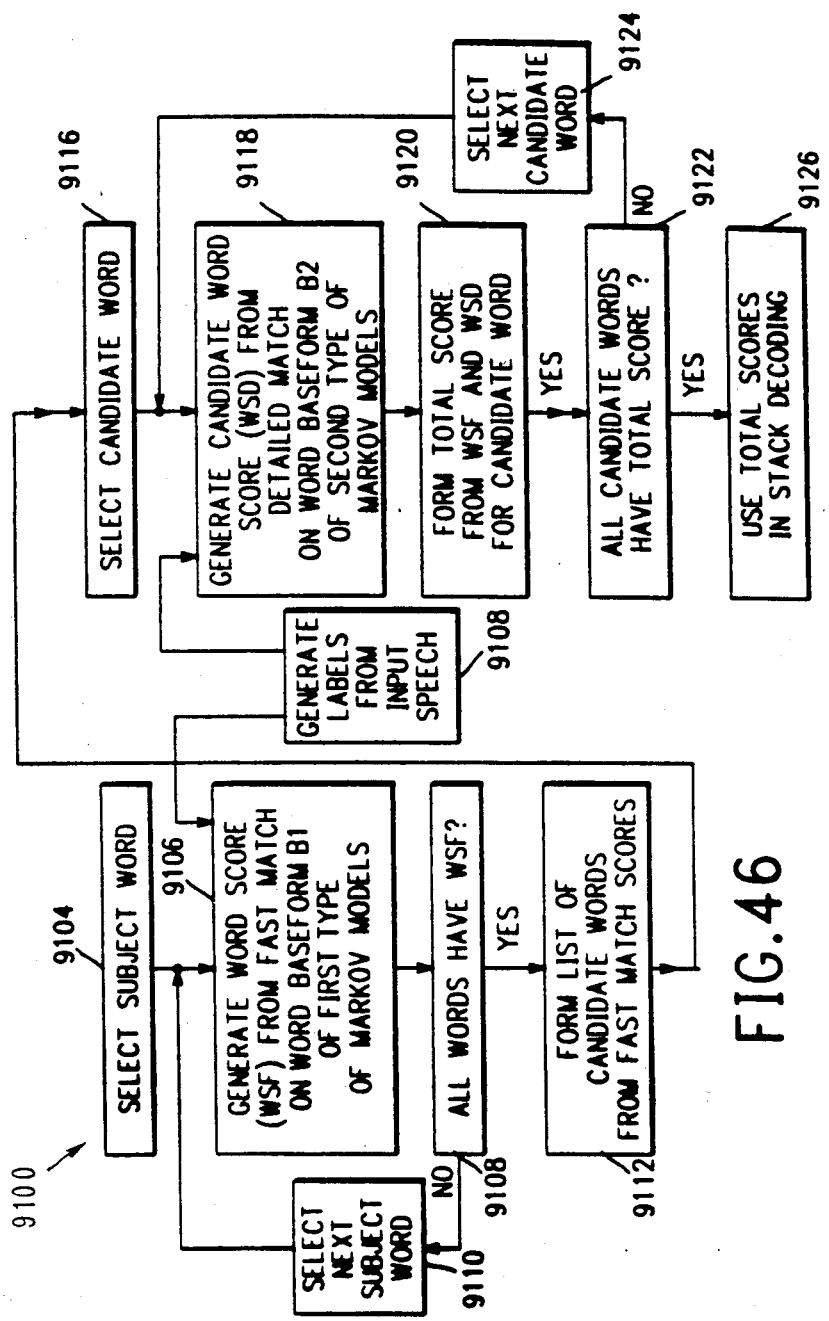
FIG. 46, FIG. 47, and FIG. 48 each represent specific embodiments depicting how a total word score is generated from a plurality independent word scores.

Turning next to FIG. 46, the flow of information for a specific embodiment 9100 is shown.

Word baseforms (B1) of a first type of Markov models (e.g. phonetic) have initially been stored. A subject word which has a B1 baseform is selected at step 9104.

For the subject word, a fast match word score is generated (step 9106) by applying a string of labels generated in response to a spoken input (step 9108) to the B1 baseform of the subject word. Preferably the fast match is performed on baseforms constructed from phonetic Markov models. That is, the basic fast match or one of the alternative fast match processes (discussed hereinabove) is employed in determining a fast match word score for the subject word. A fast match word score is determined for each word in a vocabulary of words (steps 9108 and 9110).

When all words in the vocabulary have been assigned a fast match word score (WSF), the words are formed into an ordered list based on score magnitude (step 9112). A number of words at the top of the ordered list are characterized as candidate words, the other words in the vocabulary being disregarded. As a result of steps 9102 through 9112, the number of words that need be processed further is reduced from 5000 words or more to 20-100 words—as described hereinabove with reference to the basic approximate (or fast) match or the enhanced embodiments extending therefrom.

For each vocabulary word, there is also a baseform (B2) defined in terms of a second type of Markov model. When the first type of Markov model—used in the fast match—is phonetic, the second type of Markov model is preferably fenemic. Each of the baseforms B2, which include the baseforms for the candidate words remaining after the fast match have been initially stored.

One of the candidate words is selected at step 9116 and the generated labels (from step 9108) are applied to the B2 baseform for the selected candidate word in accordance with the detailed match methodology. A detailed match word score (WSD) is generated for the selected candidate word based on the generated labels (step 9118). From the fast match score for a given candidate word and the detailed match score for the given candidate word, a total score (TS) is formed at step 9120. After a total score is determined for each candidate word (as a result of steps 9122 and 9124), the total scores are used in stack decoding (step 9126).

Figure 47:
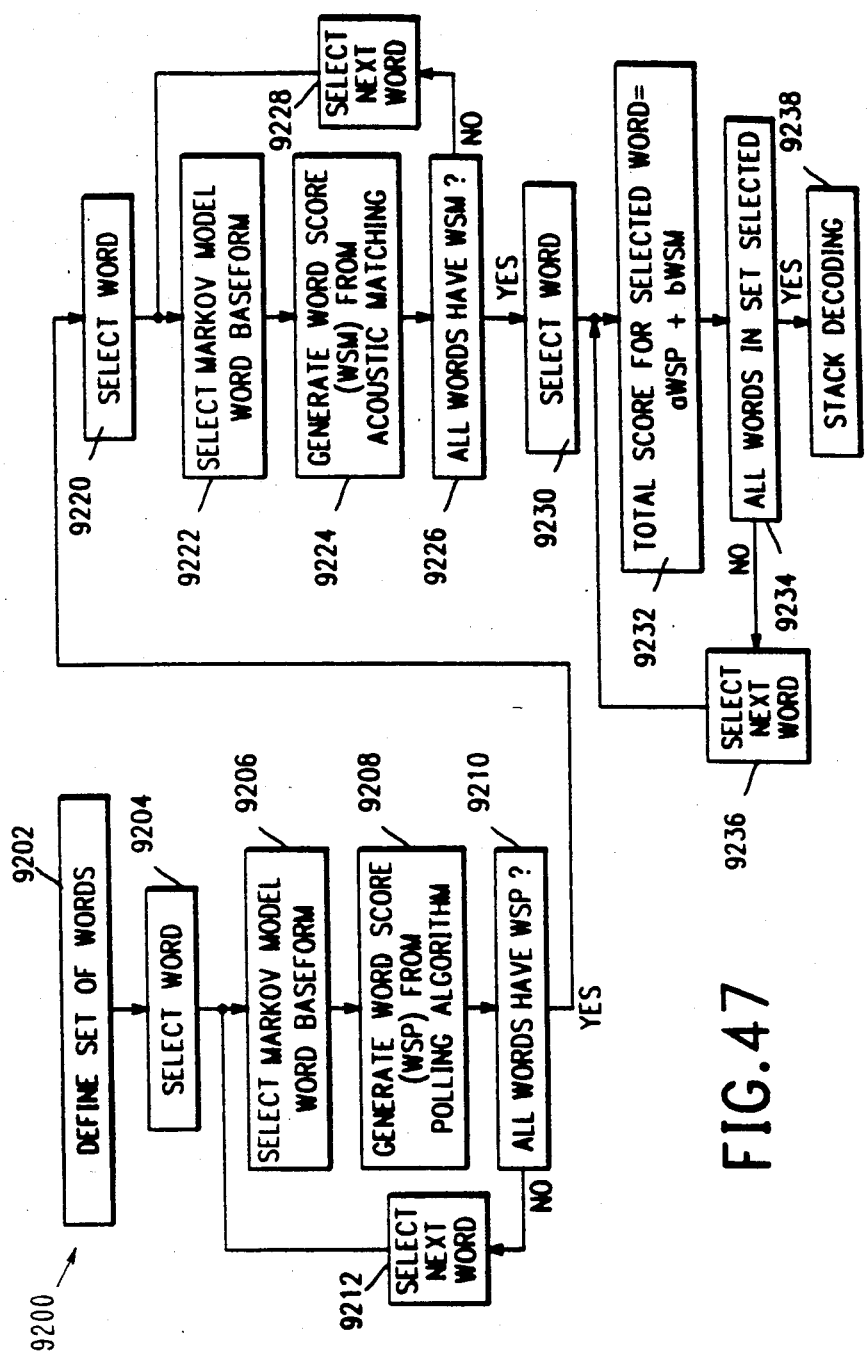

In FIG. 47, one algorithm involves polling and another involves acoustic matching. In this embodiment 9200, a set of words is defined at step 9202. The set may represent words in the vocabulary or may, alternatively, represent words in a reduced list of candidate words derived by applying the fast match or some other technique of reducing the number of words to be processed.

At step 9204, a word is selected from the set and, based on a Markov model baseform of step 9206, generates a word score from a polling algorithm. According to the polling algorithm described hereinabove in section (I)(P), each label has a respective vote for each word in the vocabulary and each label has a respective penalty for each word in the vocabulary. Each vote, that is, is a measure indicating the likelihood of a particular label occurring in a particular vocabulary word. Each penalty, on the other hand, represent a measure indicating the likelihood of a label not occurring in a particular vocabulary word. As noted hereinabove, for a given word and a given string of generated labels, the votes corresponding to the labels in the string for the given word are summed and the penalties corresponding to the labels in the string for the given word are summed. The sum of penalties is combined with the sum of votes to provide a polling word score (WSP) for the given word in step 9208. The polling algorithm as discussed immediately hereinabove is subject to modifications and variations as suggested in section (I)(P). Further, if desired, the polling algorithm may include only votes without penalties.

After all words have been assigned a polling word score (WSP) pursuant to steps 9210 and 9212, a word is again selected in step 9220. Based on generated labels and a Markov model baseform that represents the selected word (step 9222), an acoustic match score (WSM) is generated (step 9224). The acoustic matching scores may be detailed match scores or fast match scores, and the baseforms may, alternatively, comprise phonetic Markov models or fenemic Markov models. Moreover, the Markov models of step 9206 and 9222 may be of the same type or may differ in accordance with the teachings of the present invention. Pursuant to steps 9226 and 9228, each word in the set is assigned a WSM score.

When each word in the set has a polling score (WSP) and an acoustic match score (WSM), a word is selected in step 9230 and a total score (TS) is evaluated therefor in step 9232. The total score for each word is the sum of the polling score score and the acoustic match score—each score being weighted as deemed appropriate. The total score in 9232 is identified as $TS = a*WSP + b*WSM$, where WSP represents the polling score for a subject word and WSM represents the acoustic match score for the subject word. The "a" and "b" represent respective weighting factors for the two scores. Pursuant to steps 9234 and 9236, each word in the set is assigned a total score.

The stack decoding process (step 9238) uses words having high total scores.

Figure 48:
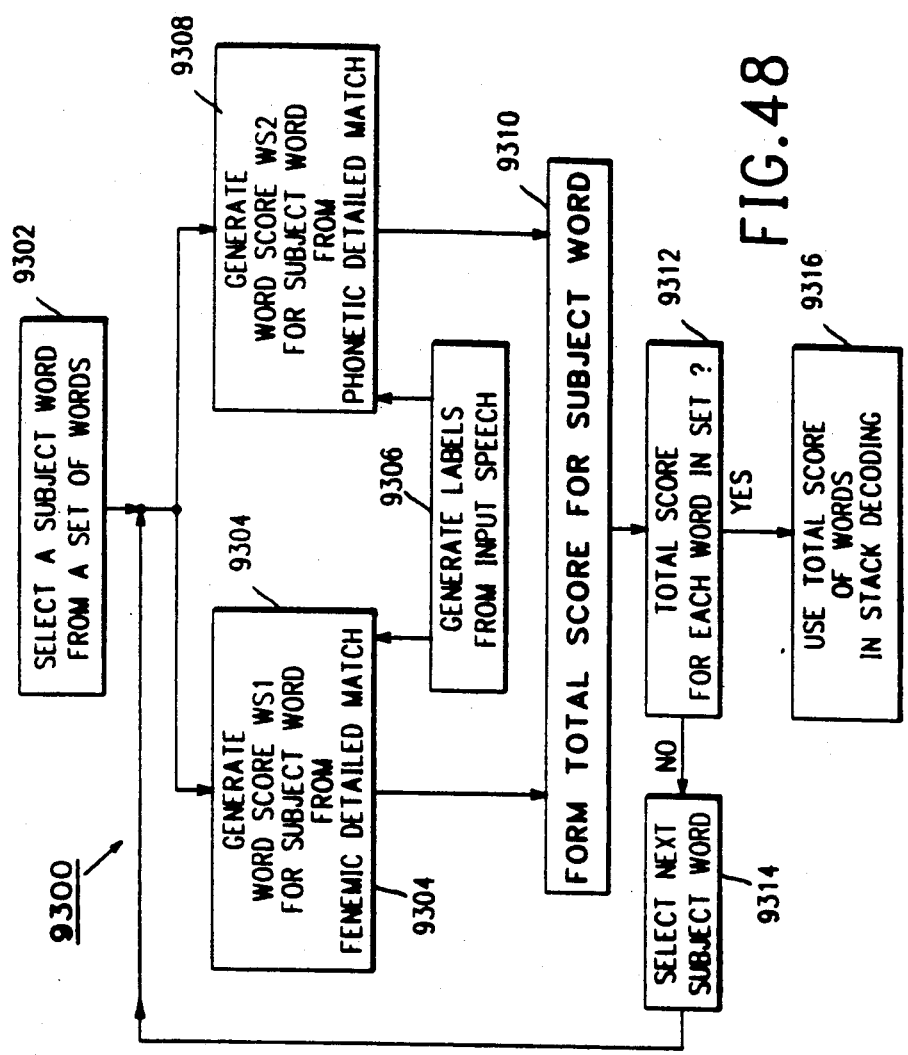

A further specific alternative embodiment 9300 of the present invention is depicted in FIG. 48 in flow of information form. At step 9302, a subject word is selected. For the subject word, a detailed match based on fenemic baseforms is performed and a score (WD1) generated at step 9304. The generated score is based on a string of labels generated in step 9306 in response to a spoken input. In step 9308 a second detailed match is performed and a score (WD2) generated. The generated score at step 9308 is based on the string of labels generated in step 9306. In step 9310, a total score is determined for the subject word. Pursuant to steps 9312 and 9314, each word in the set is processed as the subject word so that each word has a corresponding total score. The total scores are then used in the stack decoding (step 9316).

Referring to FIG. 49, a structure 9400 corresponding to the FIG. 46 methodology is depicted. The stack decoder 9402 invokes the fast match process 9404 and the detailed match process 9406 to generate fast match scores and detailed match scores respectively for words in a set of words, e.g. the vocabulary of words or a list of words selected therefrom. The fast match score (WSF) and detailed match score (WSD) for a subject word are combined by a total score process 9408.

In FIG. 50, a structure 9500 which implements the methodology of FIG. 47 is depicted. Specifically, a stack decoder 9502 selects the next word along a selected word path and notes the end-time distribution of such next word. That end-time distribution is then used as the start-time distribution for a subsequent next word. The end-time distribution is sent to the fast match algorithm processor 9504 and the polling algorithm processor 9506. Based on labels from the label generator 9508, fast match scores and polling scores are determined by respective processors 9504 and 9506. The respective scores for the more likely words (as determined by a candidate word generator 9510) are stored in storage elements 9512 and 9514 respectively. A total score processor 9516 then combines the stored scores and provides the total scores to the stack decoder 9502 for the next word selection process thereof.

While the invention has been described with reference to a preferred embodiment thereof, it will be understood by those skilled in the art that various changes in form and details may be made without departing from the scope of the invention.

TABLE 1

THE TWO LETTERS ROUGHLY REPRESENT THE SOUND OF ELEMENT.
TWO DIGITS ARE ASSOCIATED WITH VOWELS:
FIRST: STRESS OF SOUND
SECOND: CURRENT IDENTIFICATION NUMBER
ONE DIGIT ONLY IS ASSOCIATED WITH CONSONANTS:
SINGLE DIGIT: CURRENT IDENTIFICATION NUMBER

| | | | | |
|---|---|---|---|---|
| 001 AA11 | 029 BX2- | 057 EH02 | 148 TX5- | 176 XX11 |
| 002 AA12 | 030 BX3- | 058 EH11 | 149 TX6- | 177 XX12 |
| 003 AA13 | 031 BX4- | 059 EH12 | 150 UH01 | 178 XX13 |
| 004 AA14 | 032 BX5- | 060 EH13 | 151 UH02 | 179 XX14 |
| 005 AA15 | 033 BX6- | 061 EH14 | 152 UH11 | 180 XX15 |
| 006 AE11 | 034 BX7- | 062 EH15 | 153 UH12 | 181 XX16 |
| 007 AE12 | 035 BX8- | 126 RX1- | 154 UH13 | 182 XX17 |
| 008 AE13 | 036 BX9- | 127 SH1- | 155 UH14 | 183 XX18 |
| 009 AE14 | 037 DH1- | 128 SH2- | 156 UU11 | 184 XX19 |
| 010 AF15 | 038 DH2- | 129 SX1- | 157 UU12 | 185 XX2- |
| 011 AW11 | 039 DQ1- | 130 SX2- | 158 UXG1 | 186 XX20 |
| 012 AW12 | 040 DQ2- | 131 SX3- | 159 UXG2 | 187 XX21 |
| 013 AW13 | 041 DQ3- | 132 SX4- | 160 UX11 | 188 XX22 |
| 014 AX11 | 042 DQ4- | 133 SX5- | 161 UX12 | 189 XX23 |
| 015 AX12 | 043 DX1- | 134 SX6- | 162 UX13 | 190 XX24 |
| 016 AX13 | 044 DX2- | 135 SX7- | 163 VX1- | 191 XX3- |
| 017 AX14 | 045 EE01 | 136 TH1- | 164 VX2- | 192 XX4- |
| 018 AX15 | 046 EE02 | 137 TH2- | 165 VX3- | 193 XX5- |
| 019 AX16 | 047 EE11 | 138 TH3- | 166 VX4- | 194 XX6- |
| 020 AX17 | 048 EE12 | 139 TH4- | 167 WX1- | 195 XX7- |
| 021 BQ1- | 049 EE13 | 140 TH5- | 168 WX2- | 196 XX8- |
| 022 BQ2- | 050 EE14 | 141 TQ1- | 169 WX3- | 197 XX9- |
| 023 BQ3- | 051 EE15 | 142 TQ2- | 170 WX4- | 198 ZX1- |
| 024 BQ4- | 052 EE16 | 143 TX3- | 171 WX5- | 199 ZX2- |
| 025 BX1- | 053 EE17 | 144 TX1- | 172 WX6- | 200 ZX3- |
| 026 BX10 | 054 EE18 | 145 TX2- | 173 WX7- | |
| 027 BX11 | 055 EE19 | 146 TX3- | 174 XX1- | |
| 028 BX12 | 056 EH01 | 147 TX4- | 175 XX10 | |

TABLE 2

| PHONE | 3 DH | 7 ARCS. - 13 ARCS. | | 3 ARC LABELS. | | | | | |
|---|---|---|---|---|---|---|---|---|---|
| NODE | 1 | 2 | 3 | 4 | 5 | 6 | 7 | | |
| LABEL | 8 | 9 | 10 | 11 | 12 | 13 | 0 | | |
| COUNT | 31.0 | 1.7 | 1.7 | 119.1 | 115.4 | 120.1 | 0.0 | | |
| ARC | 1→2 | 1→4 | 1→7 | 2→3 | 2→7 | 3→7 | 3→7 | 4→4 | 4→5 | 5→5 |
| LABEL | 4 | 4 | NULL | 5 | NULL | 6 | NULL | 4 | 5 | 5 |
| PROB | 0.07243 | 0.92757 | 0.00000 | 0.99259 | 0.00741 | 0.93982 | 0.06018 | 0.75179 | 0.24821 | 0.74389 |
| ARC | 5→6 | 6→6 | 6→7 | | | | | | | |
| LABEL | 5 | 6 | 6 | | | | | | | |
| PROB | 0.25611 | 0.75370 | 0.24630 | | | | | | | |
| LABEL | 4 | 5 | 6 | | | | | | | |
| COUNT | 120.8 | 146.4 | 121.6 | | | | | | | |
| AE13 | | | 0.091 | | | | | | | |
| BX10 | 0.030 | | | | | | | | | |
| BX3- | 0.130 | | | | | | | | | |
| BX8- | 0.011 | 0.086 | | | | | | | | |
| DH1- | 0.020 | 0.040 | 0.013 | | | | | | | |
| DQ2- | 0.011 | 0.052 | | | | | | | | |
| EH01 | 0.010 | 0.014 | 0.167 | | | | | | | |
| EH02 | | | 0.026 | | | | | | | |
| EH11 | | | 0.015 | | | | | | | |
| EH13 | | | 0.012 | | | | | | | |
| EH14 | | | 0.062 | | | | | | | |
| ER14 | | | 0.024 | | | | | | | |
| FX2- | | 0.045 | | | | | | | | |
| FX3- | | 0.148 | | | | | | | | |
| GX2- | | 0.013 | | | | | | | | |
| GX5- | 0.148 | | | | | | | | | |

TABLE 2-continued

| | | | |
|---|---|---|---|
| GX6- | 0.246 | 0.023 | |
| HX1- | | 0.011 | |
| IX04 | 0.011 | | 0.020 |
| IX13 | 0.025 | | 0.026 |
| KQ1- | | 0.014 | 0.024 |
| KX2- | | 0.013 | |
| MX2- | 0.029 | 0.043 | 0.012 |
| NX3- | 0.019 | | |
| NX5- | 0.049 | | |
| NX6- | | 0.017 | 0.012 |
| OU14 | | | 0.023 |
| PQ1- | 0.029 | 0.018 | |
| TH2- | | 0.020 | |
| TQ3- | | 0.017 | |
| UH01 | | | 0.020 |
| UH02 | 0.025 | 0.082 | 0.109 |
| UXG2 | | | 0.016 |
| UX12 | | | 0.062 |
| UX13 | | | 0.183 |
| VX1- | | | 0.016 |
| VX3- | 0.041 | 0.283 | 0.016 |
| WX2- | 0.023 | 0.014 | |
| XX23 | 0.072 | | |
| OTHER | 0.073 | 0.047 | 0.048 |

APPENDIX

```
"  Subroutine EXTCOL.                                              "
"                                                                  "
"  Extends the column                                              "
"                                                                  "
"  Register Usage:                                                 "
"                                                                  "
"     SP:  , 1, 2, 3, 4, 5, 6, 7, 8, 9, 10, 11, 12, 13, 14, 15     "
"                                                                  "
"     DPX: -4, -3, -2, -1, 0              (DPA = 0)                "
"     DPY: -4, -3, -2, -1, 0, 1, 2, 3     (DPA = 0)                "
"                                                                  "

"  Restore the registers from main memory.                         "

EXTCOL:   LDMA; DB = SFENPTR; WRTLMN      "get feneme list pointer
          LDMA; DB = STLPPTR; WRTLMN      "get tail prob list pointer
          LDMA; DB = SSTROFF; WRTLMN      "get start offset LDSPI FENPTR; DB < MD           "save feneme list pointer
          LDSPI TLPPTR; DB < MD           "save tail prob list pointer
          LDSPI STROFF; DB < MD           "save start offset LDMA; DB = SSTRROW; WRTLMN      "get start row
          LDMA; DB = SOUTOFF; WRTLMN      "get output offset
          LDMA; DB = SINBNDY; WRTLMN      "get input boundary pointer LDSPI STRROW; DB < MD           "save start row
          LDSPI OUTOFF; DB < MD           "save output offset
          LDSPI INBNDY; DB < MD           "save input boundary pointer LDMA; DB = STIME;   WRTLMN      "get the current time
          LDMA; DB = SSTRLEN; WRTLMN      "get start distribution length
          LDMA; DB = ALEXLEX; WRTLMN      "get lexeme length LDSPI TIME;   DB < MD           "save current time
          LDSPI STRLEN; DB < MD           "save start distribution length
          LDSPI LOOPCNT; DB < MD          "save lexeme length SUB   STRROW, LOOPCNT           "loop count = lexlen - strrow
          LDSPI PRMADR; DB = SFENPTR      "put back feneme pointer + 1
          INC   FENPTR; DPX(-3) < SPFN
          MOV   PRMADR, PRMADR; SETMA; MI < DPX(-3)
```

```
        LDSPI PRMADR; DB = STLPPTR       "put back tail pointer + 1
        INC   TLPPTR; DPX(-3) < SPFN
        MOV   PRMADR, PRMADR; SETMA; MI < DPX(-3)

LDSPI PRMADR; DB = SINBNDY        "put back inbndy + 1
        INC   INBNDY; DPX(-3) < SPFN
        MOV   PRMADR, PRMADR; SETMA; MI < DPX(-3)

LDSPI PRMADR; DB = STIME          "put back time + 1
        INC   TIME;   DPX(-3) < SPFN
        MOV   PRMADR, PRMADR; SETMA; MI < DPX(-3)
```

"""""""""""""""""""""""""""""""""""""""""""""""""""""""""""""""""""""
" Get the next feneme and tail probability.                         "
"""""""""""""""""""""""""""""""""""""""""""""""""""""""""""""""""""""

```
        OUT;  DB = PAGE0                  "flip to page zero
        MOV   FENPTR, FENPTR; SETMA       "get next feneme
        MOV   TLPPTR, TLPPTR; SETMA       "get next tail probability
        OUT;  DB = PAGE1                  "flip back to page one
        LDSPI FENEME; DB < MD             "save the feneme
        DPY(TPY) < MD                     "save the tail probability
        MOV   FENEME, FENEME; DPX(CFENX) < SPFN LDSPI FENLOK; DB = AFENLOK        "get base addr of feneme lookup
        ADD   FENEME, FENLOK; SETMA      "use feneme to get fenbas
        LDSPI INCOL;  DB = ACOLUMN        "get base addr for input col
        LDSPI OUTCOL; DB = ACOLUMN        "get base addr for output col
        LDSPI FENBAS; DB < MD             "pointer into feneme probs ADD   STROFF, INCOL               "incol = start_offset + ...
        ADD   STRROW, INCOL               "        start_row
        ADD   OUTOFF, OUTCOL              "outcol = output_offset + ...
        ADD   STRROW, OUTCOL              "        start_row - 2;

LDSPI TRMLOK; DB = ATRMLOK        "get base addr of tram lookup
        ADD   STRROW, TRMLOK; SETMA       "lookup the tram base ptr
        DEC   OUTCOL                      "outcol... - 1
        DEC   OUTCOL                      "outcol... - 2
        LDSPI TRMPTR; DB < MD             "get starting tram addr
        LDSPI PRMADR; DB = !FFTSZ         "compensate for tram base
        ADD   PRMADR, PRMADR              "which is at 2 x !FFTSZ
        ADD   PRMADR, TRMPTR
```

"""""""""""""""""""""""""""""""""""""""""""""""""""""""""""""""""""""
" Start the pipeline going...                                       "
"""""""""""""""""""""""""""""""""""""""""""""""""""""""""""""""""""""

```
        MOV   INCOL, INCOL;  SETMA        "get col(start_ptr)
        MOV   INBNDY, INBNDY; SETMA       "get inbndy(time) in case
        SUB#  TIME, STRLEN                "start_length - time
        BLT   OUTSIDE;                    "if <= we are outside inbndy
              DPY(LIY) < MD               "and save col(start_ptr)

INSIDE: FADD  DPY(LIY), MD                "col() + inbndy(time)
        FADD                              "push the adder
        DPY(LIY) <FA                      "last_input = col + inbndy OUTSIDE: DPY(PROFY) < ZERO                "zero out the running profile
```

"""""""""""""""""""""""""""""""""""""""""""""""""""""""""""""""""""""
" Start the pipeline going... start first loop                      "
"""""""""""""""""""""""""""""""""""""""""""""""""""""""""""""""""""""

```
        MOV TRMPTR, TRMPTR; SETTMA        "start transfer of phone num

NOP                                "wait for table memory

LDSPI PHONE; DB < TM;             "save the phone number
           INCTMA                         "increment tramptr
```

```
        ADD FENBAS, PHONE; SETMA      "lookup feneme prob

FADD DPY(LIY), ZERO;          "push last_state thru adder
          INCTMA                      "start transfer of null trans FADD;                         "push the adder
          INCTMA;                     "start transfer of phone num
          DPY(SOFAY) < ZERO           "clear 2nd oldest farc
```

```
""""""""""""""""""""""""""""""""""""""""""""""""""""""""""""""""""""""""
"  Start the pipeline going... do first loop                            "
""""""""""""""""""""""""""""""""""""""""""""""""""""""""""""""""""""""""

FMUL TM, FA;                  "null trans * last_input
          INC INCOL; SETMA;           "start transfer of col()
          DPY (LIY) < FA;             "save last input
          FADD DPY(PROFY), FA;        "profile = prof + last_input
          DPX (FENX) < MD FMUL DPX(FENX), DPY(TPY);     "feneme prob * tail prob
          LDSPI PHONE; DB < TM;       "save the phone number
          INCTMA;                     "start trans of self trans
          FADD                        "push the adder FMUL;
          DPY(PROFY) < FA;            "save the running profile
          ADD FENBAS, PHONE; SETMA;   "lookup feneme prob
          DPX(FAX) < ZERO;            "zero out forward arc
          FADD                        "null add FADD FM, MD;                  "col() + null*last_input
          FMUL TM, DPX(FAX);          "self trans * forward arc
          INCTMA;                     "start transfer of null trans
          DPX(OFAX) < DPY(SOFAY)      "push queue of forward arcs FADD;
          FMUL FM, DPY(LIY);          "last_input * feneme_prob
          INCTMA;                     "start transfer of phone num
          DPY(SOFAY) < DPX(FAX)       "zero out 2nd oldest farc
```

```
""""""""""""""""""""""""""""""""""""""""""""""""""""""""""""""""""""""""
"  Loop for index = 1 to loopcnt (= lexeme_length - start_row)          "
""""""""""""""""""""""""""""""""""""""""""""""""""""""""""""""""""""""""

EXTLOOP: FMUL TM, FA;                 "null trans * last_input
          INC INCOL; SETMA;           "start transfer of col()
          DPY (LIY) < FA;             "save last input
          FADD DPY(PROFY), FA;        "profile = prof + last_input
          DPX (FENX) < MD FMUL DPX(FENX), DPY(TPY);     "feneme prob * tail prob
          DPY(SELFY) < FM;            "save self arc
          LDSPI PHONE; DB < TM;       "save the phone number
          INCTMA;                     "start trans of self trans
          FADD                        "push the adder FMUL;
          DPY(PROFY) < FA;            "save the running profile
          ADD FENBAS, PHONE; SETMA;   "lookup feneme prob
          DPX(FAX) < FM;              "save forward arc
          FADD DPY(SELFY), DPX(OFAX)  "self + oldest_farc FADD FM, MD;                  "col() + null*last_input
          FMUL TM, DPX(FAX);          "self trans * forward arc
          INCTMA;                     "start transfer of null trans
          DEC LOOPCNT;                "decrement the loop count
          DPX(OFAX) < DPY(SOFAY)      "push queue of forward arcs FADD;
          FMUL FM, DPY(LIY);          "last_input * feneme_prob
```

```
            INCTMA;                        "start transfer of phone num
            INC OUTCOL; SETMA;             "put out next_output
            MI < FA;
            DPY(SOFAY) < DPX(FAX);         "push forward arc queue
            BGT EXTLOOP                    "keep looping until done(BNE)
"""""""""""""""""""""""""""""""""""""""""""""""""""""""""""""""""""""""""
"  Trail out of loop...                                                 "
"""""""""""""""""""""""""""""""""""""""""""""""""""""""""""""""""""""""""

FMUL TM, FA;                   "calculate last forward arc
            DPY (LIY) < FA;                "save last input
            FADD DPY(PROFY), FA            "profile = prof + last_input FMUL;                          "push the multiplier
            DPY(SELFY) < FM;               "save self arc
            INCTMA;                        "start trans of self trans
            FADD                           "push the adder FMUL;
            DPY(PROFY) < FA;               "save the running profile
            DPX(FAX) < FM;                 "save forward arc
            FADD DPY(SELFY), DPX(OFAX)     "self + oldest_farc FADD;                          "push the adder
            FMUL TM, DPX(FAX);             "self trans * forward arc
            DPX(OFAX) < DPY(SOFAY)         "push queue of forward arcs FMUL;                          "push the multiplier
            INC OUTCOL; SETMA;             "put out next_output
            MI < FA;
            DPY(SOFAY) < DPX(FAX)          "push forward arc queue """""""""""""""""""""""""""""""""""""""""""""""""""""""""""""""""""""""""
"  Push last outputs out of loop...                                     "
"""""""""""""""""""""""""""""""""""""""""""""""""""""""""""""""""""""""""

FMUL                           "push the multiplier

FADD FM, DPX(OFAX)             "self + oldest_farc

FADD;                          "push the adder
            DPX(OFAX) < DPY(SOFAY)         "push queue of forward arcs INC OUTCOL; SETMA;             "put out next_output
            MI < FA;
            DPY(SOFAY) < DPX(FAX)          "push forward arc queue INC OUTCOL; SETMA;
            MI < DPX(OFAX)                 "push out oldest forward arc RETURN                         "finished EXTCOL
"""""""""""""""""""""""""""""""""""""""""""""""""""""""""""""""""""""""""
"
"  SUBROUTINE APFM
"
"  This program implements the acoustic Fast Match in the FPS Array
"  Processor. This is the modified Fast Match that runs without
"  explicit length distributions.
"
"
"
"
"""""""""""""""""""""""""""""""""""""""""""""""""""""""""""""""""""""""""

"""""""""""""""""""""""""""""""""""""""""""""""""""""""""""""""""""""""""
"
"  SUBROUTINE EVALPP
"
```

```
"  This routine performs the actual fast match calculation for the    "
"  current lattice node.  The main program only calls this routine to "
"  evaluate valid nodes - not the null nodes that correspond to leaves."
"                                                                      "
""""""""""""""""""""""""""""""""""""""""""""""""""""""""""""""""""""""""

""""""""""""""""""""""""""""""""""""""""""""""""""""""""""""""""""""""""
"                                                                      "
"  Initializations...  given the current lattice node number, look up  "
"  the corresponding clink number, set up match parameters such as     "
"  the length of the start time distribution, pointers to the start    "
"  time distribution in the boundary stacks, and the offset into the   "
"  feneme stream.                                                      "
"                                                                      "
""""""""""""""""""""""""""""""""""""""""""""""""""""""""""""""""""""""""
```

```
""""""""""""""""""""""""""""""""""""""""""""""""""""""""""""""""""""""""
"                                                                      "
"  Initial_zeroes = 4:                                                 "
"                                                                      "
"  Pad the start time distribution with 4 zeroes, increase SDLEN by 4  "
"  to simplify looping after start time distribution ends.             "
"                                                                      "
"  Initialize output_distribution (time - 1), output_sum, set feneme   "
"  prob for first time slice equal to zero by clearing the multiplier. "
"                                                                      "
"  output_distribution (0) = 0.0;                                      "
"  output_sum              = 0.0;                                      "
"  feneme_prob             = 0.0;                                      "
"  state_1                 = 0.0;                                      "
"  state_2                 = 0.0;                                      "
"  state_3                 = 0.0;                                      "
"  state_4                 = 0.0;                                      "
"                                                                      "
""""""""""""""""""""""""""""""""""""""""""""""""""""""""""""""""""""""""

ZERO4:      ADD# SDARY, SDLEN;              "point to last sample in the
              SETMA;                        "start time distribution
              DPX(LASTX) < ZERO;            "zero the last output sample
              DPY(OSY)   < ZERO             "zero the output sum INCMA;                          "last sample + 1
              MI < ZERO;                    "pad out with zero
              DPY(ST1Y) < ZERO;             "state_1 = 0.0
              INC SDLEN                     "sdlen = sdlen + 1

INCMA;                          "last sample + 2
              MI < ZERO;                    "pad out with zero
              DPY(ST2Y) < ZERO;             "state_2 = 0.0
              INC SDLEN                     "sdlen = sdlen + 2

INCMA;                          "last sample + 3
              MI < ZERO;                    "pad out with zero
              DPY(ST3Y) < ZERO;             "state_3 = 0.0
              INC SDLEN                     "sdlen = sdlen + 3

INCMA;                          "last sample + 4
              MI < ZERO;                    "pad out with zero
              DPY(ST4Y) < ZERO;             "state_4 = 0.0
              INC SDLEN                     "sdlen = sdlen + 4

CLR TIME;                       "output time counter = 0
              FMUL DPX(LASTX), DPY(OSY)     "clear the multiplier MOV SDLEN, LOPLIM;              "1st loop limit = sdlen
              FMUL                          "push the multiplier
```

```
"  First loop: initial_zeroes = 4
"
"  Calculate output distribution value for current time, update output
"  sum, calculate feneme probability for the next time slice.
"
"  do time = 1 to start_time_length + 4;
"     output_distribution (time) =
"         feneme_prob * (output_distribution (time - 1) + state_1);
"     output_sum  = output_sum + output_distribution (time);
"     state_1     = state_2 * feneme_prob;
"     state_2     = state_3 * feneme_prob;
"     state_3     = state_4 * feneme_prob;
"     state_4     = st_array (time);
"     feneme_prob = fd_array (local_buffer(first_feneme + time))
"                   * tail_buffer (first_feneme + time);
"  end;
"
```

```
L41:        INC LFARY;                          "start transfer of next
            SETMA;                              "feneme symbol from stream
            FADD DPX(LASTX), DPY(ST1Y);         "add last output + state_1
            FMUL                                "push the multiplier INC TPARY;                          "start transfer of next
            SETMA;                              "tail probability
            FMUL FM, DPY(ST2Y);                 "state_2 * feneme_prob
            FADD;                               "push the adder pipeline
            DPX(FPX) < FM                       "save feneme_prob INC SDARY;                          "transfer next starting pt
            SETMA;
            FMUL DPX(FPX), FA                   "(last+st1) * feneme_prob LDSPI FDOFF;                        "get the current feneme
            D3 = MD;                            "symbol from bus
            FMUL DPX(FPX), DPY(ST3Y)            "state_3 * feneme_prob ADD# FDOFF, FDARY;                  "start transfer of next
            SETMA;                              "feneme probability
            DPX(TPX) < MD;                      "save next tail probability
            FMUL DPX(FPX), DPY(ST4Y);           "state_4 * feneme_prob
            DPY(ST1Y) < FM                      "state_1 = state_2 * fp FMUL;                               "push the multiplier
            DPX(LASTX) < FM;                    "save output sample
            DPY(ST4Y) < MD                      "store next input sample INC TIME;                           "update the time counter
            FMUL;                               "push the multiplier
            DPY(ST2Y) < FM;                     "state_2 = state_3 * fp
            FADD DPX(LASTX), DPY(OSY)           "add output to output_sum DEC LOPLIM;                         "at end of loop?
            FMUL DPX(TPX), MD;                  "feneme * tail prob
            DPY(ST3Y) < FM;                     "state_3 = state_4 * fp
            FADD                                "push the adder BGT L41;                            "keep looping if not done
            FMUL;                               "push the multiplier
            DPY(OSY) < FA;                      "save output_sum
            INCTMA;                             "update pointer to scratch
            D3 = DPX(LASTX);                    "area for output dist, save
            OUT                                 "the output sample
```

```
"
"  Second loop:
"
"  Time is now equal to start_time_length + initial_zeroes, so the
"  start time distribution has ended and all internal states are
```

```
"   equal to zero.  Therefore, this section of code is common to all       "
"   cases of initial zeroes.                                               "
"                                                                          "
"   Loop until time_limit (start_time_length + ld_length - 1), or until    "
"   the output falls below loop_cutoff.                                    "
"                                                                          "
"                                                                          "
"   do time = start_time_length + 1 + initial_zeroes to time_limit         "
"           while (output_distribution (time) >= loop_cutoff);             "
"                                                                          "
"     output_distribution (time) =                                         "
"           feneme_prob * output_distribution (time - 1);                  "
"     output_sum  = output_sum + output_distribution (time);               "
"     feneme_prob = fd_array (local_buffer(first_feneme + time))           "
"                 * tail_buffer (first_feneme + time);                     "
"   end;                                                                   "
"                                                                          "
""""""""""""""""""""""""""""""""""""""""""""""""""""""""""""""""""""""""""""
```

| | | |
|---|---|---|
| EVAL2: | MOV LDLEN, LOPLIM | "loop limit = ld_len - 1 |
| | SUB INTZERO, LOPLIM | " - initial_zeroes |
| | DEC LOPLIM | |
| | BGT L42 | "if looplimit > 0, do it |
| | JMP EVOUT | "otherwise, jump to exit |
| | | |
| L42: | INC LFARY; | "start transfer of next |
| | SETMA; | "feneme symbol from stream |
| | FMUL | "push the multiplier |
| | | |
| | INC TPARY; | "get next tail prob |
| | SETMA; | "from buffer |
| | FMUL FM, DPX(LASTX) | "last = last * feneme_prob |
| | | |
| | FMUL | "push the multiplier |
| | | |
| | LDSPI FDOFF; | "get feneme symbol |
| | D3 = MD; | "from input stream |
| | FMUL | "push the multiplier |
| | | |
| | ADD# FDOFF, FDARY; | "use feneme as pointer into |
| | SETMA; | "probability array |
| | DPX(TPX) < MD; | "save the tail probability |
| | FSUBR FM, DPY(LCY) | "compare output to cutoff |
| | | |
| | FADD FM, DPY(OSY); | "add output into output_sum |
| | DPX(LASTX)<FM | "save output in register |
| | | |
| | INC TIME; | "increment time counter |
| | FADD | "push the adder |
| | | |
| | DEC LOPLIM; | "see if we are done yet |
| | FMUL DPX(TPX), MD; | "feneme * tail probability |
| | BFGE EVOUT; | "quit if output < cutoff |
| | DPY(OSY)<FA | "save output sum |
| | | |
| | BGT L42; | "if not done, keep looping |
| | FMUL; | "push the multiplier |
| | INCTMA; | "update pointer to scratch |
| | D3 = DPX(LASTX); | "area for output dist, save |
| | OUT | "the output sample |

We claim:

1. In a speech recognition system which represents each vocabulary word or a portion thereof by at least one sequence of phones wherein each phone corresponds to a respective phone machine, each phone machine having associated therewith (a) a plurality of transitions and (b) actual label output probabilities, each actual label probability representing the probability that a subject label is generated at a given transition in the phone machine, a method of performing an acoustic match between phones and a string of labels produced by an acoustic processor in response to a speech input, the method comprising the steps of:

forming simplified phone machines which includes the step of replacing by a single specific value the actual label probabilities for a given label at all transitions at which the given label may be generated in a particular phone machine; and determining the probability of a phone generating the labels in the string based on the simplified phone machine corresponding thereto.

2. A method as in claim 1 wherein each string of phones corresponding to a vocabulary word or predefined portion thereof represents a phonetic baseform, the method including the further step of:

arranging the baseforms into a tree structure in which baseforms share a common branch for as long the baseforms have at least similar phonetic beginnings, each leaf of the three structure corresponding to a complete baseform.

3. A method as in claim 2 wherein the labels are produced at successive time intervals, the method comprising the further step of:

matching no more than a predefined maximum number of labels with corresponding vocabulary words.

4. A method as in claim 3 wherein labels occur at intervals on the order of one centisecond each and wherein the predefined maximum length is on the order of one hundred centiseconds.

5. A method as in claim 1 wherein the specific value assigned to all label probabilities for a particular label in a given phone machine is equal to at least the maximum actual label probability over all transitions for said particular label in the given phone machine.

6. A method as in claim 5 wherein each phone machine also has associated therewith (c) a length distribution for each phone which indicates probability as a function of the number of labels produced by a particular phone, the method including the further step of:

converting the length distribution for each phone into a uniform probability length pseudo-distribution which includes the step of ascribing a uniform value to the probability of a given phone producing any number of labels defined in the length distribution.

7. A method as in claim 6 comprising the further steps of:

finding the minimum length of labels having a nonzero probability; and confining the uniform pseudo-distribution to lengths at least as long as the minimum length, lengths less than the minimum length being assigned a probability of zero.

8. A method as in claim 7 including the steps of, for each phone machine:

inputting a string of labels to the phone machine;
 generating a phone match value;
 generating a phone end-time distribution; and
 deriving a start-time distribution for the next phone from the end-time distribution of the current phone;
 the match value and the end-time distribution being generated in response to the inputting into the phone machine of (a) labels and (b) the start-time distribution derived from the previous phone.

9. A method as in claim 8 comprising the further step of:

forming a match score for a given baseform including the step of summing the match values for sequential phones which represent at least a beginning portion of the given baseform.

10. A method as in claim 9 including the further step of:

selecting a number of words represented by respective baseforms which have the highest match scores.

11. A method as in claim 10 including the further step of:

performing a detailed acoustic match with an unsimplified phone machine for each word of the selected number of words to determine a most probable word.

12. A method as in claim 2 wherein each phone machine also has associated therewith (c) a length distribution for each phone which indicates probability as a function of the number of labels produced by a particular phone, the method including the further step of:

converting the length distribution for each phone into a uniform probability length pseudo-distribution which includes the step of acribing a uniform value to the probability of a given phone producing any number of labels defined in the length distribution.

13. A method as in claim 12 wherein the specific value assigned to all label probabilities for a particular label in a given phone machine is equal to at least the maximum actual label probability over all transitions for said particular label in the given phone machine.

14. A method of performing an acoustic match of words in a vocabulary against a string of labels which represent a speech input, the method comprising the steps of:

entering as inputs to the phone machine of a given phone (a) the string of labels and (b) a respective start-time distribution for the given phone; and generating (a) an end-time distribution and (b) a match value of the given phone relative to the entered labels based on the generated end-time distribution;

the match value generated for each particular phone corresponding to the probability that said each particular phone produced the entered string of labels.

15. A method as in claim 14 wherein said end-time distribution generating step for each given phone includes the steps of:

determining a start-time distribution for a current phone from the end-time distribution of the previous phone;

setting a uniform length probability for each label string length that (a) may have been produced by a given phone and (b) is between a minimum length having a non-zero probability and a predefined maximum length;

thereby defining a length pseudo-distribution that is characterized (a) as uniform between the minimum length and maximum length and (b) as zero for all other lengths;

setting, for each of a plurality of labels, a label probability replacement value that a given phone machine produces a given label at any transition in the phone machine; and determining the probability of end-times in an end-time distribution based on label output replacement values and start-time distribution.

16. A method as in claim 15 including the further steps of:

forming a tree of baseforms wherein each baseform extends from the base of the tree to a leaf thereof as a sequence of phones, each baseform representing a word; and scoring the probability that a given word represented by a respective sequence of phones matches the entered labels, said scoring including the step of summing the match values of phones along the respective sequence.

17. A method as in claim 16 wherein at least some of the start-time distributions are derived from the end-time distribution of the most recent previous phone.

18. Apparatus for matching words with a string of incoming labels in a pattern recognition system, the apparatus comprising:

at least one phone machine;

each phone machine being characterized by having (a) a plurality of states and transition paths between states, (b) transition probabilities $T(i \rightarrow j)$ representing the probability of state $S_j$ given a current state $S_i$ where $S_i$ and $S_j$ may be the same state or different states, and (c) actual label probabilities wherein each actual label probability $p(y_k)$ indicates the probability that a label $y_k$ is produced by a given phone machine at a given transition from one state to a subsequent state where k is a label identifying notation; and each phone machine including (a) means for assigning to each $y_k$ in said each phone machine a single value $p'(y_k)$ and (b) means for replacing each actual output probability $p(y_k)$ at each transition in a given phone machine by the single value $p'(y_k)$ assigned to the corresponding $y_k$.

19. Apparatus as in claim 18 wherein a $p'(y_k)$ for a respective label is no less in value than any $p(y_k)$ for the respective label $y_k$ in a given phone machine.

20. Apparatus as in claim 18 wherein the length of the string of labels generable by each phone machine is characterized (a) as being between a minimum length and a maximum length and (b) as having a uniform length distribution wherein the probability for each length in the length distribution between the minimum and maximum length is a uniform value;

the probability of label lengths less than the minimum length or greater than the maximum length being set as zero.

21. Apparatus as in claim 20 wherein said assigning means includes means for representing the value $p'(y_k)$ for a given $y_k$ in a given phone machine by the maximum $p(y_k)$ value for the given $y_k$ in the given phone machine.

22. Apparatus as in claim 21 including means for setting the uniform value of the length probability to be equal to the maximum probability of any length generable by each particular phone machine.

23. Apparatus as in claim 20 wherein said each phone machine further includes:

first means for generating an end-time distribution for each phone based on (a) the labels entering the phone machine for said each phone and (b) a start-time distribution of said each phone; and second means for evaluating the probability that a particular phone produced an input string of labels based on the generated end-time distribution of the particular phone.

24. Apparatus as in claim 23 including means for determining each of at least some of the start-time distributions from the end-time distribution of the most recent previous phone.

25. Apparatus as in claim 24 wherein the minimum length is zero, the apparatus further comprising:

means for characterizing the probability of each end time in the end-time distribution by a value $\theta_n$ which is equal to the end time probability at time $t_n$ divided by the uniform length probability; and means for computing $\theta_n$ for successive times $t_n$ as:

$$\theta_n = q_n + \theta_{n-1} p'_n$$

wherein $p'_n$ represents the replacement value for the incoming string label that is to be generated at time $t_n$ by the phone machine to yield the corresponding end time.

26. Apparatus as in claim 19 wherein said each phone machine further includes:

first means for generating an end-time distribution for each phone based on (a) the labels entering the phone machine for said each phone and (b) a start-time distribution of said each phone;

second means for evaluating the probability that a particular phone produced an input string of labels based on the generated end-time distribution of the particular phone; and means for determining each of at least some of the start-time distributions from the end-time distribution of the most recent previous phone;

wherein said first means includes, for each of a plurality of end times which together form the end-time distribution:

means for determining a sum of product terms, each product term corresponding to (a) a start-time probability, (b) a label length probability, and (c) the probabilities of label outputs generated to provide the label length in the product term; and means for adding the sums of product terms to provide a match score for the phone corresponding to the end-time distribution.

27. A method of determining at least one word in a vocabulary having the highest probability of having generated a given string of incoming labels that were produced in response to a speech input, the method comprising the steps of:

characterizing each word as a sequence of phonetic elements, wherein each phonetic element has (a) a start-time distribution of probabilities $q_n$ corresponding to respective successive start times $t_n$, (b)

a plurality of states between which transitions occur, (c) a plurality of transition probabilities, each indicating the probability that a given transition in a given phonetic element occurs, (d) a plurality of actual label probabilities, each actual output probability indicating the probability that a particular phonetic element generates a particular label at a particular transition in the particular phonetic element; and forming an approximate match for a subject word including the steps of:

replacing all actual probabilities associated with a given label generated by a given phonetic element at any transition therein with a corresponding specific replacement value; and determining for one phonetic element after another in the subject word the probability $\Phi_n$ of a phonetic element ending at a respective one of a plurality of successive end times $t_n$ as a function of start-time distribution, the probability of the phonetic element generating a label string of each of various lengths, and the replacement value $p'(y_k)$ for each respective label $y_k$ that is to be generated by the phonetic element to produce the incoming string of labels.

28. A method as in claim 27 wherein the approximate matching further includes the step of:

characterizing the label length distribution as uniform between a minimum length and a maximum length with the probability elsewhere being set as zero;

each $\Phi_n$ thereby being a function of start-time distribution, the uniform probability for each length between the minimum length and the maximum length, and the replacement value $p'(y_k)$ for each respective label $y_k$ that is to be generated by the phonetic element to produce the incoming string of labels.

29. A method as in claim 28 wherein the $\Phi_n$ determining step includes the step of:

recursively computing successive values of $\theta_n$ corresponding to successive values of $\Phi_n$ divided by the uniform length;

wherein $p'_n$ represents the replacement value for the incoming string label that is to be generated at time $t_n$ by the phonetic element to yield the corresponding end time.

30. A method as in claim 29 including the further step of:

limiting the number of labels examined in determining the probability of $\Phi_n$ for each phonetic element to a maximum of J labels.

31. A method as in claim 30 wherein the end time probabilities are determined for only the first J+K incoming labels where K is the number of states in the corresponding phonetic element.

32. A method as in claim 29 comprising the further step of:

combining the values for the successive $\theta_n$'s to derive a match value for the phonetic element corresponding thereto.

33. A method as in claim 28 comprising the further step of:

combining the values for the successive $\Phi_n$'s to derive a match value for the phonetic element corresponding thereto.

34. A method as in claim 33 comprising the further step of:

combining match values for successive phonetic elements in a subject word to provide a word match score.

35. A method as in claim 34 comprising the further step of:

forming a list of candidate words in order of word match scores, at least most of the words in the vocabulary being excluded from the formed list.

36. A method as in claim 35 comprising the further step of:

performing a detailed match against each candidate word on the formed list, including the steps of determining for each candidate word the probability that a sequence of phonetic elements representing the candidate word generates labels in the incoming string based on, for each phonetic element, (a) the start-time distribution of probabilities $q_n$ corresponding to respective successive start times $t_n$ therefor, (b) the plurality of states between which transitions occur therefor, (c) the plurality of transition probabilities therefor, each indicating the probability that a given transition in a given phonetic element occurs, and (d) the plurality of actual label probabilities therefor, each actual output probability indicating the probability that the particular phonetic element generates a particular label at a particular transition in the particular phonetic element.

37. A method as in claim 36 comprising the further step of:

performing a language model match on candidate words on the formed list.

38. A method as in claim 33 comprising the further step of:

selecting the specific replacement values so that the match value for each phonetic element is an overestimate of a match value generated if the actual probabilities were not replaced with the replacement values.

39. A method as in claim 28 wherein the minimum length is zero and wherein the $\Phi_n$ determining step includes the step of:

recursively computing successive values of $\theta_n$ corresponding to successive values of $\Phi_n$ divided by the uniform length as:

$$\theta_n = q_n + \theta_{n-1} p'_n$$

wherein $p'_n$ represents the replacement value for the incoming string label that is to be generated at time $t_n$ by the phonetic element to yield the corresponding end time.

40. A method of performing an approximate acoustic match between incoming labels and words in a vocabulary where each word is represented by a sequence of Markov model phone machines, the Markov model of each phone machine including states and transitions therebetween, the method comprising the steps of:

determining the probability of being at a subject state at a given time, which includes the steps of (a) identifying each previous state that has a transition which leads to the subject state and determining the respective probability of each such previous state; (b) recognizing, for each such previous state, a value representing the probability of the label that must be generated at the transition between each such previous state and the current state in order to conform to the label string; and (c) combining the probability of each previous state and the respective value representing the label probability to provide a subject state probability over a corresponding transition;

wherein, for each label in a given phone, setting the probability thereof to be a specific value throughout the given phone;

determining the overall probability of being at the subject state from the subject state probabilities over all transitions leading thereto; and combining the overall probabilities for a given phone in a word to determine the likelihood of the given phone producing the string of labels.

41. In a speech recognition system, a method of measuring the likelihood of a word corresponding to a spoken input where the word is from a vocabulary of words, the method comprising the steps of:
(a) generating a string of labels in response to a spoken input, each label (i) being from an alphabet of labels and (ii) representing a respective sound type;
(b) determining label votes, each label vote representing the likelihood that a respective label is produced when a given word is uttered; and
(c) for a subject word, accumulating a label vote for each of at least some of the labels generated in the string;
the accumulated label votes providing information indicative of the likelihood of the subject word.

42. The method of claim 41 comprising the further step of:
(d) combining the accumulated label votes together to provide a likelihood score for the subject word.

43. The method of claim 42 comprising the further step of:
(e) repeating steps (c) and (d) for each word in the vocabulary; and
(f) selecting the n words having the highest likelihood scores as candidate words, where n is a predefined integer.

44. The method of claim 42 wherein the vote determining step includes the step of (g) evaluating the log probability of the subject word producing the respective label; and
wherein the combining step includes the step of (h) summing up the determined label votes for the subject word; and
wherein the method comprises the further step of:
(j) determining a scaled likelihood score for the subject word as the sum of votes divided by the number of generated labels that are summed.

45. The method of claim 44 comprising the further steps of:
(k) repeating steps (c), (d), (g), (h), and (j) for each word in the vocabulary; and
(l) selecting as candidate words the n words having the highest scaled likelihood scores where n is a predefined integer.

46. The method of claim 41 comprising the further step of:
(m) determining, for a subject word, a penalty for each label wherein the penalty for a given label represents the likelihood of the subject word not producing the given label; and
(n) combining together (i) the label votes and (ii) the penalties corresponding to the subject word, wherein each combined label vote corresponds to a label generated in response to the spoken input and wherein each combined penalty corresponds to a label not generated in response to the spoken input.

47. The method of claim 46 comprising the further steps of:
(o) repeating steps (a), (b), (c), (m), and (n) for each word as the subject word.

48. The method of claim 47 comprising the further step of:
(p) determining the label in the string that corresponds to the most likely end time of a word-representing utterance; and
(q) limiting the determining of votes and penalties to labels generated prior to the determined end time label.

49. The method of claim 47 comprising the further step of:
(r) setting a reference end time; and
(s) repeating the combining step (n) at successive intervals following the set reference end time.

50. The method of claim 41 wherein the vote determining step (b) includes the steps of:
(t) forming each word as a sequence of models each model being represented as a Markov model phone machine characterized as having (i) a plurality of states, (ii) a plurality of transitions extending from a state to a state, (iii) first means for storing a likelihood count for the occurrence of each transition, and (iv) second means for storing a likelihood count for each of at least some of the labels being produced at each of at least some of the transitions;
(u) determining transition likelihood counts and label likelihood counts from training data generated by the utterance of known speech input; and
(v) producing an expected label distribution for each word based on the determined transition likelihood counts and label likelihood counts, each label vote being derived from the expected label distribution.

51. In a speech recognition system having (i) an acoustic processor which generates acoustic labels, (ii) a vocabulary of words each of which is represented by a word model comprising a sequence of Markov model phone machines, and (iii) a set of trained statistics indicating the label output probabilities and transition probabilities of each phone machine in a word model, a method of selecting likely candidate words from the vocabulary comprising the steps of:
(a) for a subject word from the vocabulary, determining a respective label vote for each label wherein a label vote for a given label represents the likelihood of the subject word producing the given label; and
(b) for a given string of labels generated by the acoustic processor in response to an unknown spoken input, combining the label votes for the subject word for labels generated in the string.

52. The method of claim 51 wherein the vote determining step includes the steps of:
(c) computing the expected number and distribution of labels for the subject word from the trained statistics; and
(d) computing the logarithmic probability distribution of labels for the subject word from the expected distribution of labels;
the logarithmic probability of the subject word producing a given label being the label vote of the given label for the subject word.

53. The method of claim 52 comprising the further steps of:

(e) determining the likelihood of each label not being produced by the subject word as a label penalty for the subject word;

(f) applying a length of the label string to the subject word;

(g) for each label not occurring in the applied length, extracting the label penalty for the subject word; and (h) combining the votes for all labels occurring in the applied length with the penalties for all labels not occurring in the applied length to form a likelihood score for the subject word.

54. The method of claim 53 comprising the further step of:

(j) dividing the likelihood score for the subject word by the number of labels in the applied length to provide a scaled likelihood score.

55. The method of claim 54 comprising the further step of:

(k) repeating steps (a) through (h) for each word in the vocabulary as the subject word; and (l) selecting as candidate words those words having the n highest scaled likelihood scores.

56. The method of claim 55 wherein the applying step includes the step of:

(m) setting a reference end time;

(n) repeating the combining step (h) at successive intervals following the set reference end time; and (o) determining, for each word at each successive interval, a scaled likelihood score relative to the scaled likelihood scores of the other words at a given interval and assigning to each subject word, the highest scaled relative likelihood score thereof.

57. The method of claim 56 comprising the further step of:

(p) performing an approximate acoustic match on all words in a set of words from the vocabulary determined from step (1).

58. The method of claim 57 wherein each phone machine has associated therewith (i) at least one transition and (ii) actual label output probabilities, each actual label probability representing the probability that a specific label is generated at a given transition in the phone machine, and wherein the acoustic match performing step includes the steps of:

(aa) forming simplified phone machines which includes the step of replacing by a single specific value the actual label probabilities for a given label at all transitions at which the given label may be generated in a particular phone machine; and (bb) determining the probability of a phone generating the labels in the string based on the simplified phone machine corresponding thereto.

59. A method as in claim 58 wherein each sequence of phones corresponding to a vocabulary word represents a phonetic baseform, the method including the further step of:

(cc) arranging the baseforms into a tree structure in which baseforms share a common branch for as long the baseforms have at least similar phonetic beginnings, each leaf of the tree structure corresponding to a complete baseform.

60. A method as in claim 58 wherein the specific value assigned to all label probabilities for a particular label in a given phone machine is equal to at least the maximum actual label probability over all transitions for said particular label in the given phone machine.

61. A method as in claim 60 wherein each phone machine also has associated therewith (c) a length distribution for each phone which indicates probability as a function of the number of labels produced by a particular phone, the method including the further step of:

(dd) converting the length distribution for each phone into a uniform probability length pseudo-distribution which includes the step of ascribing a uniform value to the probability of a given phone producing any number of labels defined in the length distribution.

62. A method as in claim 61 comprising the further steps of:

(ee) finding the minimum length of labels having a non-zero probability; and (ff) confining the uniform pseudo-distribution to lengths at least as long as the minimum length, lengths less than the minimum length being assigned a probability of zero.

63. The method of claim 62 wherein the combining step includes the steps of:

(gg) summing the votes of labels in the string for the subject word.

64. A speech recognition method of selecting likely words from a vocabulary of words wherein each word is represented by a sequence of at least one probabilistic finite state phone machine and wherein an acoustic processor generates acoustic labels in response to a spoken input, the method comprising the steps of:

(a) forming a first table in which each label in the alphabet provides a vote for each word in the vocabulary, each label vote for a subject word indicating the likelihood of the subject word producing the label providing the vote.

65. The method of claim 64 comprising the further steps of:

(b) forming a second table in which each label is assigned a penalty for each word in the vocabulary, the penalty assigned to a given label for a given word being indicative of the likelihood of the given label not being produced according to the model for the given word.

66. The method of claim 64 comprising the further step of:

(c) for a given string of labels, determining the likelihood of a particular word which includes the step of combining the votes of all labels in the string for the particular word.

67. The method of claim 65 comprising the further step of:

(d) for a given string of labels, determining the likelihood of a particular word which includes the step of combining the votes of all labels in the string for the particular word together with the penalties of all labels not in the string for the particular word.

68. The method of claim 67 comprising the further step of:

(e) repeating steps (a), (b), and (c) for all words as the particular word in order to provide a likelihood score for each word.

69. A speech recognition apparatus for selecting likely words from a vocabulary of words wherein each word is represented by a sequence of at least one probabilistic finite state phone machine and wherein an acoustic processor generates acoustic labels in response to a spoken input, the apparatus comprising:

(a) means for forming a first table in which each label in the alphabet provides a vote for each word in the vocabulary, each label vote for a subject word indicating the likelihood of the subject word producing the label providing the vote; and (b) means for forming a second table in which each label is assigned a penalty for each word in the vocabulary, the penalty assigned to a given label for a given word being indicative of the likelihood of the given label not being produced according to the model for the given word.

70. Apparatus as in claim 69 further comprising:

(c) means for determining, for a given string of labels, the likelihood of a particular word which includes means for combining the votes of all labels in the string for the particular word together with the penalties of all labels not in the string for the particular word.

71. A method of evaluating the likelihood of a word corresponding to a speech input in a speech-recognition system comprising the steps of:

for a subject word in a vocabulary of words, generating a first word score representing the subject word likelihood based on an acoustic match first algorithm;

for the subject word, generating a second word score based on a second independent algorithm which differs from the first algorithm; and forming a total word score for the subject word from at least the first word score and the second word score.

72. The method of claim 71 wherin said forming step includes weighting at least one of the word scores relative to the other word scores and combining the word scores after weighting.

73. The method of claim 71 comprising, the further step of:

generating acoustic labels in response to the uttering of speech inputs wherein each label identifies a respective class of speech input, the classes being based on predefined features of speech input; and wherein the step of generating the first word score includes the step of:

representing each vocabulary word by at least one probabilistic finite state phone machine, a representative phone machine having associated therewith (a) at least one transition, (b) a probability for each transition, and (c) actual label output probabilities each actual label output probability corresponding to the likelihood of the representative phone machine producing a given label at a given transition in response to an utterance, wherein each probability has a value assigned thereto.

74. The method of claim 73 wherein the step of generating the first word score includes the further steps of:

performing a detailed acoustic match for the subject word based on (i) the assigned values of the probabilities and (ii) the generated labels; and evaluating the first word score for the subject word from the performed detailed acoustic match.

75. The method of claim 74 wherein said word-representing step includes:

associating each phone machine with a corresponding label, each phone machine being characterized as a fenemic phone machine.

76. The method of claim 74 wherein said word-representing step includes:

associating each phone machine with a corresponding phonetic element, each phone machine being characterized as a phonetic phone machine.

77. The method of claim 71 wherein the step of generating the second word score includes the steps of:

generating acoustic labels in response to the uttering of speech inputs wherein each label identifies a respective class of speech input, the classes being based on predefined speech input features; and forming a first table in which each label in the alphabet provides a vote for each word in the vocabulary, each label vote for a subject word indicating the likelihood of the subject word producing the label providing the vote;

forming a second table in which each label is assigned a penalty for each word in the vocabulary, the penalty assigned to a given label for a given word being indicative of the likelihood of the given label not being produced according to the model for the given word;

for a given string of generated labels, determining a polled word score for a subject word which includes the step of combining the respective votes and penalties of all labels in the string for the subject word, the polled word score being the second word score.

78. The method of claim 76 wherein the step of generating the second word score includes the steps of:

forming a first table in which each label in the alphabet provides a vote for each word in the vocabulary, each label vote for a subject word indicating the likelihood of the subject word producing the label providing the vote;

forming a second table in which each label is assigned a penalty for each word in the vocabulary, the penalty assigned to a given label for a given word being indicative of the likelihood of the given label not being produced according to the model for the given word;

for a given string of generated labels, determining a polled word score for a subject word which includes the step of combining the respective votes and penalties of all labels in the string for the subject word, the polled word score corresponding to the second word score.

79. The method of claim 74 wherein the generating of the second word score includes the steps of:

forming simplified phone machines which includes the step of replacing by a single specific value the actual label probabilities for a given label at all transitions at which the given label may be generated in a particular phone machine;

performing an approximate acoustic match for the subject word based on the simplified phone machines and the generated labels; and evaluating a fast match word score for the subject word from the performed approximate acoustic match;

the fast match word score corresponding to the second word score.

80. The method of claim 79 including the further step of:

selecting the phone machines used in performing the detailed match from a first set of phone machines;

selecting the phone machines used in performing the approximate match from a second set of phone machines;

the second set of phone machines differing from the first set of phone machines.

81. The method of claim 80 wherein each phone machine in one of the phone sets corresponds to a label and is characterized as a fenemic phone machine and wherein each phone machine in the other set corresponds to a phonetic element and is characterized as a phonetic phone machine.

82. The method of claim 81 wherein said forming step includes weighting at least one of the word scores relative to the other word scores and combining the word scores after weighting.

83. The method of claim 78 comprising the further step of:
repeating the steps of claim 78 for each word in the vocabulary as the subject word in order to provide a polled word score for each word;
wherein the combining step includes summing the polled word score for a given subject word with at least one word score resulting from performing an acoustic match for the given subject word.

84. A method of measuring the likelihood that a word in a vocabulary of words corresponds to a speech input in a speech recognition system, wherein the system generates a string of labels where each label represents a sound class and is selected from an alphabet of predefined labels in response to speech input, the method comprising the steps of:
calculating each of a plurality of word scores for a subject word, each word score being calculated based on (a) a string of generated labels and (b) an independent algorithm; and
combining the plurality of word scores to provide a total word score for the subject word.

85. The method of claim 84 comprising the further step of:
evaluating a total word score for each word in the vocabulary, each word being processed as the subject word.

86. The method of claim 84 wherein an algorithm of the calculating step comprises the steps of:
storing a plurality of votes, the value of each vote representing the likelihood of the subject word producing a particular label.

87. The method of claim 84 wherein an algorithm of the calculating step includes the steps of:
Markov modelling the subject word; and
performing acoustic matching between the Markov modelling for the subject word and a string of labels generated in response to a speech input, a word score being derived from the performed acoustic matching.

88. The method of claim 87 wherein an algorithm of the calculating step comprises the steps of:
storing a plurality of votes, the value of each vote representing the likelihood of the subject word producing a particular label; and
computing a word score based on the votes of all labels in a generated string for the subject word.

89. The method of claim 87 wherein said Markov modelling step includes the step of:
constructing a sequence of Markov model phone machines for the subject word, wherein each phone machine is characterized by having (a) a plurality of states, (b) transitions each of which extends from a state to a state, (c) transition probabilities each of which has a value indicating the likelihood of a transition being taken, and (d) actual label output probabilities each of which has a value indicating the likelihood of a particular label being produced at a given transition in a given phone machine;
said performed acoustic matching being between (a) the sequence of phone machines for the subject word with the transition probability values and actual label output probability values assigned thereto and (b) the string of labels generated in response to a speech input.

90. The method of claim 87 wherein said Markov modelling step includes the step of:
constructing a sequence of Markov model phone machines for the subject word, wherein each phone machine is characterized by having (a) a plurality of states, (b) transitions each of which extends from a state to a state, (c) transition probabilities each of which has a value indicating the likelihood of a transition being taken, and (d) acutal label output probabilites each of which has a value indicating the likelihood of a particular label being produced at a given transition in a given phone machine;
replacing the actual label output probability values for each label in a given phone machine by a single replacement value;
said performed acoustic matching being between (a) the sequence of phone machines for the subject word with the transition probability values and replacement label output probability values assigned thereto and (b) the string of labels generated in response to a speech input.

91. The method of claim 87 comprising the further step of:
for a given string of generated labels, computing a respective total word score for each of a number of words in the vocabulary, wherein each of said number of words undergoes the previously recited steps as a subject word.

92. In a speech recognition system, apparatus for measuring word likelihood for words in a vocabulary, wherein the system generates a string of labels where each label represents a sound type and is selected from an alphabet of predefined labels in response to speech input, the apparatus comprising:
means for calculating each of a plurality of word scores for a subject word from (a) a string of generated labels and (b) an algorithm which is independent with regard to each algorithm associated with another calculated word score; and
means for combining the plurality of word scores to provide a total word score for the subject word.

93. Apparatus as in claim 92 wherein the calculating means includes:
first means for performing an acoustic match between (a) word models comprised of Markov model phone machines selected from a first set of phone machines and (b) a string of labels generated by an acoustic processor in response to speech input and for computing a first word score;
second means for performing an acoustic match between (a) word models comprised of Markov model phone machines selected from a second set of phone machines and (b) a string of labels generated by an acoustic processor in response to speech input and computing a second word score; and
means for combining the first word score and the second word score to provide a total word score for the subject word.

94. Apparatus as in claim 93 wherein the calculating means includes:
  means for storing a plurality of votes, the value of each vote representing the likelihood of the subject word producing a respective label; and
  means for computing a word score based on the votes of all labels in a generated string for the subject word;
  the combining means combining the word score of the computing means with at least one other word score to provide the total score for the subject word.

95. Apparatus as in claim 94 further comprising:
  means for weighting at least one word score before the word scores are combined.

96. Apparatus as in claim 95 further comprising:
  means for evaluating a total word score for each word in the vocabulary; and
  means for ordering the words according to total word scores,
  the combining means combining the word score of the computing means with at least one other word score to provide the total score for the subject word.

97. In a speech recognition system in which each word is represented as a sequence of phones and in which an acoustic processor generates a string of successive labels in response to the utterance of speech, wherein each label corresponds to one of an alphabet of pre-defined sound types, a machine-implemetable method of determining a vote of each label of the alphabet for each vocabulary word, the method comprising the steps of:
  generating, in the acoustic processor, a string of labels in response to the uttering of a known script of sequential phones;
  evaluating a count indicative of the number of times each label in the label alphabet is generated for a given phone in response to the utterance of the known script; and
  repeating the evaluating step for each label as applied to each phone uttered in the known script.

* * * * *